US011946854B2

United States Patent
Ozcan et al.

(10) Patent No.: US 11,946,854 B2
(45) Date of Patent: Apr. 2, 2024

(54) SYSTEMS AND METHODS FOR TWO-DIMENSIONAL FLUORESCENCE WAVE PROPAGATION ONTO SURFACES USING DEEP LEARNING

(71) Applicant: THE REGENTS OF THE UNIVERSITY OF CALIFORNIA, Oakland, CA (US)

(72) Inventors: Aydogan Ozcan, Los Angeles, CA (US); Yair Rivenson, Los Angeles, CA (US); Yichen Wu, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 234 days.

(21) Appl. No.: 17/418,782

(22) PCT Filed: Dec. 23, 2019

(86) PCT No.: PCT/US2019/068347
§ 371 (c)(1),
(2) Date: Jun. 26, 2021

(87) PCT Pub. No.: WO2020/139835
PCT Pub. Date: Jul. 2, 2020

(65) Prior Publication Data
US 2022/0058776 A1    Feb. 24, 2022

Related U.S. Application Data

(60) Provisional application No. 62/912,537, filed on Oct. 8, 2019, provisional application No. 62/785,012, filed on Dec. 26, 2018.

(51) Int. Cl.
*G01N 15/14* (2006.01)
*G01N 21/64* (2006.01)
(Continued)

(52) U.S. Cl.
CPC ..... *G01N 15/1475* (2013.01); *G01N 21/6458* (2013.01); *G06F 18/214* (2023.01);
(Continued)

(58) Field of Classification Search
None
See application file for complete search history.

(56) References Cited

U.S. PATENT DOCUMENTS 7,623,726 B1    11/2009  Georgiev
9,581,798 B2 *   2/2017  Loza Alvarez .... G02B 27/0075
(Continued)

FOREIGN PATENT DOCUMENTS

CN        105379253 A  *  3/2016  ......... G01N 21/6458
WO    WO 2013/104938 A2    7/2013
(Continued)

OTHER PUBLICATIONS

The extended European search report dated Jan. 18, 2022 for European Patent Appl No. 19906217.5-1207 (18 pages).
(Continued)

*Primary Examiner* — Jiangeng Sun
(74) *Attorney, Agent, or Firm* — VISTA IP LAW GROUP LLP

(57) ABSTRACT

A fluorescence microscopy method includes a trained deep neural network. At least one 2D fluorescence microscopy image of a sample is input to the trained deep neural network, wherein the input image(s) is appended with a digital propagation matrix (DPM) that represents, pixel-by-pixel, an axial distance of a user-defined or automatically generated surface within the sample from a plane of the input image. The trained deep neural network outputs fluorescence output image(s) of the sample that is digitally propagated or refocused to the user-defined surface or automatically generated. The method and system cross-connects
(Continued)

different imaging modalities, permitting 3D propagation of wide-field fluorescence image(s) to match confocal microscopy images at different sample planes. The method may be used to output a time sequence of images (e.g., time-lapse video) of a 2D or 3D surface within a sample.

22 Claims, 39 Drawing Sheets

(51) Int. Cl.
| | |
|---|---|
| G06F 18/214 | (2023.01) |
| G06N 3/08 | (2023.01) |
| G06T 3/40 | (2006.01) |
| G06T 3/4046 | (2024.01) |
| G06T 3/4053 | (2024.01) |
| G06T 5/00 | (2006.01) |
| G06T 5/50 | (2006.01) |
| G06V 10/44 | (2022.01) |
| G06V 10/77 | (2022.01) |
| G06V 10/82 | (2022.01) |
| G06V 20/69 | (2022.01) |

(52) U.S. Cl.
CPC ............. *G06N 3/08* (2013.01); *G06T 3/4046* (2013.01); *G06T 3/4053* (2013.01); *G06T 5/003* (2013.01); *G06T 5/50* (2013.01); *G06V 10/454* (2022.01); *G06V 10/7715* (2022.01); *G06V 10/82* (2022.01); *G06V 20/69* (2022.01); *G06T 2207/10016* (2013.01); *G06T 2207/10056* (2013.01); *G06T 2207/10064* (2013.01); *G06T 2207/20081* (2013.01); *G06T 2207/20084* (2013.01); *G06T 2207/20221* (2013.01)

(56) References Cited

U.S. PATENT DOCUMENTS

| | | | | |
|---|---|---|---|---|
| 2005/0125369 | A1* | 6/2005 | Buck | G06V 10/955 706/46 |
| 2005/0197977 | A1* | 9/2005 | Buck | G06N 20/00 706/12 |
| 2008/0290293 | A1 | 11/2008 | Motomura | |
| 2017/0185871 | A1 | 6/2017 | Zhang et al. | |
| 2017/0249548 | A1 | 8/2017 | Nelson et al. | |
| 2018/0286038 | A1 | 10/2018 | Jalali et al. | |
| 2019/0026917 | A1* | 1/2019 | Liao | G06V 10/82 |
| 2019/0294108 | A1 | 9/2019 | Ozcan et al. | |
| 2019/0333199 | A1 | 10/2019 | Ozcan et al. | |
| 2020/0340901 | A1 | 10/2020 | Ozcan et al. | |
| 2021/0043331 | A1 | 2/2021 | Ozcan et al. | |

FOREIGN PATENT DOCUMENTS

| | | | | |
|---|---|---|---|---|
| WO | WO-2014117079 | A1 * | 7/2014 | ......... G01N 21/6458 |
| WO | WO 2019/103909 | A1 | 5/2019 | |
| WO | WO 2019/191697 | A1 | 10/2019 | |
| WO | WO 2019/236569 | A1 | 12/2019 | |
| WO | WO 2020/018154 | A1 | 1/2020 | |
| WO | WO 2020/082030 | A1 | 4/2020 | |
| WO | WO 2020/102546 | A1 | 5/2020 | |
| WO | WO 2020/139835 | A1 | 7/2020 | |
| WO | WO 2020/219468 | A1 | 10/2020 | |
| WO | WO 2021003369 | A1 | 1/2021 | |

OTHER PUBLICATIONS

Communication pursuant to Rules 70(2) and 70a(2) EPC dated Feb. 4, 2022 for European Patent Appl No. 19906217.5-1207 (1 page).
Parikshit Sakurikar et al., RefocusGAN: Scene Refocusing Using a Single Image, Oct. 6, 2018, Lecture notes in computer science, XP047489263, ISBN: 978-3-540-74549-5, vol. ECCV, pp. 519-535.
Liang Han et al., Refocusing Phase Contrast Microscopy Images, Sep. 4, 2017, Lecture notes in Computer Science, XP047528053, ISBN: 978-3-030-58594-5, vol. 10434, pp. 65-74.
Xinchen Yan et al., Perspective Transformer Nets: Learning Single-View 3D Object Reconstruction without 3D Supervision, 30th Conference on Neural Information Processing Systems (NIPS 2016), Barcelona, Spain.
Xiaoyu Zhang et al., Deep learning optical-sectioning method, vol. 26, No. 23, Nov. 12, 2018, Optics Express.
Chawin Ounkomol et al., Label-free prediction of three-dimensional fluorescene images from transmitted light microscopy, Nat Methods, Nov. 15, 2018(11):917-920.
PCT International Search Report and Written Opinion for PCT/US2019/068347, Applicant: The Regents of the University of California, dated Mar. 10, 2020 (9pages).
Yair Rivenson et al., Deep Learning Enhanced Mobile-Phone Microscopy, ACS Photonics 2018, 5, 2354-2364.
PCT International Preliminary Report on Patentability (Chapter I of the Patent Cooperation Treaty) for PCT/PCT/US2019/068347, Applicant: The Regents of the University of California, Form PCT/IB/326 and 373, dated Jul. 8, 2021 (8 pages).
Response to Communication pursuant to Rule 70(2) EPC and reply to the objections raised in the written opinion accompanying the extended European search report (Rule 70a(2) EPC) dated Aug. 16, 2022 for European Patent Appl No. 19906217.5-1207, (119 pages).
Martin Abadi et al., TensorFlow: A System for Large-Scale Machine Learning, USENIX Association 12th USENIX Symposium on Operating Systems Design and Implementation, Nov. 2-4, 2016.
Anish V. Abraham et al., Quantitative study of single molecule location estimation techniques, Dec. 21, 2009, vol. 17, No. 26, Optics Express.
Sara Abrahamsson et al., MultiFocus Polarization Microscope (MFPolScope) for 3D polarization imaging of up to 25 focal planes simultaneously, Mar. 23, 2015, vol. 23, No. 6, DOI:10.1364/OE.23.007734, Optics Express 7734.
Sara Abrahamsson et al., Fast multicolor 3D imaging using aberration-corrected multifocus microscopy.
Nick Antipa et al., DiffuserCam: lensless single-exposure 3D imaging, vol. 5, No. 1, Jan. 2018, Optica.
Gary Brooker et al., In-line FINCH super resolution digital holographic fluorescence microscopy using a high efficiency transmission liquid crystal GRIN lens, Opt Lett. Dec. 1, 20135; 38(24): 5264-5267.
Michael Broxton et al., Wave optics theory and 3-D deconvolution for the light field microscope, Oct. 21, 2013, vol. 21, No. 21, DOI:10.1364/OE.21.025418, Optics Express.
P. Scott Carney et al., Interferometric synthetic aperture microscopy (2007).
Ozgun Cicek et al., 3D U-Net: Learning Dense Volumetric Segmentation from Sparse Annotation (2016).
Noy Cohen et al., Enhancing the performance of the light field microscope using wavefront coding, Oct. 6, 2014, vol. 22, No. 20, DOI:10.1364/OE.22.024817, Optics Express.
Graham T. Dempsey et al., Evaluation of fluorophores for optimal performance in localization-based super-resolution imaging, Nat Methods. ; 8(12): 1027-1036.
S. M. Ali Eslami et al., Neural scene representation and rendering, Science 360, 1204-1210 (2018).
Brigitte Forster et al., Complex Wavelets for Extended Depth-of-Field: A New Method for the Fusion of Multichannel Microscopy Images, Microscopy Research and Technique 65:33-42 (2004).
Z. Schilling et al., Predictive-focus illumination for reducing photodamage in live-cell microscopy, J Microsc, May 2012; 246(2): 160-167.
Xavier Glorot et al., Understanding the difficulty of training deep feedforward neural networks (2010).
Rafael C. Gonzalez et al., Digital Image Processing Using MATLAB, Intensity Transformations and Spatial Filtering (2004).
Ian J. Goodfellow et al., Generative Adversarial Nets (2014).

(56) References Cited

OTHER PUBLICATIONS

Hoo-Chang Shin et al., Deep Convolutional Neural Networks for Computer-Aided Detection: CNN Architectures, Dataset Characteristics and Transfer Learning, IEEE Transactions on Medical Imaging, vol. 35, No. 5, May 2016.
Bo Huang et al., Three-dimensional Super-resolution Imaging by Stochastic Optical Reconstruction Microscopy, Science. Feb. 8, 2008; 319(5864): 810-813.
Jan Huisken et al., Optical Sectioning Deep Inside Live Embryos by Selective Plane Illumination Microscopy, www.sciencemag.org Science vol. 305 Aug. 13, 2004.
Manuel F Juette et al., Three-dimensional sub-100 nm resolution fluorescence microscopy of thick samples, Nature Methods, vol. 5, No. 6, Jun. 2008.
H. Kirshner et al., 3-D PSF fitting for fluorescence microscopy: implementation and localization application, Journal of Microscopy, vol. 249, Pt 1, 2013, pp. 13-25, Received Jan. 30, 2012; accepted Sep. 21, 2012.
Tairan Liu et al., Deep learning based super resolution in coherent imaging systems, ArXiv181006611 Phys. 2018.
Valentin Magidson et al., Circumventing photodamage in live-cell microscopy, Methods Cell Biol. 2013, 114.
Xudong Mao et al., Least Squares Generative Adversarial Networks, arXiv:1611.04076v3 [cs.CV], Apr. 5, 2017.
Kyoji Matsushima et al., Formulation of the rotational transformation of wave fields and their application to digital holography, Applied Optics, vol. 47, No. 19, Jul. 1, 2008.
Mehdi Mirza et al., Conditional Generative Adversarial Nets, arXiv:1411.1784v1 [cs.LG] Nov. 6, 2014.
W. E. Moerner et al., Optical Detection and Spectroscopy of Single Molecules in a Solid, Physical Review Letter, vol. 62, No. 21, May 22, 1989.
Elias Nehme et al., Deep-STORM: super-resolution single-molecule microscopy by deep learning, vol. 5, No. 4, Apr. 2018, Optica.
Jeffrey P. Nguyen et al., Automatically tracking neurons in a moving and deforming brain, PLOS Computational Biology, https://doi.org/10.1371/journal.pcbi. 1005517, May 18, 2017 (19pages).
Wei Ouyang et al., Deep Learning massively accelerates super-resolution localization microscopy, Nature Biotechnology, Nature Publishing Group, 2018,36(5), pp. 460-468.10.1038/nbt.4106. Pasteur-02074397.
Sri Rama Prasanna Pavania et al., Three-dimensional, single-molecule fluorescence imaging beyond the diffraction limit by using a double-helix point spread function, PNAS, Mar. 3, 2009, vol. 106, No. 9, 2995-2999.
Nicolas C. Pegard et al., Compressive light-field microscopy for 3D neural activity recording, vol. 3, No. 5, May 2016, Optica.
Robert Prevedel et al., Simultaneous whole-animal 3D-imaging of neuronal activity using light-field microscopy, Nat Methods. Jul. 2014, 11(7): 727-730.
Yair Rivenson et al., Deep Learning Microscopy, arXiv1705.04709v1, May 2017.
Olaf Ronneberger et al., U-Net: Convolutional Networks for Biomedical Image Segmentation, arXiv:1505.04597v1 [cs.CV] May 18, 2015.
Joseph Rosen et al., Non-scanning motionless fluorescence three-dimensional holographic microscopy, Nature Photonics, vol. 2, Mar. 2008, www.nature.com/naturephotonics.
Daniel Sage et al., DeconvolutionLab2: An open-source software for deconvolution microscopy, Methods 115 (2017) 28-41.
Yoav Shechtman et al., Optimal Point Spread Function Design for 3D Imaging, Phys Rev Lett. Sep. 26, 2014, 113(13): 133902.
Nisan Siegel et al., High-magnification super-resolution FINCH microscopy using birefringent crystal lens Interferometers, Nat Photonics. Dec. 2016, 10: 802-808.
Fredrick A. South et al., Wavefront measurement using computational adaptive optics, J Opt Soc Am A Opt Image Sci Vis. Mar. 1, 2018; 35(3): 466-473.
Philippe Thevenaz et al., A Pyramid Approach to Sub-Pixel Registration Based on Intensity, IEEE Transactions on Image Processing, vol. 7, No. 1, Jan. 1998.
Jean-Yvestinevez et al., TrackMate: An open and extensible platform for single-particle tracking, Methods, Elsevier, 2017, 115, pp. 80-90.
Raju Tomer et al., SPED light sheet microscopy: fast mapping of biological system structure and function, Cell. Dec. 17, 2015; 163(7): 1796-1806.
Yu Toyoshima et al., Accurate Automatic Detection of Densely Distributed Cell Nuclei in 3D Space, PLOS Computational Biology, DOI:10.1371/journal.pcbi.1004970, Jun. 6, 2016.
Zhou Wang et al., Image Quality Assessment: From Error Visibility to Structural Similarity, IEEE Transactions on Image Processing, vol. 13, No. 4, Apr. 2004.
Hongda Wang et al., Deep learning enables cross-modality super-resolution in fluorescence microscopy, Nat Methods. Jan. 2019, 16(1): 103-110.
Martin Weigert et al., Isotropic reconstruction of 3D fluorescence microscopy images using convolutional neural networks, arXiv: 1704.01510v1 [cs.CV], Apr. 5, 2017.
Karl Weiss et al., A survey of transfer learning, J Big Data (2016) 3:9, DOI 10.1186/s40537-016-0043-6.
Yichen Wu et al., Extended depth-of-field in holographic imaging using deep-learning-based autofocusing and phase recovery, vol. 5, No. 6, Jun. 2018, Optica.
First Examination Report pursuant to Article 94(3) EPC dated Dec. 12, 2023, for European Patent Application No. 19906217.5-1207, (6 pages).

* cited by examiner

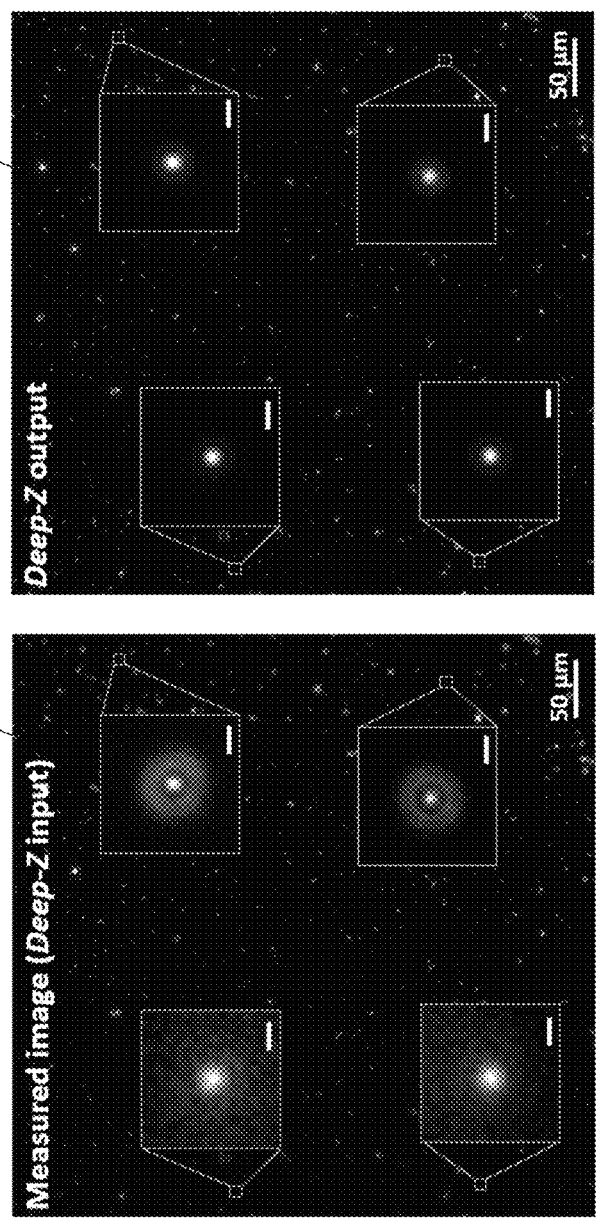
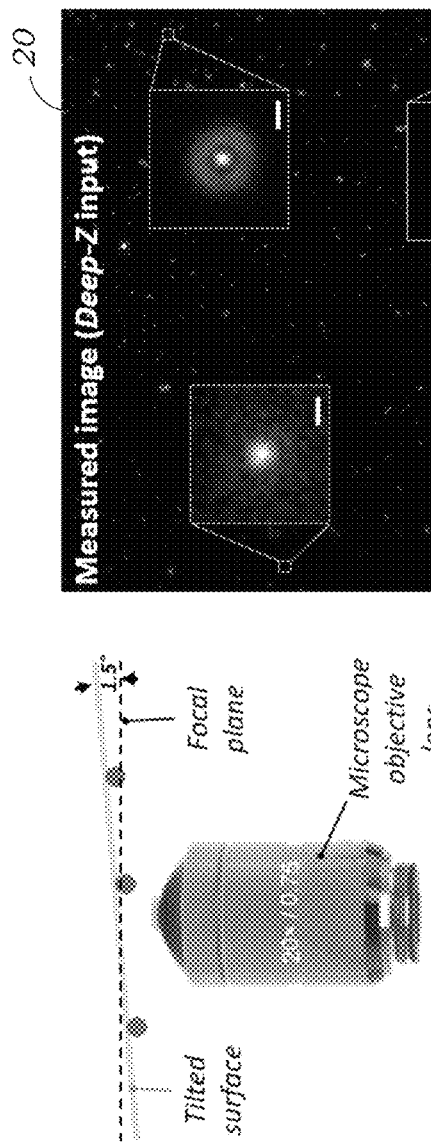
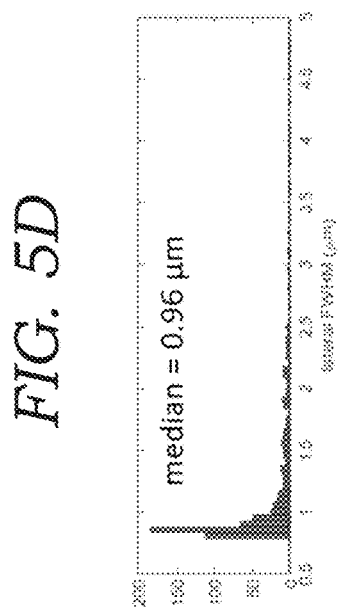
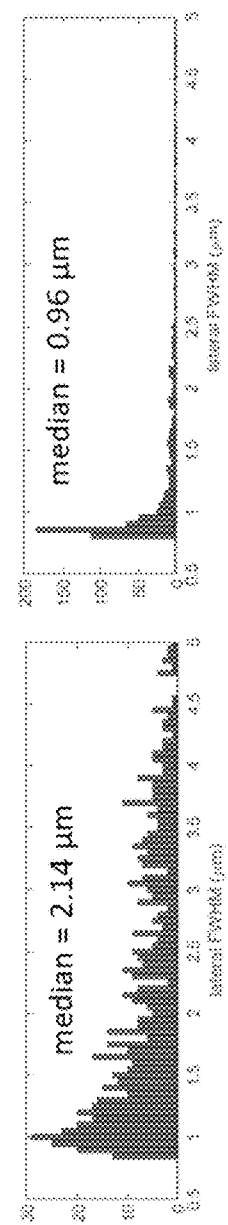
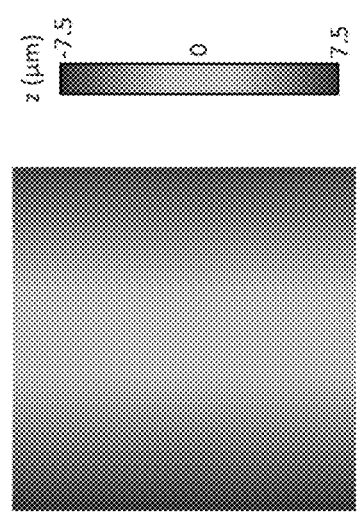
FIG. 5A
FIG. 5B
FIG. 5C
FIG. 5D
FIG. 5E
FIG. 5F

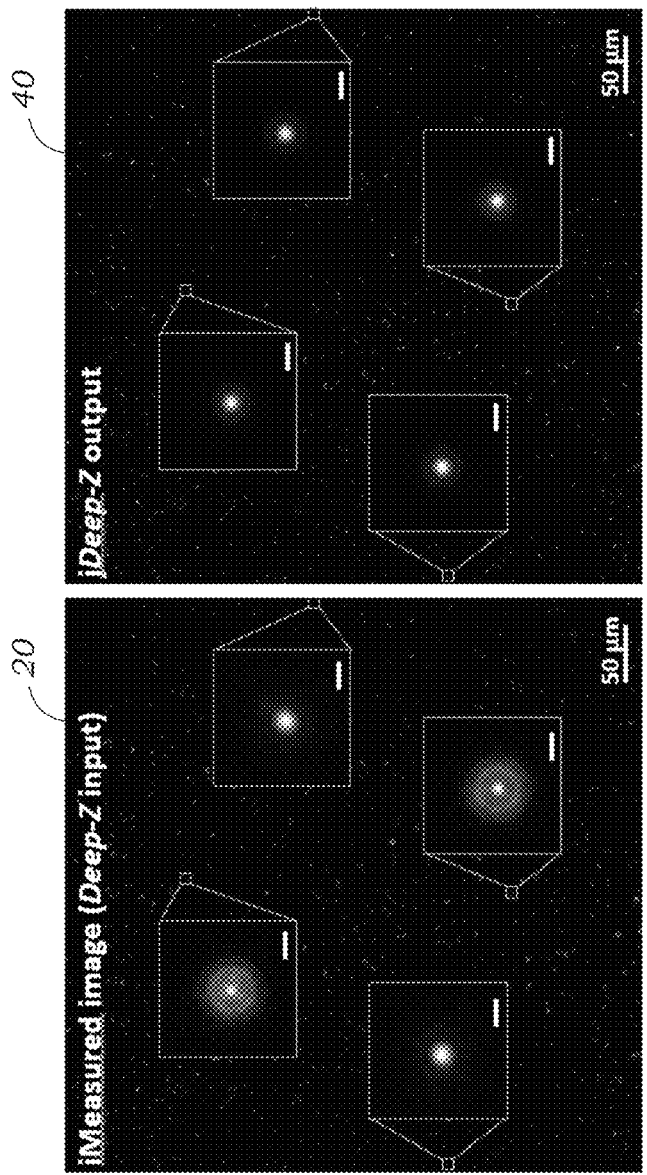
FIG. 5I   FIG. 5J
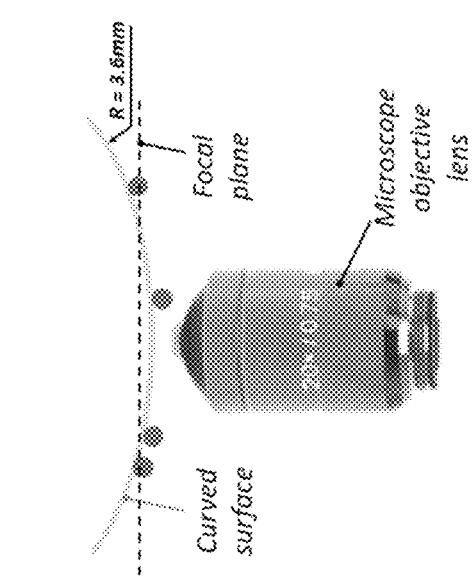
FIG. 5G
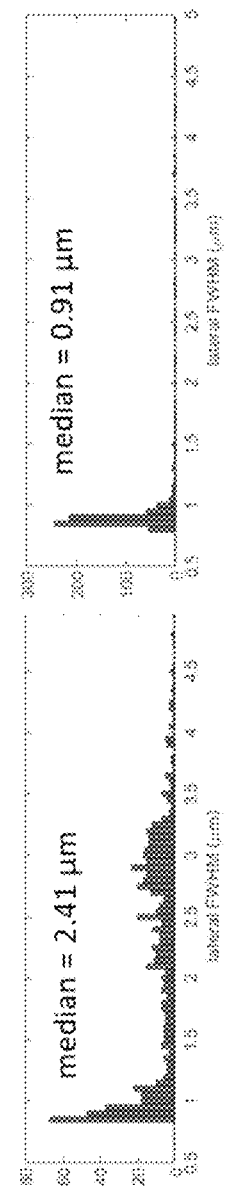
FIG. 5K   FIG. 5L
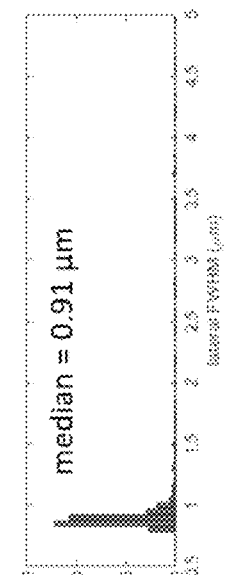
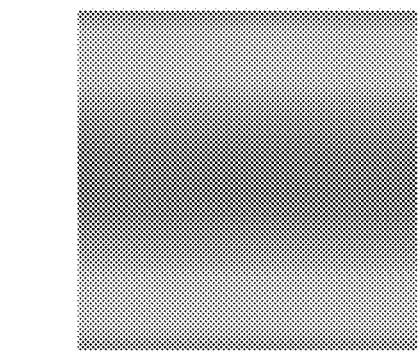
FIG. 5H

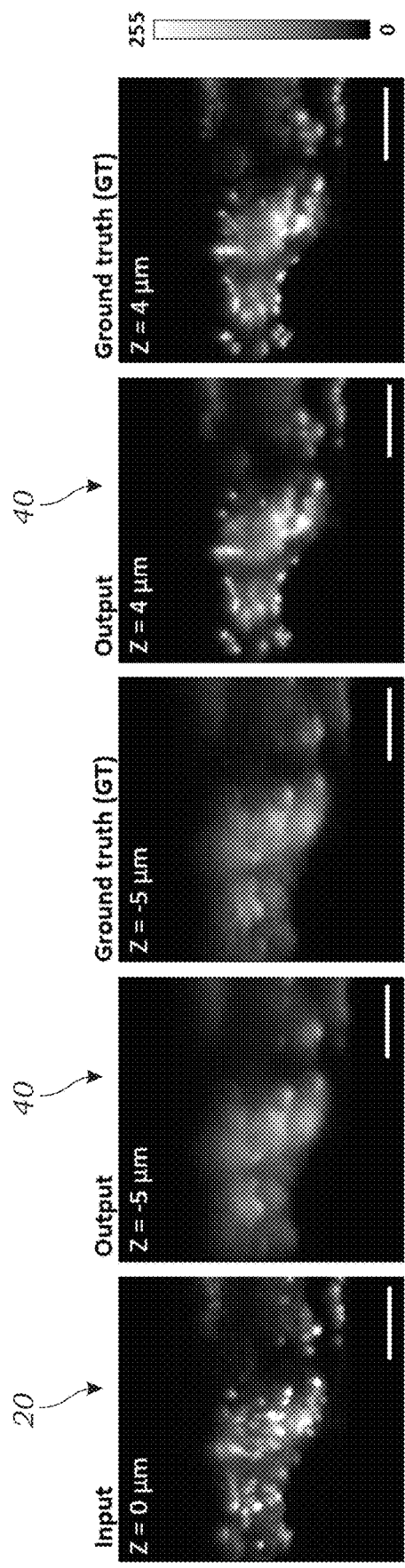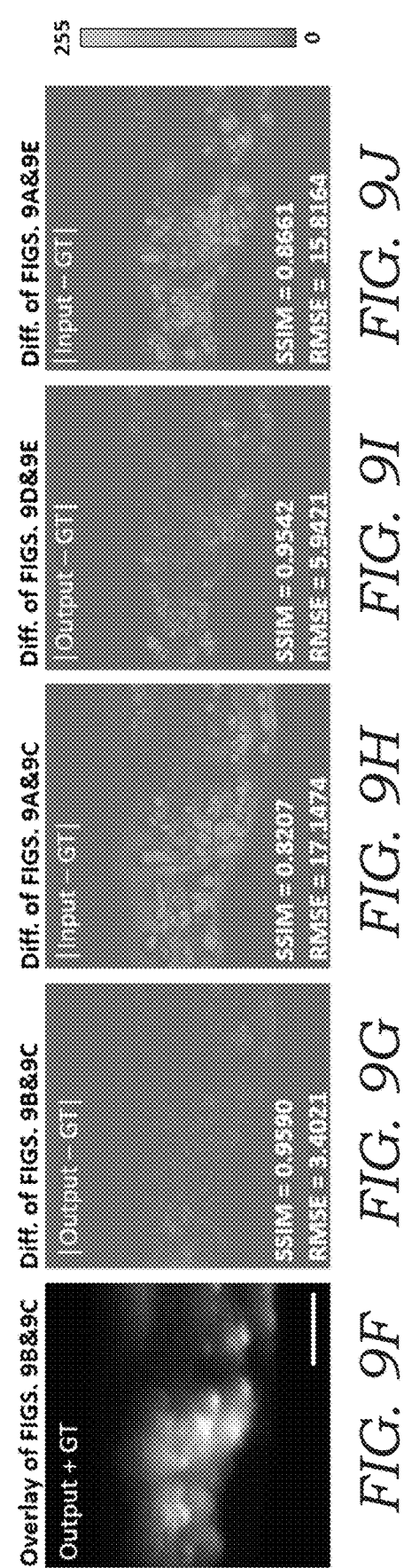

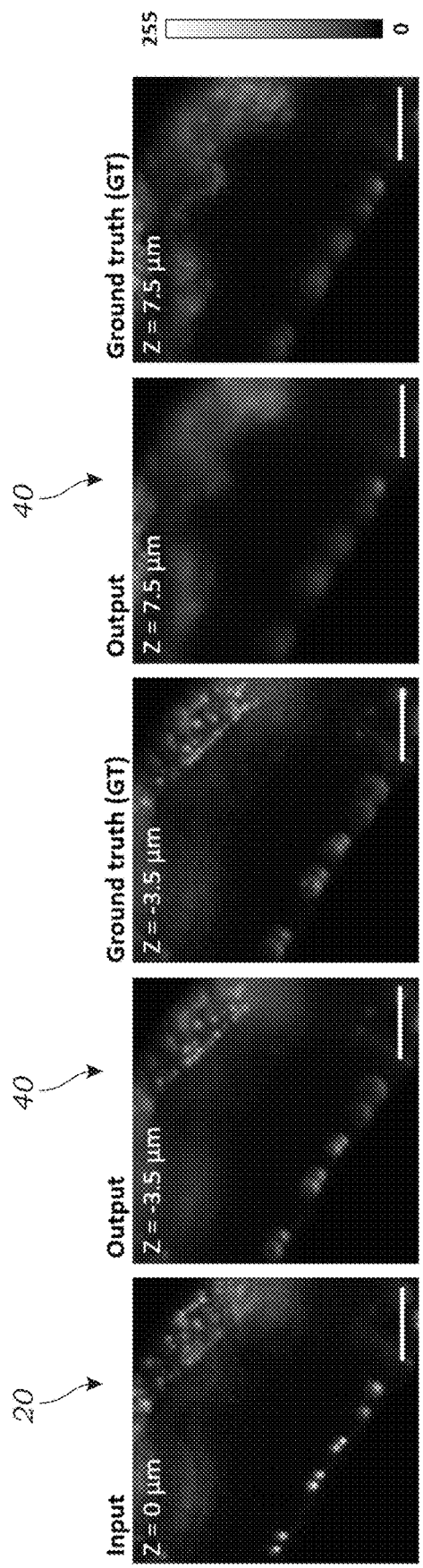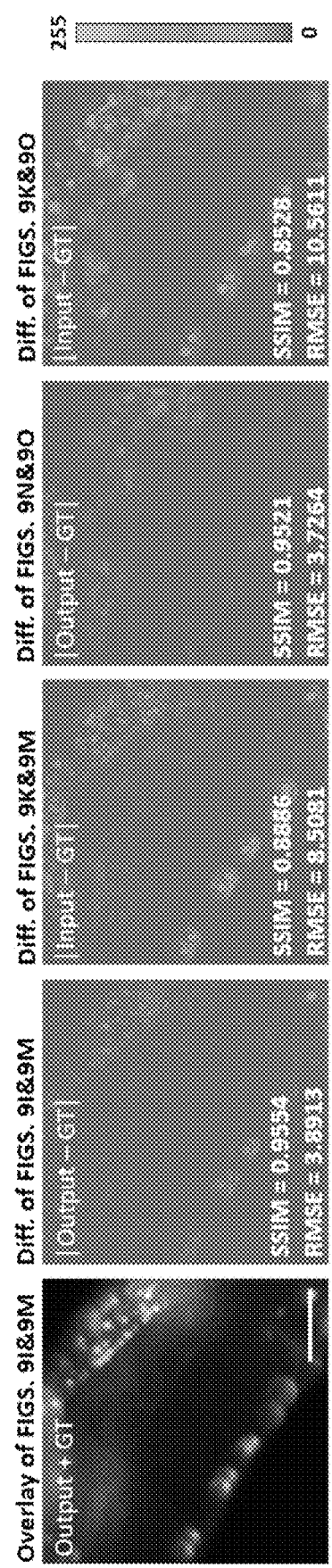

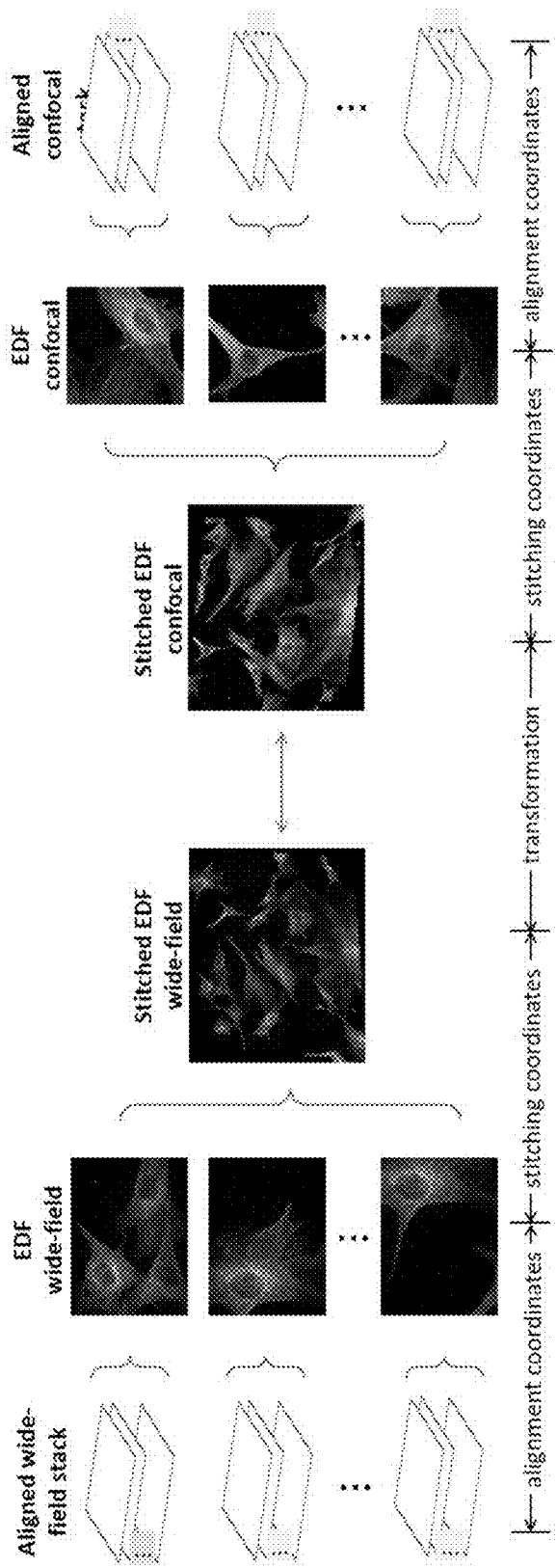
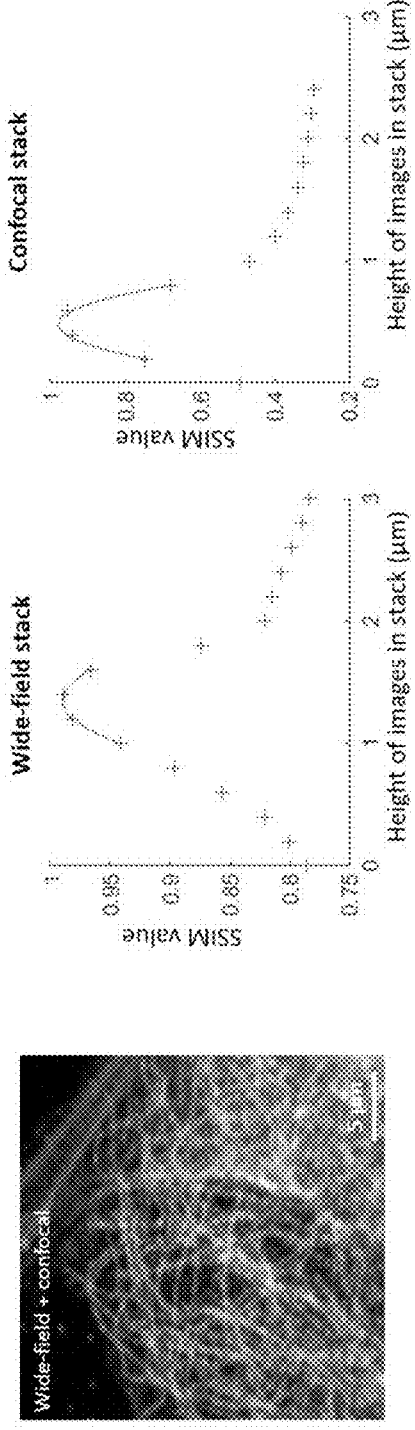
FIG. 15A
FIG. 15B
FIG. 15C

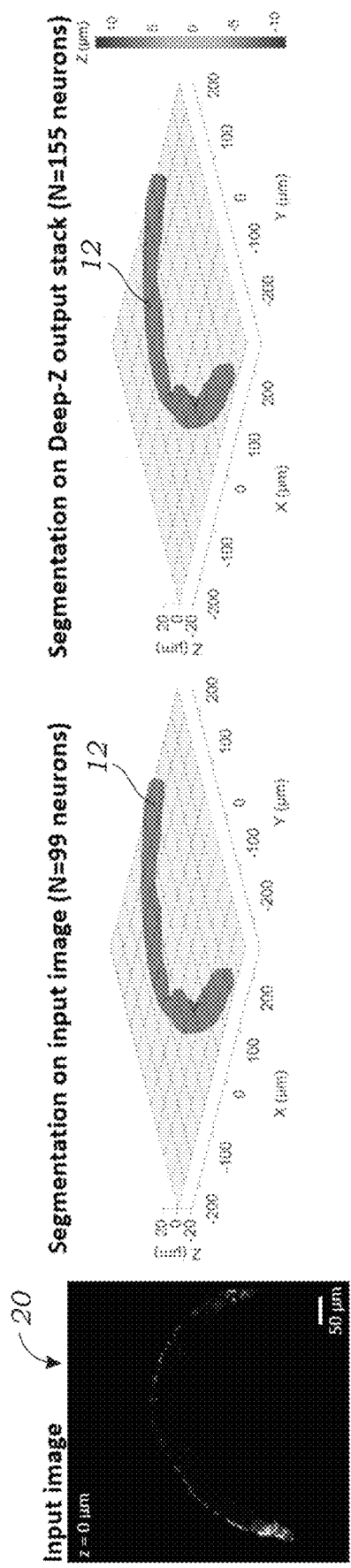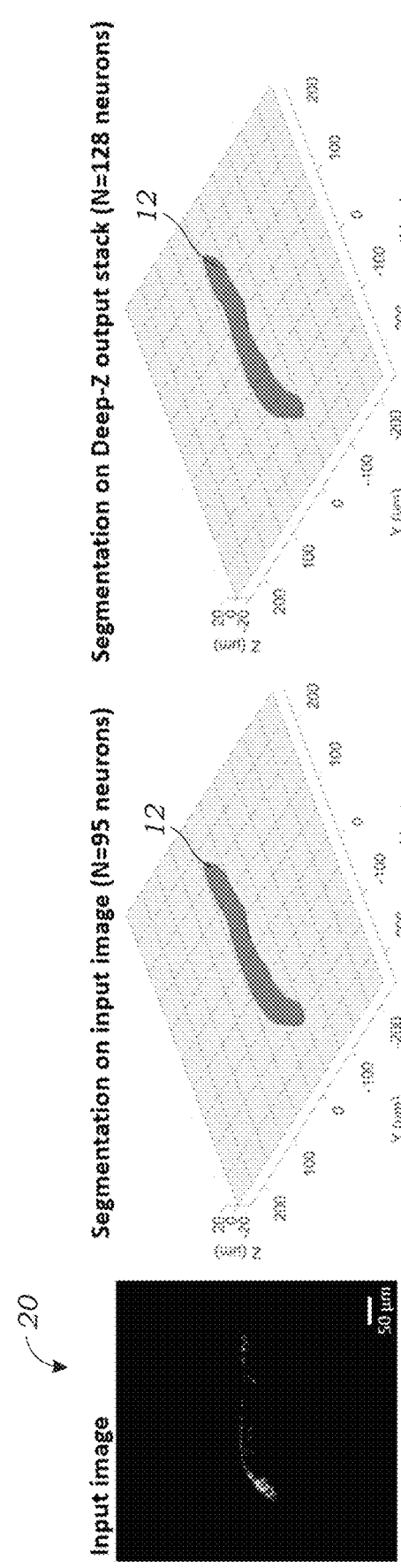
FIG. 20A  FIG. 20B  FIG. 20C
FIG. 20D  FIG. 20E  FIG. 20F

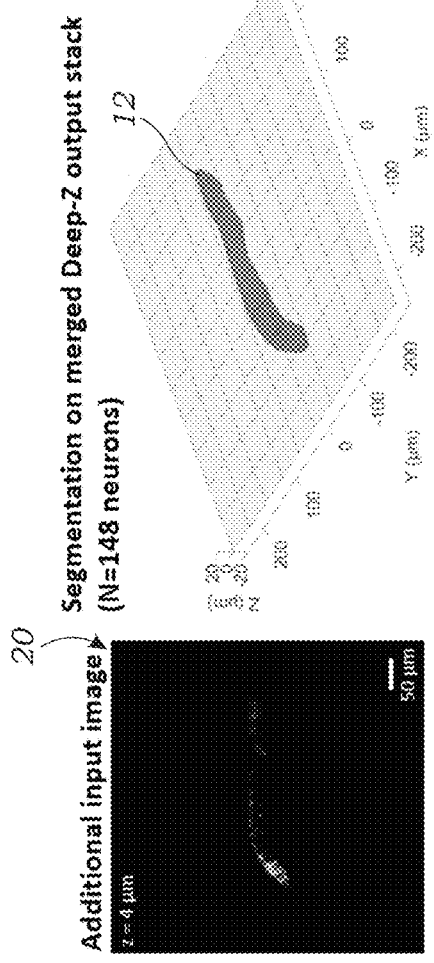
FIG. 20G
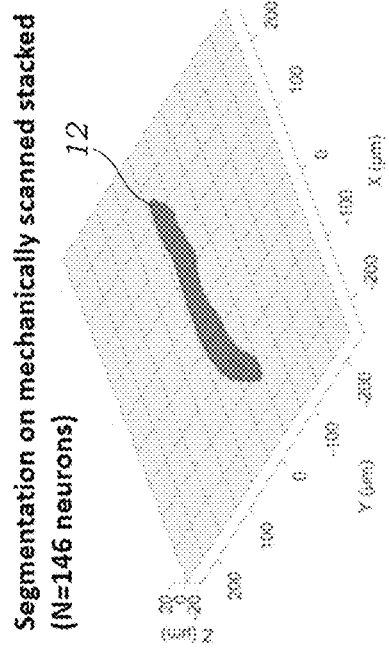
FIG. 20H
FIG. 20I
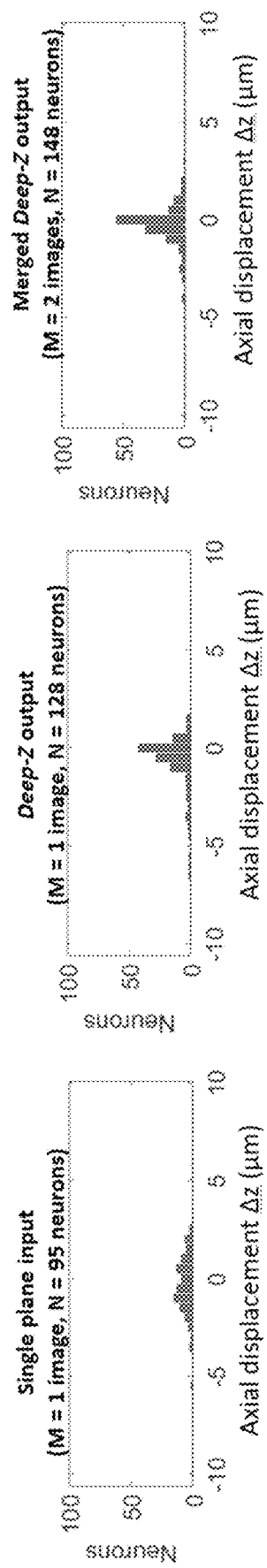
FIG. 20J
FIG. 20K
FIG. 20L

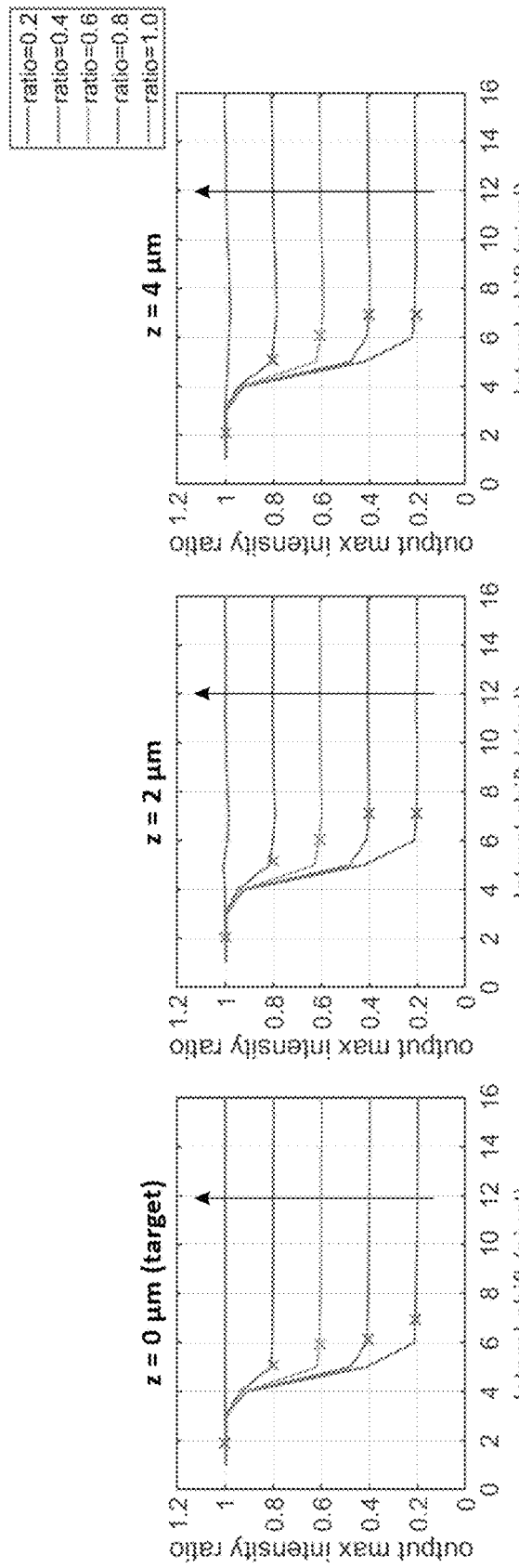

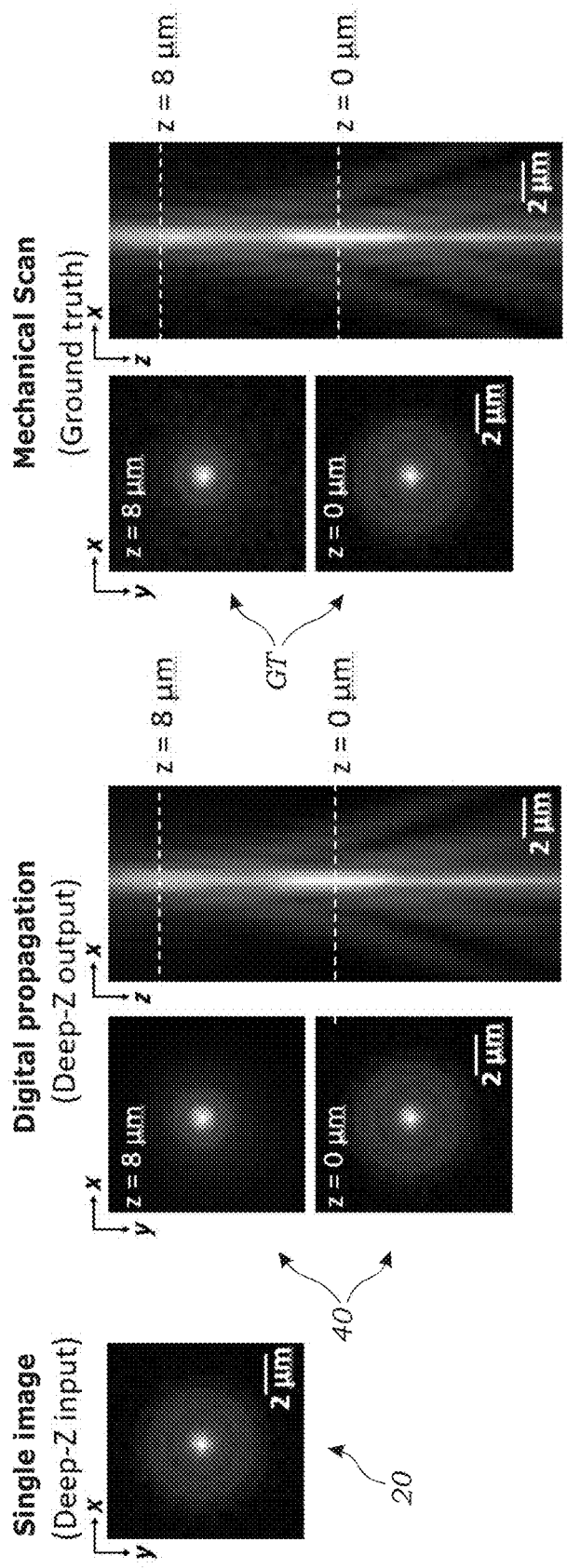
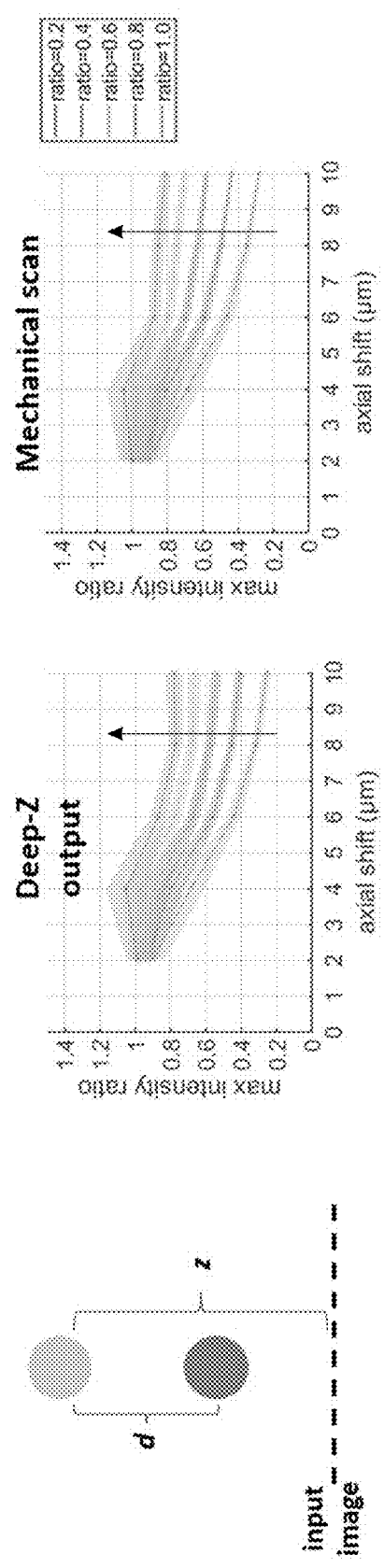
FIG. 22A
FIG. 22B
FIG. 22C
FIG. 22D

SYSTEMS AND METHODS FOR TWO-DIMENSIONAL FLUORESCENCE WAVE PROPAGATION ONTO SURFACES USING DEEP LEARNING

RELATED APPLICATIONS

This Application is a U.S. National Stage filing under 35 U.S.C. § 371 of International Application No. PCT/US2019/068347, filed Dec. 23, 2019, which claims priority to U.S. Provisional Patent Application Nos. 62/912,537 filed on Oct. 8, 2019 and 62/785,012 filed on Dec. 26, 2018, which are hereby incorporated by reference. Priority is claimed pursuant to 35 U.S.C. §§ 119, 371 and any other applicable statute.

TECHNICAL FIELD

The technical field generally relates to the systems and methods for obtaining fluorescence images of a sample or objects. More particularly, the technical field relates to fluorescence microscopy that uses a digital image propagation framework by training a deep neural network that inherently learns the physical laws governing fluorescence wave propagation and time-reversal using microscopic image data, to virtually refocus 2D fluorescence images onto user-defined 3D surfaces within the sample, enabling three-dimensional (3D) imaging of fluorescent samples using a single two-dimensional (2D) image, without any mechanical scanning or additional hardware. The framework can also be used to correct for sample drift, tilt, and other aberrations, all digitally performed after the acquisition of a single fluorescence image. This framework also cross-connects different imaging modalities to each other, enabling 3D refocusing of a single wide-field fluorescence image to match confocal microscopy images acquired at different sample planes.

BACKGROUND

Three-dimensional (3D) fluorescence microscopic imaging is essential for biomedical and physical sciences as well as engineering, covering various applications. Despite its broad importance, high-throughput acquisition of fluorescence image data for a 3D sample remains a challenge in microscopy research. 3D fluorescence information is usually acquired through scanning across the sample volume, where several 2D fluorescence images/measurements are obtained, one for each focal plane or point in 3D, which forms the basis of e.g., confocal, two-photon, light-sheet, or various super-resolution microscopy techniques. However, because scanning is used, the image acquisition speed and the throughput of the system for volumetric samples are limited to a fraction of the frame-rate of the camera/detector, even with optimized scanning strategies or point-spread function (PSF) engineering. Moreover, because the images at different sample planes/points are not acquired simultaneously, the temporal variations of the sample fluorescence can inevitably cause image artifacts. Another concern is the phototoxicity of illumination and photobleaching of fluorescence since portions of the sample can be repeatedly excited during the scanning process.

To overcome some of these challenges, non-scanning 3D fluorescence microscopy methods have also been developed, so that the entire 3D volume of the sample can be imaged at the same speed as the detector framerate. One of these methods is fluorescence light-field microscopy. This system typically uses an additional micro-lens array to encode the 2D angular information as well as the 2D spatial information of the sample light rays into image sensor pixels; then a 3D focal stack of images can be digitally reconstructed from this recorded 4D light-field. However, using a micro-lens array reduces the spatial sampling rate which results in a sacrifice of both the lateral and axial resolution of the microscope. Although the image resolution can be improved by 3D deconvolution or compressive sensing techniques, the success of these methods depends on various assumptions regarding the sample and the forward model of the image formation process. Furthermore, these computational approaches are relatively time-consuming as they involve an iterative hyperparameter tuning as part of the image reconstruction process. A related method termed multi-focal microscopy has also been developed to map the depth information of the sample onto different parallel locations within a single image. However, the improved 3D imaging speed of this method also comes at the cost of reduced imaging resolution or field-of-view (FOV) and can only infer an experimentally pre-defined (fixed) set of focal planes within the sample volume. As another alternative, the fluorescence signal can also be optically correlated to form a Fresnel correlation hologram, encoding the 3D sample information in interference patterns. To retrieve the missing phase information, this computational approach requires multiple images to be captured for volumetric imaging of a sample. Quite importantly, all these methods summarized above, and many others, require the addition of customized optical components and hardware into a standard fluorescence microscope, potentially needing extensive alignment and calibration procedures, which not only increase the cost and complexity of the optical set-up, but also cause potential aberrations and reduced photon-efficiency for the fluorescence signal.

SUMMARY

Here, a digital image propagation system and method in fluorescence microscopy is disclosed that trains a deep neural network that inherently learns the physical laws governing fluorescence wave propagation and time-reversal using microscopic image data, enabling 3D imaging of fluorescent samples using a single 2D image, without any mechanical scanning or additional hardware. In one embodiment, a deep convolutional neural network is trained to virtually refocus a 2D fluorescence image onto user-defined or automatically generated surfaces (2D or 3D) within the sample volume. Bridging the gap between coherent and incoherent microscopes, this data-driven fluorescence image propagation framework does not need a physical model of the imaging system, and rapidly propagates a single 2D fluorescence image onto user-defined or automatically generated surfaces without iterative searches or parameter estimates. In addition to rapid 3D imaging of a fluorescent sample volume, it can also be used to digitally correct for various optical aberrations due to the sample and/or the optical system. This deep learning-based approach is referred to herein sometimes as "Deep-Z" or "Deep-Z+" and it is used to computationally refocus a single 2D wide-field fluorescence image (or other image acquired using a spatially engineered point spread function) onto 2D or 3D surfaces within the sample volume, without sacrificing the imaging speed, spatial resolution, field-of-view, or throughput of a standard fluorescence microscope. The method may also be used with multiple 2D wide-field fluorescence images which may be used to create a sequence of images over time (e.g., a movie or time-lapse video clip).

With this data-driven computational microscopy Deep-Z framework, the framework was tested by imaging the neuron activity of a *Caenorhabditis elegans* worm in 3D using a time-sequence of fluorescence images acquired at a single focal plane, digitally increasing the depth-of-field of the microscope by 20-fold without any axial scanning, additional hardware, or a trade-off of imaging resolution or speed. Furthermore, this learning-based approach can correct for sample drift, tilt, and other image or optical aberrations, all digitally performed after the acquisition of a single fluorescence image. This unique framework also cross-connects different imaging modalities to each other, enabling 3D refocusing of a single wide-field fluorescence image to match confocal microscopy images acquired at different sample planes. This deep learning-based 3D image refocusing method is transformative for imaging and tracking of 3D biological samples, especially over extended periods of time, mitigating phototoxicity, sample drift, aberration and defocusing related challenges associated with standard 3D fluorescence microscopy techniques.

In one embodiment, a fluorescence microscopy method includes providing a trained deep neural network that is executed by software using one or more processors. At least one two-dimensional fluorescence microscopy input image of a sample is input to the trained deep neural network wherein each input image is appended with or otherwise associated with one or more user-defined or automatically generated surfaces. In one particular embodiment, the image is appended with a digital propagation matrix (DPM) that represents, pixel-by-pixel, an axial distance of a user-defined or automatically generated surface within the sample from a plane of the input image. One or more fluorescence output image(s) of the sample is/are generated or output by the trained deep neural network that is digitally propagated or refocused to the user-defined or automatically generated surface as established or defined by, for example, the DPM.

In one embodiment, a time sequence of two-dimensional fluorescence microscopy input images of a sample are input to the trained deep neural network, wherein each image is appended with a digital propagation matrix (DPM) that represent, pixel-by-pixel, an axial distance of a user-defined or automatically generated surface within the sample from a plane of the input image and wherein a time sequence of fluorescence output images of the sample (e.g., a time-lapse video or movie) is output from the trained deep neural network that is digitally propagated or refocused to the user-defined or automatically generated surface(s) corresponding to the DPM of the input images.

In another embodiment, a system for outputting fluorescence microscopy images comprising a computing device having image processing software executed thereon, the image processing software comprising a trained deep neural network that is executed using one or more processors of the computing device, wherein the trained deep neural network is trained using matched pairs of (1) a plurality of fluorescence images axially-focused at different depths and appended with different DPMs (each of which represents, pixel-by-pixel, an axial distance of a user-defined or automatically generated surface within the sample from a plane of the input image), and (2) corresponding ground truth fluorescence images captured at the correct/target focus depth defined by the corresponding DPM which are used to establish parameters for the deep neural network, the image processing software configured to receive one or more two-dimensional fluorescence microscopy input images of a sample and one or more user-defined or automatically generated surfaces that are appended to or otherwise associated with the image(s). For example, each image may be appended with a DPM. The system outputs a fluorescence output image (or multiple images in the form of a movie or time-lapse video clip) of the sample from the trained deep neural network that is digitally propagated or refocused to the one or more user-defined or automatically generated surfaces as established by, for example, the DPM(s).

In one embodiment, the trained deep neural network is trained with a generative adversarial network (GAN) using matched pairs of: (1) a plurality of fluorescence images of a first microscope modality axially-focused at different depths and appended with different DPMs, and (2) corresponding ground truth fluorescence images captured by a second, different microscope modality at a correct/target focus depth defined by the corresponding DPM.

In one embodiment, the fluorescence microscope that is used to obtain the two-dimensional images may include within the optical setup hardware modifications to create a spatially engineered point spread function (PSF) in the axial direction (z direction). This may include, for example, phase and/or amplitude masks located along the optical path (axial direction). A double-helix PSF is one exemplary engineered PSF. In addition, the fluorescence microscope may include a wide-field fluorescence microscope. It may also include a light sheet system. In other embodiments, the input image to a trained deep neural network or training images for the deep neural network are obtained by using one of the following types of microscopes: a super-resolution microscope, a confocal microscope, a confocal microscope with single photon or multi-photon excited fluorescence, a second harmonic or high harmonic generation fluorescence microscope, a light-sheet microscope, a structured illumination microscope, a computational microscope, a ptychographic microscope.

BRIEF DESCRIPTION OF THE DRAWINGS

FIG. 5A illustrates the measurement of a tilted fluorescent sample (300 nm beads).

FIG. 5B illustrates the corresponding DPM for the tilted plane of FIG. 5A.

FIG. 5C illustrates an image of the measured raw fluorescence image; the left and right parts are out-of-focus in different directions, due to the sample tilt.

FIG. 5D illustrates the Deep-Z network output image that rapidly brings all the regions into correct focus.

FIGS. 5E and 5F illustrate the lateral FWHM values of the nano-beads shown in FIGS. 5C and 5D, respectively, clearly demonstrating that the Deep-Z network with the non-uniform DPM of FIG. 5B brought the out-of-focus particles into focus.

FIG. 5G illustrates the measurement of a cylindrical surface with fluorescent beads (300 nm beads).

FIG. 5H illustrates the corresponding DPM for the curved surface of FIG. 5G.

FIG. 5I illustrates an image of the measured raw fluorescence image; the middle region and the edges are out-of-focus due to the curvature of the sample.

FIG. 5J illustrates the Deep-Z network output image that rapidly brings all the regions into correct focus.

FIGS. 5K and 5L illustrate the lateral FWHM values of the nano-beads shown in FIGS. 5I, 5J, respectively, clearly demonstrating that Deep-Z with the non-uniform DPM brought the out-of-focus particles into focus.

FIGS. 9A-9T illustrate digital refocusing of fluorescence images of C. elegans worms along with corresponding ground truth (GT) images. FIGS. 9A and 9K illustrate measured fluorescence images (Deep-Z input). FIGS. 9B, 9D, 9L, 9N illustrate the Deep-Z network output images at different target heights (z). FIGS. 9C, 9E, 9M, and 9O illustrate ground truth (GT) images, captured using a mechanical axial scanning microscope at the same heights as the Deep-Z outputs. FIGS. 9F and 9P illustrate overlay images of Deep-Z output images in and GT images. FIGS. 9G, 9I, 9Q, and 9S illustrate absolute difference images of Deep-Z output images and the corresponding GT images at the same heights. FIGS. 9H, 9J, 9R, and 9T illustrate absolute difference images of Deep-Z input and the corresponding GT images. Structural similarity index (SSIM) and root mean square error (RMSE) were calculated for the output vs. GT and the input vs. GT for each region, displayed in FIGS. 9G, 9I, 9Q, 9S and FIGS. 9H, 9J, 9R, 9T, respectively. Scale bar: 25 µm.

—FIG. 13C), structural similarity index (SSIM—FIG. 13D), mean absolute error (MAE—FIG. 13E) and mean square error (MSE—FIG. 13F) were used to compare Deep-Z output images against the ground truth images at the same 3D sinusoidal surfaces defined by the corresponding DPMs, with varying periods from 0.65 µm to 170 µm along the x-axis. Reliable Deep-Z focusing onto sinusoidal 3D surfaces can be achieved for lateral modulation periods greater than ~32 µm (corresponding to ~100 pixels), as marked by the arrows in FIGS. 13C-13F. The same conclusion is also confirmed by the results and spatial frequency analysis reported in FIG. 13B.

FIG. 15A schematically illustrates the registration (in the lateral direction) of a wide-field fluorescence z-stack against a confocal z-stack. Both the wide-field and the confocal z-stacks were first self-aligned and extended depth of field (EDF) images were calculated for each stack. The EDF images were stitched spatially and the stitched EDF images from wide-field were aligned to those of confocal microscopy images. The spatial transformations, from stitching to the EDF alignment, were used as consecutive transformations to associate the wide-field stack to the confocal stack. Non-empty wide-field ROIs of 256×256 pixels and the corresponding confocal ROIs were cropped from the EDF image, which were further aligned.

FIG. 15B illustrates an example image showing an overlay of the registered image pair, with wide-field image.

FIG. 15C illustrates focus curves in the wide-field stack and the confocal stack that were calculated and compared based on the corresponding SSIM values and used to align the wide-field and confocal stacks in the axial direction.

FIGS. 20A-20L illustrate C. elegans neuron segmentation comparison using the Deep Z network (and merged) with mechanical scanning. FIGS. 20A, 20D are the fluorescence images used as input to Deep-Z, FIGS. 20B and 20E are the segmentation results based on FIGS. 20A, 20D, respectively. FIGS. 20C and 20F are the segmentation results based on the virtual image stack (−10 to 10 μm) generated by Deep-Z using the input images in FIGS. 20A, 20D, respectively. FIG. 20G is an additional fluorescence image, captured at a different axial plane (z=4 μm). FIG. 20H is the segmentation results on the merged virtual stack (−10 to 10 μm). The merged image stack was generated by blending the two virtual stacks generated by Deep-Z using the input images of FIGS. 20D and 20G. FIG. 20I is the segmentation results based on the mechanically-scanned image stack used as ground truth (acquired at 41 depths with 0.5 μm axial spacing). Each neuron was represented by a small sphere in the segmentation map and the depth information of each neuron was color-coded. FIGS. 20J-20L show the detected neuron positions in FIGS. 20E, 20F, 20H compared with the positions in FIG. 20I, and the axial displacement histograms between the Deep-Z results and the mechanically-scanned ground truth results were plotted.

FIGS. 21A-21H show the Deep-Z-based virtual refocusing of a laterally shifted weaker fluorescent object next to a stronger object. FIG. 21A shows a defocused experimental image (left bead) at plane z was shifted laterally by d pixels to the right and digitally weakened by a pre-determined ratio (right bead), which was then added back to the original image, used as the input image to Deep-Z. Scale bar: 5 μm. FIG. 21B is an example of the generated bead pair with an intensity ratio of 0.2; showing in-focus plane, defocused planes of 4 and 10 μm, and the corresponding virtually-refocused images by Deep-Z. FIGS. 21C-21H are graphs of the average intensity ratio of the shifted and weakened bead signal with respect to the original bead signal for 144 bead pairs inside a FOV, calculated at the virtually refocused plane using different axial defocus distances (z). The crosses "x" in each FIG. mark the corresponding lateral shift distance, below which the two beads cannot be distinguished from each other, coded to represent bead signal intensity ratio (spanning 0.2-1.0). Arrows shows direction of increasing signal intensity ratio values corresponding to legend.

FIGS. 22A-22D illustrate the impact of axial occlusions on Deep-Z virtual refocusing performance. FIG. 22B is a 3D virtual refocusing of two beads that have identical lateral positions but are separated axially by 8 µm; Deep-Z, as usual, used a single 2D input image corresponding to the defocused image of the overlapping beads. The virtual refocusing calculated by Deep-Z exhibits two maxima representing the two beads along the z-axis, matching the simulated ground truth image stack. FIG. 22B shows a simulation schematic: two defocused images in the same bead image stack with a spacing of d was added together, with the higher stack located at a depth of z=8 µm. A single image in the merged image stack was used as the input to Deep-Z for virtual refocusing. FIGS. 22C-22D report the average and the standard deviation (represented by background range) of the intensity ratio of the top (i.e., the dimmer) bead signal with respect to the bead intensity in the original stack, calculated for 144 bead pairs inside a FOV, for z=8 µm with different axial separations and bead intensity ratios (spanning 0.2-1.0). Arrows shows direction of increasing signal intensity ratio values corresponding to legend.

FIG. 13A shows a comparison of Deep-Z inference against a mechanically-scanned ground truth image stack over an axial depth of +/−10 µm with increasing fluorescent bead concentration. The measured bead concentration resulting from the Deep-Z output (using a single input image) as well as the mechanically-scanned ground truth (which includes 41 axial images acquired at a scanning step size of 0.5 µm) is shown on the top left corner of each image. MIP: maximal intensity projection along the axial direction. Scale bar: 30 µm. FIGS. 23B-23E illustrate a comparison of Deep-Z output against the ground truth results as a function of the increasing bead concentration. The solid line is a $2^{nd}$ order polynomial fit to all the data points. The dotted line represents y=x, shown for reference. These particle concentrations were calculated/measured over a FOV of 1536×1536 pixels (500×500 µm$^2$), i.e. 15-times larger than the specific regions shown in FIG. 23A.

DETAILED DESCRIPTION OF ILLUSTRATED EMBODIMENTS

Figure 1:
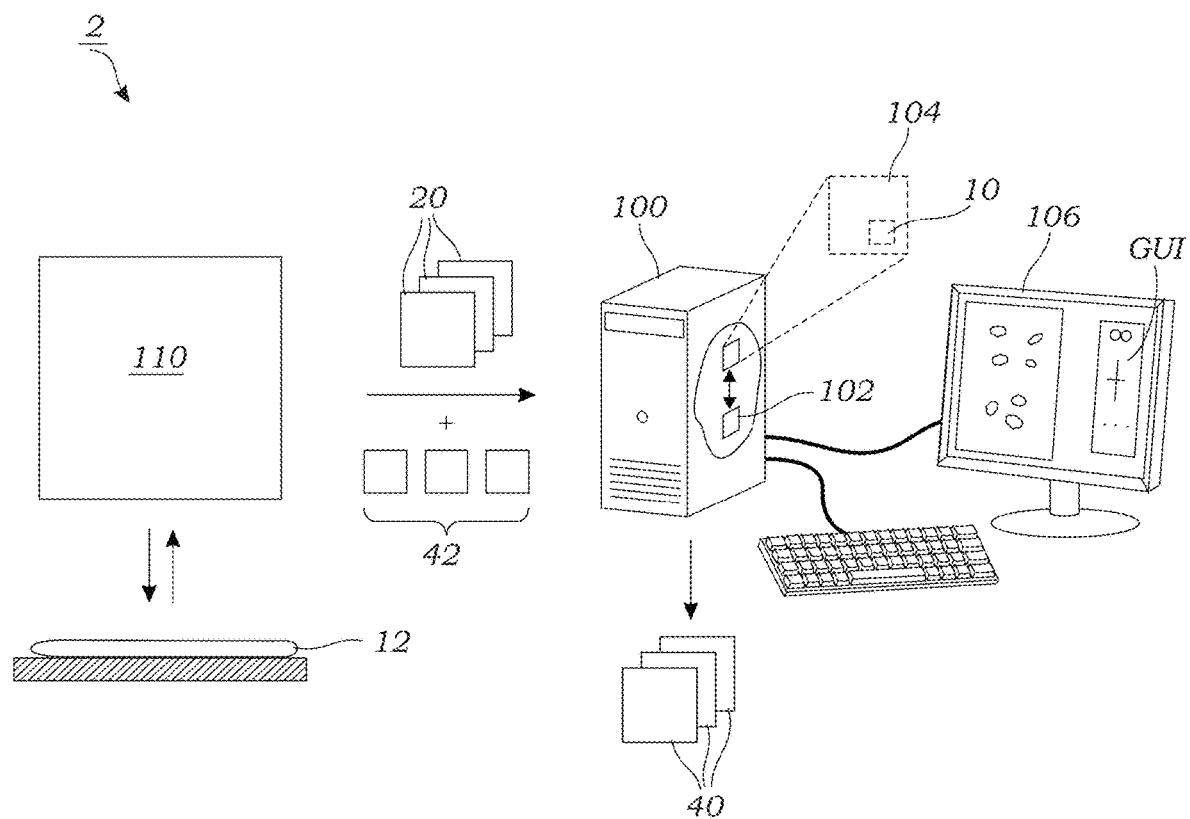
FIG. 1 illustrates one embodiment of a system that uses a trained deep neural network to generate one or more fluorescence output image(s) of the sample that is digitally propagated (refocused) to the user-defined or automatically generated surface. The system obtains one or more two-dimensional fluorescence images which are input to the trained deep neural network. The trained deep neural network then outputs digitally propagated (refocused) image(s) to user-defined or automatically generated surface(s) including three-dimensional surfaces.

FIG. 1 illustrates one embodiment of a system 2 that uses a trained deep neural network 10 to generate one or more fluorescence output image(s) 40 of a sample 12 (or object(s) in the sample 12) that is digitally propagated to one or more user-defined or automatically generated surface(s). The system 2 includes a computing device 100 that contains one or more processors 102 therein and image processing software 104 that incorporates the trained deep neural network 10. The computing device 100 may include, as explained herein, a personal computer, laptop, tablet PC, remote server, application-specific integrated circuit (ASIC), or the like, although other computing devices may be used (e.g., devices that incorporate one or more graphic processing units (GPUs)).

In some embodiments, a series or time sequence of output images 40 are generated, e.g., a time-lapse video clip or movie of the sample 12 or objects therein. The trained deep neural network 10 receives one or more fluorescence microscopy input image(s) 20 (e.g., multiple images taken at different times) of the sample 12. The sample 12 may include, by way of illustration and not limitation, a pathological slide, biopsy, bodily fluid, organism (living or fixed), cell(s) (living or fixed), tissue (living or fixed), cellular or sub-cellular feature, fluid or liquid sample containing organisms or other microscopic objects. In one embodiment, the sample 12 may be label-free and the fluorescent light that is emitted from the sample 12 is emitted from endogenous fluorophores or other endogenous emitters of frequency-shifted light within the sample 12 (e.g., autofluorescence). In another embodiment, the sample 12 is labeled with one or more exogenous fluorescent labels or other exogenous emitters of light. Combinations of the two are also contemplated.

The one or more input image(s) 20 is/are obtained using an imaging device 110, for example, a fluorescence microscope device 110. In some embodiments, the imaging device 110 may include wide-field fluorescence microscope 110 that provides an input image 20 over and extended field-of view (FOV). The trained deep neural network 10 outputs or generates one or more fluorescence output image(s) 40 that is/are digitally propagated to a user-defined or automatically generated surface 42 (as established by the digital propagation matrix (DPM) or other appended data structure). The user-defined or automatically generated surface 42 may include a two-dimensional (2D) surface or a three-dimensional (3D) surface. For example, this may include, a plane at different axial depths within the sample 12. The user-defined or automatically generated surface 42 may also include a curved or other 3D surface. In some embodiments, the user-defined or automatically generated surface 42 may be a surface that corrects for sample tilt (e.g., tilted plane), curvature, or other optical aberrations. The user-defined or automatically generated surface 42, which as explained herein may include a DPM, is appended to (e.g., through a concatenation operation) or otherwise associated with the input image(s) 20 that is/are input to the trained deep neural network 10. The trained deep neural network 10 outputs the output image(s) 40 at the user-defined or automatically generated surface 42.

The input image(s) 20 to the trained deep neural network 10 in some embodiments, may have the same or substantially similar numerical aperture and resolution as the ground truth (GT) images used to train the deep neural network 10. In other embodiments, the input image(s) may have a lower numerical aperture and poorer resolution compared to the ground truth (GT) images. In this later embodiment, the trained deep neural network 10 performs both virtual refocusing and improving the resolution (e.g., super-resolutions) of the input image(s) 20. This additional functionality is imparted to the deep neural network 10 by training the same to increase or improve the resolution of the input image(s) 20.

In other embodiments, multiple user-defined or automatically generated surfaces 42 may be combined to create a volumetric (3D) image of the sample 12 using a plurality of output images 40. Thus, a stack of output images 40 generated using the trained deep neural network 10 may be merged or combined to create a volumetric image of the sample 12. The volumetric image may also be generated as a function of time, e.g., a volumetric movie or time-lapse video clip that shows movement over time. In a similar fashion, multiple user-defined or automatically generated surfaces 42 may be used to create an output image with an extended depth of field (EDOF) that extends the depth of field of the microscope 110 used to generate the input image 20. In this option a plurality of output images 40 using a plurality of DPMs 42 are digitally combined to create and EDOF image of the sample 12. In a related embodiment, at least one output image 40 using one or more DPMs 42 are used to create an improved-focus image of the sample 12.

In one particular embodiment, the output image(s) 40 generated by the trained deep neural network 10 are of the same imaging modality of used to generate the input image 20. For example, if a fluorescence microscope 110 was used to obtain the input image(s) 20, the output image(s) 40 would also appear to be obtained from the same type of fluorescence microscope 110, albeit refocused to the user-defined or automatically generated surface 42. In another embodiment, the output image(s) 40 generated by the trained deep neural network 10 are of a different imaging modality of used to generate the input image 20. For example, if a wide-field fluorescence microscope 110 was used to obtain the input image(s) 20, the output image(s) 40 may appear to be obtained from a confocal microscope and refocused to the user-defined or automatically generated surface 42.

Figure 14:
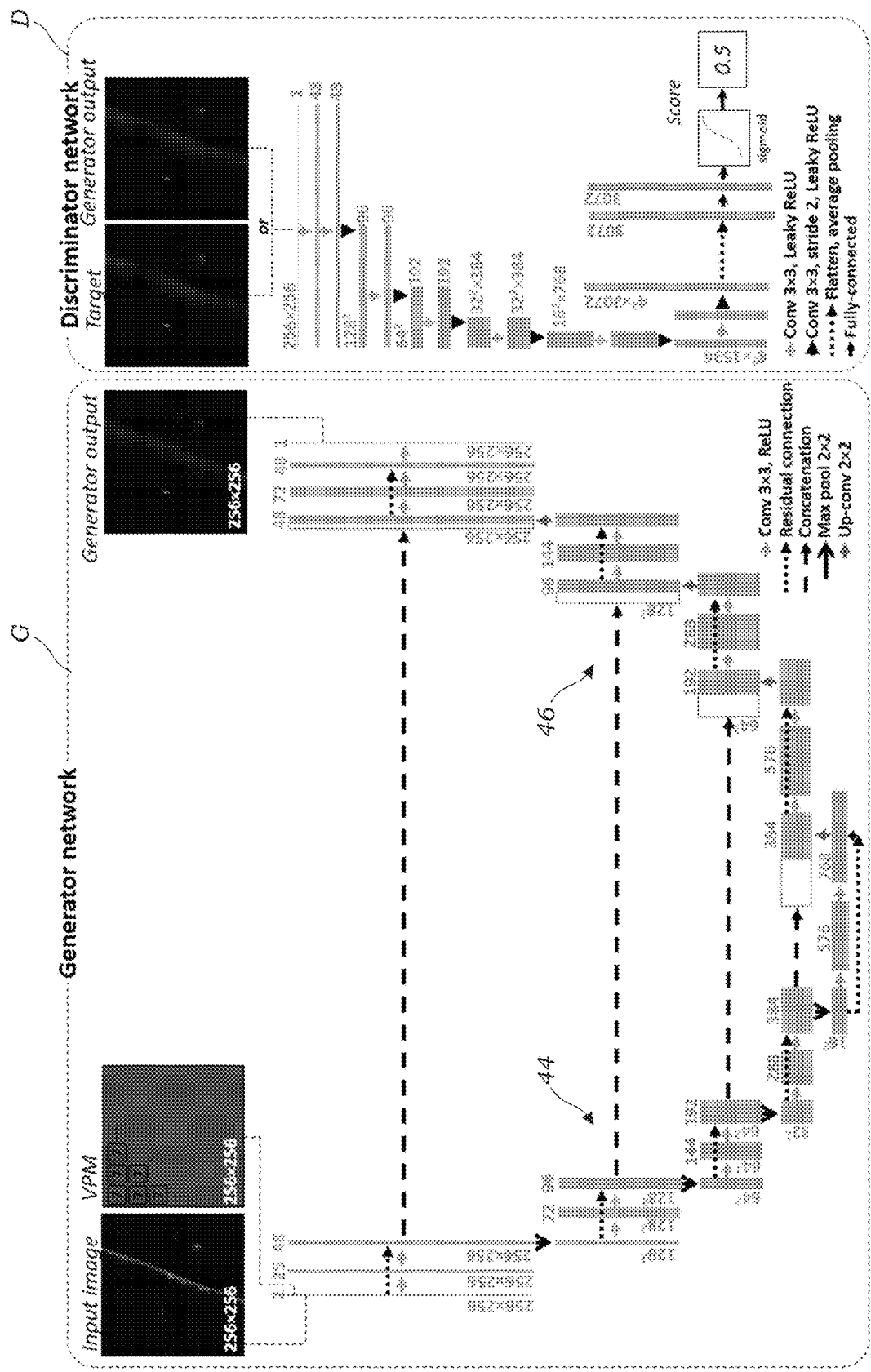
FIG. 14 illustrates the generator and discriminator network structures used in Deep-Z according to one embodiment. ReLU: rectified linear unit. Conv: convolutional layer.

In one preferred embodiment, the trained deep neural network 10 is trained as a generative adversarial network (GAN) and includes two parts: a generator network (G) and a discriminator network (D) as seen in FIG. 14. The generator network (G), includes down-sampling path 44 and a symmetric up-sampling path 46. In the down-sampling path 44, there are five down-sampling blocks in one particular implementation. Each block in the down-sampling path 44 contains two convolution layers that map an input tensor to an output tensor. The fifth down-sampling block in the down-sampling path 44 connects to the up-sampling path 46. The up-sampling path 46 includes, in one embodiment, four up-sampling blocks each of which contains two convolutional layers that map the input tensor to the output tensor. The connection between consecutive up-sampling blocks is an up-convolution (convolution transpose) block that up-samples the image pixels by 2×. The last block is a convolutional layer that maps the channels (in one embodiment as described herein forty-eight (48)) to one output channel.

The discriminator network (D) is a convolutional neural network that consists of six consecutive convolutional blocks, each of which maps the input tensor to the output tensor. After the last convolutional block, an average pooling layer flattens the output and reduces the number of parameters as explained herein. Subsequently there are fully-connected (FC) layers of size 3072×3072 with LReLU activation functions, and another FC layer of size 3072×1 with a Sigmoid activation function. The final output represents the score of the Discriminator (D), which falls within (0, 1), where 0 represents a false and 1 represents a true label. During training, the weights are initialized (e.g., using the Xavier initializer), and the biases are initialized to 0.1.

The trained deep neural network 10 is executed using the image processing software 104 that incorporates the trained deep neural network 10 and is executed using a computing device 100. As explained herein, the image processing software 104 can be implemented using any number of software packages and platforms. For example, the trained deep neural network 10 may be implemented using Tensor-Flow although other programming languages may be used (e.g., Python, C++, etc.). The invention is not limited to a particular software platform.

The fluorescence output image(s) 40 may be displayed on a display 106 associated with the computing device 100, but it should be appreciated the image(s) 40 may be displayed on any suitable display (e.g., computer monitor, tablet computer, mobile computing device, etc.). Input images 20 may also optionally be displayed with the one or more output image(s) 40. The display 106 may include a graphical user interface (GUI) or the like that enables the user to interact with various parameters of the system 2. For example, the GUI may enable to the user to define or select certain time sequences of images to present on the display 106. The GUI may thus include common movie-maker tools that allow the user to clip or edit a sequence of images 40 to create a movie or time-lapse video clip. The GUI may also allow the user to easily define the particular user-defined surface(s) 42. For example, the GUI may include a knob, slide bar, or the like that allows the user to define the depth of a particular plane or other surface within the sample 12. The GUI may also have a number of pre-defined or arbitrary user-defined or automatically generated surfaces 42 that the user may choose from. These may include planes at different depths, planes at different cross-sections, planes at different tilts, curved or other 3D surfaces that are selected using the GUI. This may also include a depth range within the sample 12 (e.g., a volumetric region in the sample 12). The GUI tools may permit the user to easily scan along the depth of the sample 12. The GUI may also provide various options to augment or adjust the output image(s) 40 including rotation, tilt-correction, and the like. In one preferred embodiment, the user-defined or automatically generated surfaces 42 are formed as a digital propagation matrix (DPM) 42 that represents, pixel-by-pixel, the axial distance of the desired or target surface from the plane of the input image 20. In other embodiments, the image processing software 104 may suggest or provide one or more user-defined or automatically generated surfaces 42 (e.g., DPMs). For example, the image processing software 104 may automatically generate one or more DPMs 42 that correct for one or more optical aberrations. This may include aberrations such as sample drift, tilt and spherical aberrations. Thus, the DPM(s) 42 may be automatically generated by an algorithm implemented in the image processing software 104. Such an algorithm, which may be implemented using a separate trained neural network or software, may operate by having an initial guess with a surface or DPM 42 that is input with a fluorescence image 20. The result of the network or software output is analyzed according to a metric (e.g., sharpness or contrast). The result is then used to generate a new surface of DPM 42 that is input with a fluorescence image 20 and analyzed as noted above until the result has converged on a satisfactory result (e.g., sufficient sharpness or contrast has been achieved or a maximum result obtained). The image processing software 104 may use a greedy algorithm to identify these DPMs 42 based, for example, on a surface that maximizes sharpness and/or contrast in the image. An important point is that these corrections take place offline and not while the sample 12 is being imaged.

The GUI may provide the user the ability to watch selected movie clips or time-lapse videos of one or more moving or motile objects in the sample 12. In one particular embodiment, simultaneous movie clips or time-lapse videos may be shown on the display 106 with each at different focal depths. As explained herein, this capability of the system 2 eliminates the need for mechanical axial scanning and related optical hardware but also significantly reduces phototoxicity or photobleaching within the sample to enable longitudinal experiments (e.g., enables a reduction of photon dose or light exposure to the sample 12). In addition, the virtually created time-lapse videos/movie clips are temporally synchronized to each other (i.e., the image frames 40 at different depths have identical time stamps) something that is not possible with scanning-based 3D imaging systems due to the unavoidable time delay between successive measurements of different parts of the sample volume.

In one embodiment, the system 2 may output image(s) 40 in substantially real-time with the input image(s) 20. That is to say, the acquired input image(s) 20 are input to the trained deep neural network 10 along with the user-defined or automatically generated surface(s) and the output image(s) 40 are generated or output in substantially real-time. In another embodiment, the input image(s) 20 may be obtained with the fluorescence microscope device 110 and then stored in a memory or local storage device (e.g., hard drive or solid-state drive) which can then be run through the trained deep neural network 10 at the convenience of the operator.

The input image(s) 20 (in addition to training images) obtained by the microscope device 110 may be obtained or acquired using a number of different types of microscopes 110. This includes: a super-resolution microscope, a confocal microscope, a confocal microscope with single photon or multi-photon excited fluorescence, a second harmonic or high harmonic generation fluorescence microscope, a light-sheet microscope, a structured illumination microscope, a computational microscope, a ptychographic microscope.

Experimental

In the Deep-Z system 2 described herein, an input 2D fluorescence image 20 (to be digitally refocused onto a 3D surface within the volume of the sample 12) is first appended with a user-defined surface 42 in the form of a digital propagation matrix (DPM) that represents, pixel-by-pixel, the axial distance of the target surface from the plane of the input image as seen in FIGS. 1 and 2. The Deep-Z image processing software 104 includes a trained deep neural network 10 that is trained using a conditional generative adversarial neural network (GAN) using accurately matched pairs of (1) various fluorescence images axially-focused at different depths and appended with different DPMs, and (2) the corresponding fluorescence images (i.e., the ground truth (GT) labels) captured at the correct/target focus plane defined by the corresponding DPM. Through this training process that only uses experimental image data without any assumptions or physical models, the generator network of GAN-based trained deep neural network 10 learns to interpret the values of each DPM pixel as an axial refocusing distance, and outputs an equivalent fluorescence image 40 that is digitally refocused within the sample 12 volume to the 3D surface defined by the user (i.e., the DPM or other user-defined or automatically generated surface 42), where some parts of the sample are focused, while some other parts get out-of-focus, according to their true axial positions with respect to the target surface.

To demonstrate the success of this unique fluorescence digital refocusing system 2, *Caenorhabditis elegans* (*C. elegans*) neurons were imaged using a standard wide-field fluorescence microscope with a 20×/0.75 numerical aperture (NA) objective lens, and extended the native depth-of-field (DOF) of this objective (~1 μm) by ~20-fold, where a single 2D fluorescence image was axially refocused using the trained deep neural network 10 to $\Delta z = \pm 10$ μm with respect to its focus plane, providing a very good match to the fluorescence images acquired by mechanically scanning the sample within the same axial range. Similar results were also obtained using a higher NA objective lens (40×/1.3 NA). Using this deep learning-based fluorescence image refocusing system 2, 3D tracking of the neuron activity of a *C. elegans* worm was further demonstrated over an extended DOF of ±10 μm using a time-sequence of fluorescence images acquired at a single focal plane. Thus, a time-series of input images 20 of a sample 12 (or objects within the sample 12) can be used to generate a time-lapse video or movie for 2D and/or 3D tracking over time.

Furthermore, to highlight some of the additional degrees-of-freedom enabled by the system 2, spatially non-uniform DPMs 42 were used to refocus a 2D input fluorescence image onto user-defined 3D surfaces to computationally correct for aberrations such as sample drift, tilt and spherical aberrations, all performed after the fluorescence image acquisition and without any modifications to the optical hardware of a standard wide-field fluorescence microscope.

Another important feature of the system 2 is that it permits cross-modality digital refocusing of fluorescence images 20, where the trained deep neural network 10 is trained with gold standard label images obtained by a different fluorescence microscopy 110 modality to teach the trained deep neural network 10 to refocus an input image 20 onto another plane within the sample volume, but this time to match the image of the same plane that is acquired by a different fluorescence imaging modality compared to the input image 20. This related framework is referred to herein as Deep-Z+. In this embodiment, the output image 40 generated by an input image 20 using a first microscope modality resembles and is substantially equivalent to a microscopy image of the same sample 12 obtained with a microscopy modality of the second type. To demonstrate the proof-of-concept of this unique capability, a Deep-Z+ trained deep neural network 10 was trained with input and label images that were acquired with a wide-field fluorescence microscope 110 and a confocal microscope (not shown), respectively, to blindly generate at the output of this cross-modality Deep-Z+, digitally refocused images 40 of an input wide-field fluorescence image 20 that match confocal microscopy images of the same sample sections.

It should be appreciated that a variety of different imaging modalities will work with the cross-modality functionality. For example, the first microscope modality may include a fluorescence microscope (e.g., wide-field fluorescence) and the second modality may include one of the following types of microscopes: a super-resolution microscope, a confocal microscope, a confocal microscope with single photon or multi-photon excited fluorescence, a second harmonic or high harmonic generation fluorescence microscope, a light-sheet microscope, a structured illumination microscope, a computational microscope, a ptychographic microscope.

After its training, the deep neural network 10 remains fixed, while the appended DPM or other user-defined surface 42 provides a "depth tuning knob" for the user to refocus a single 2D fluorescence image onto 3D surfaces and output the desired digitally-refocused fluorescence image 40 in a rapid non-iterative fashion. In addition to fluorescence microscopy, Deep-Z framework may be applied to other incoherent imaging modalities, and in fact it bridges the gap between coherent and incoherent microscopes by enabling 3D digital refocusing of a sample volume using a single 2D incoherent image. The system 2 is further unique in that it enables a computational framework for rapid transformation of a 3D surface onto another 3D surface within the fluorescent sample volume using a single forward-pass operation of the trained deep neural network 10.

Digital Refocusing of Fluorescence Images Using Deep-Z

Figure 2A:
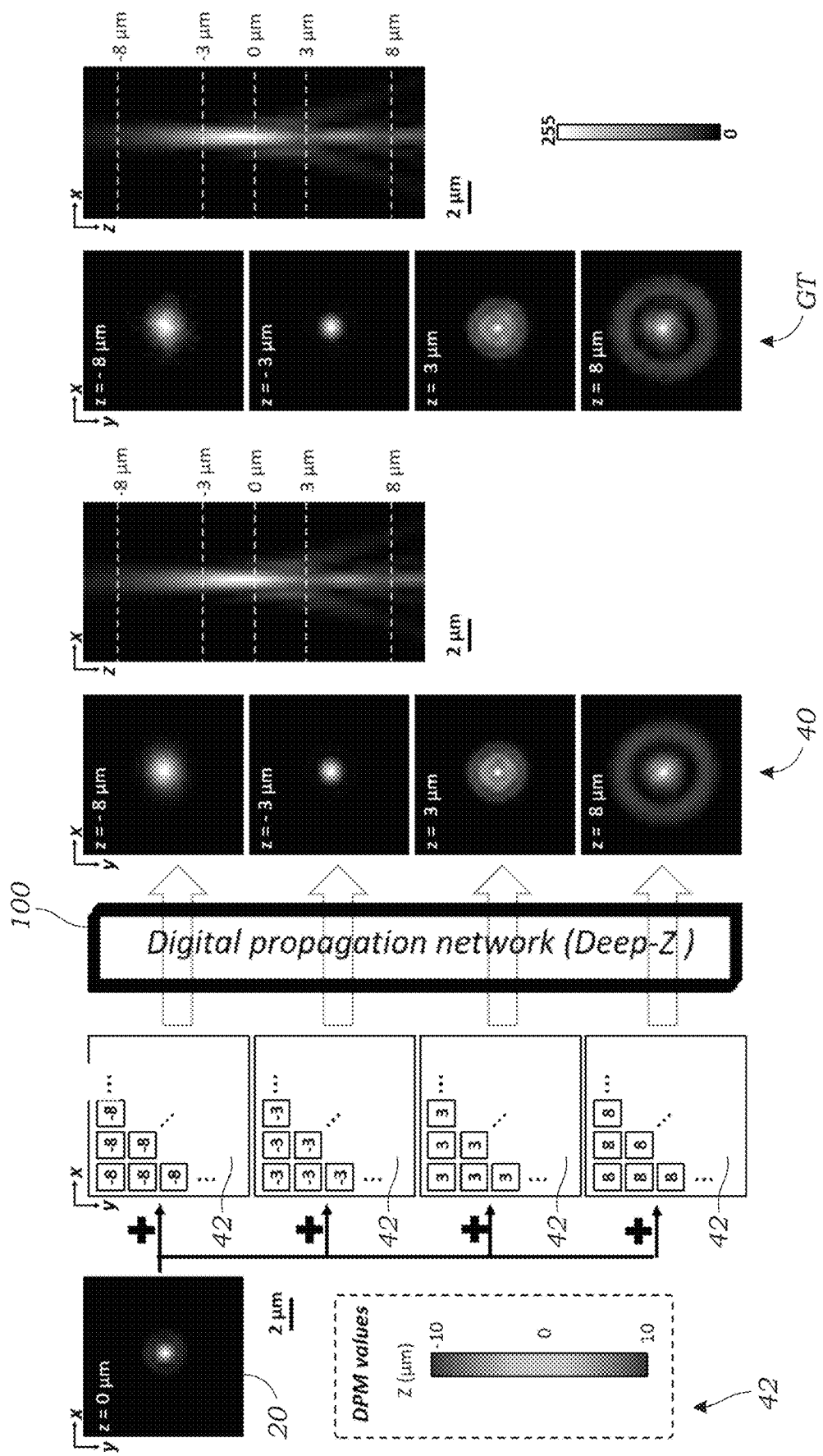
FIG. 2A schematically illustrates the refocusing of fluorescence images using the Deep-Z network. By concatenating a digital propagation matrix (DPM) to a single fluorescence image, and running the resulting image through a trained Deep-Z network, digitally refocused images at different planes can be rapidly obtained, as if an axial scan is performed at the corresponding planes within the sample volume. The DPM has the same size as the input image and its entries represent the axial propagation distance for each pixel and can also be spatially non-uniform. The results of Deep-Z inference are compared against the images of an axial-scanning fluorescence microscope for the same fluorescent bead (300 nm), providing a very good match.
Figure 2B:
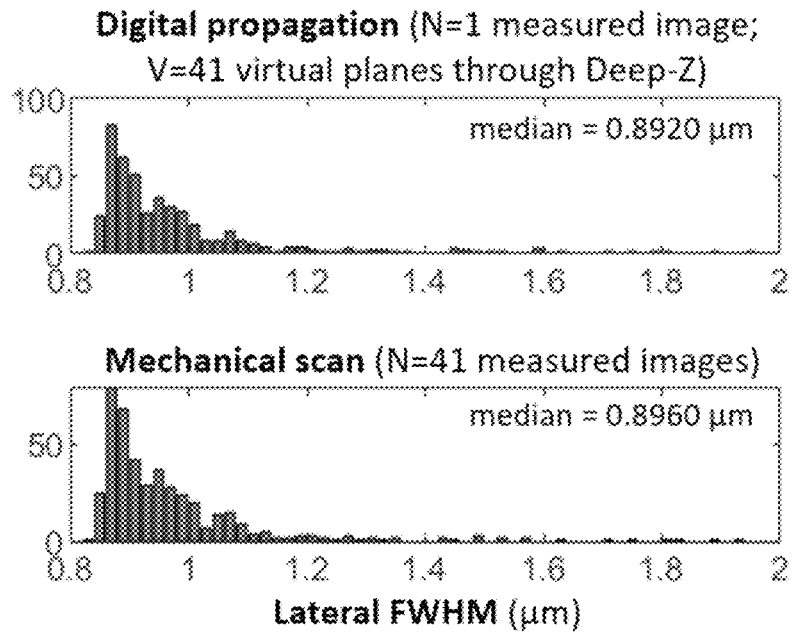
FIG. 2B illustrates lateral FWHM histograms for 461 individual/isolated fluorescence nano-beads (300 nm) measured using Deep-Z inference (N=1 captured image) and the images obtained using mechanical axial scanning (N=41 captured images) provide a very good match to each other.
Figure 2C:
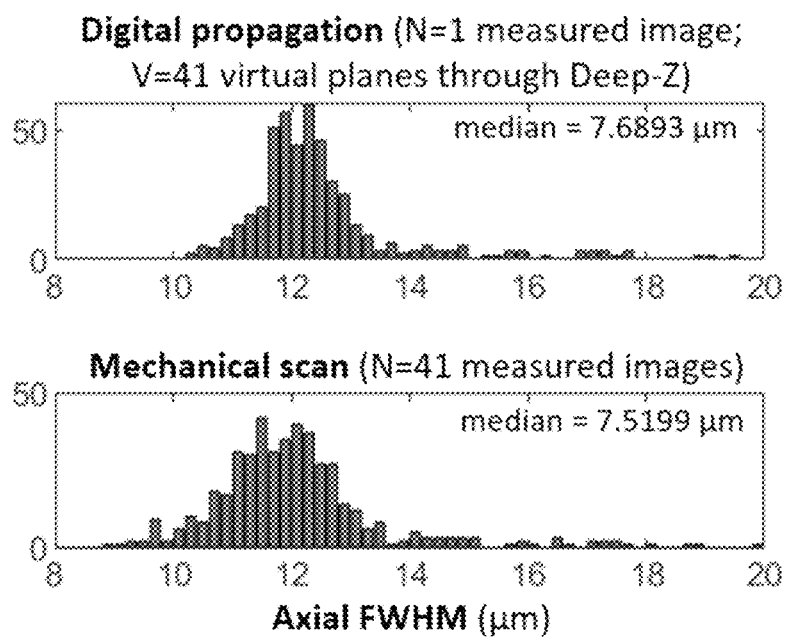
FIG. 2C illustrates axial FWHM measurements for the same data set of FIG. 2B, also revealing a very good match between Deep-Z inference results and the axial mechanical scanning results.
Figure 7:
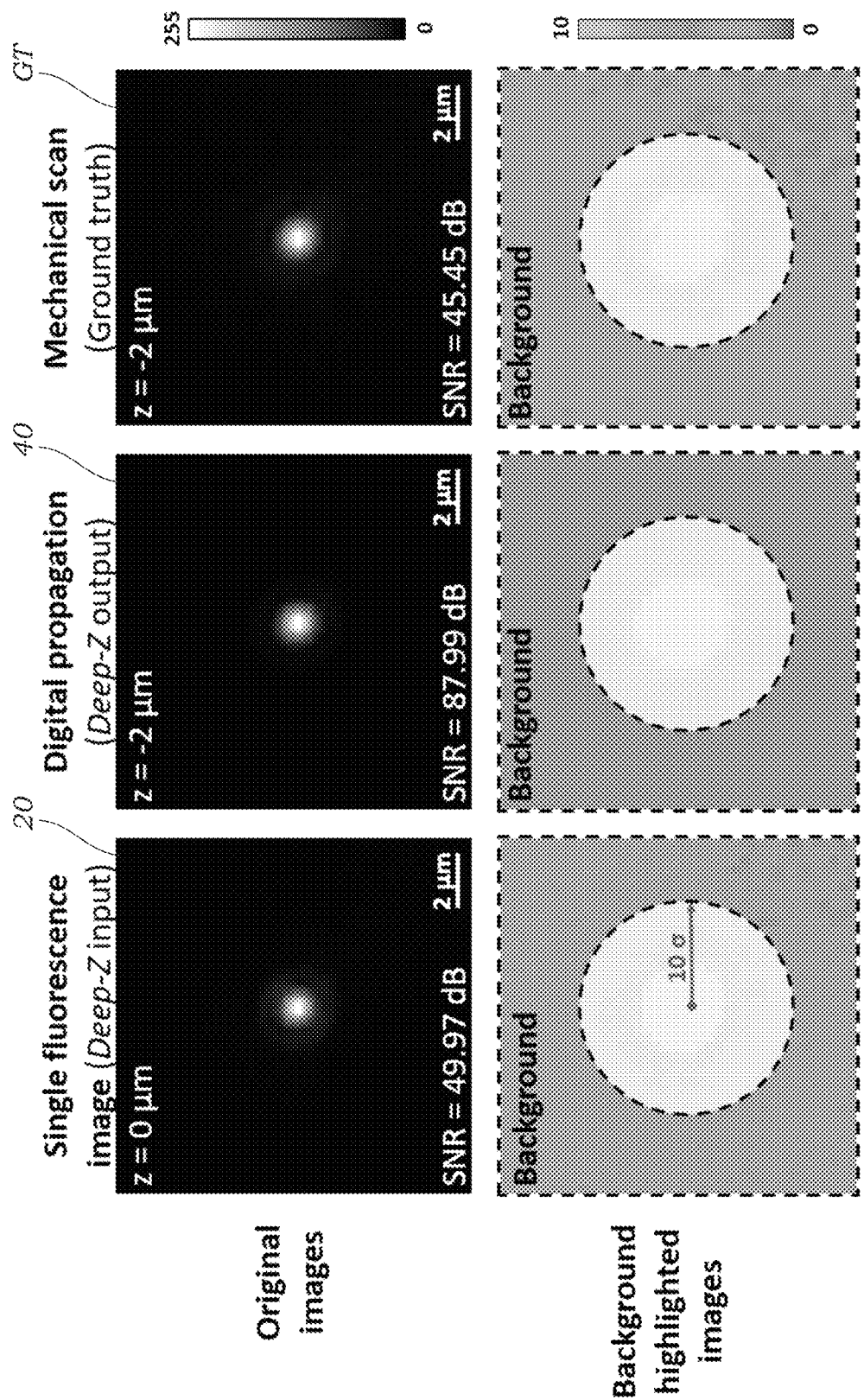
FIG. 7 illustrates an input image of a 300 nm fluorescent bead was digitally refocused to a plane 2 μm above it using the Deep-Z network, where the ground truth was the mechanically scanned fluorescence image acquired at this plane. Bottom row: same images as the first row, but saturated to a dynamic range of [0, 10] to highlight the background. The SNR values were calculated by first taking a Gaussian fit on the pixel values of each image to find the peak signal strength. Then the pixels in the region of interest (ROI) that were 10σ away (where $\sigma^2$ is the variance of the fitted Gaussian) were regarded as the background (marked by the region outside the red dotted circle in each image) and the standard deviation of these pixel values was calculated as the background noise. The Deep-Z network rejects background noise and improves the output image SNR by ~40 dB, compared to the mechanical scan ground truth image.
Figure 8:
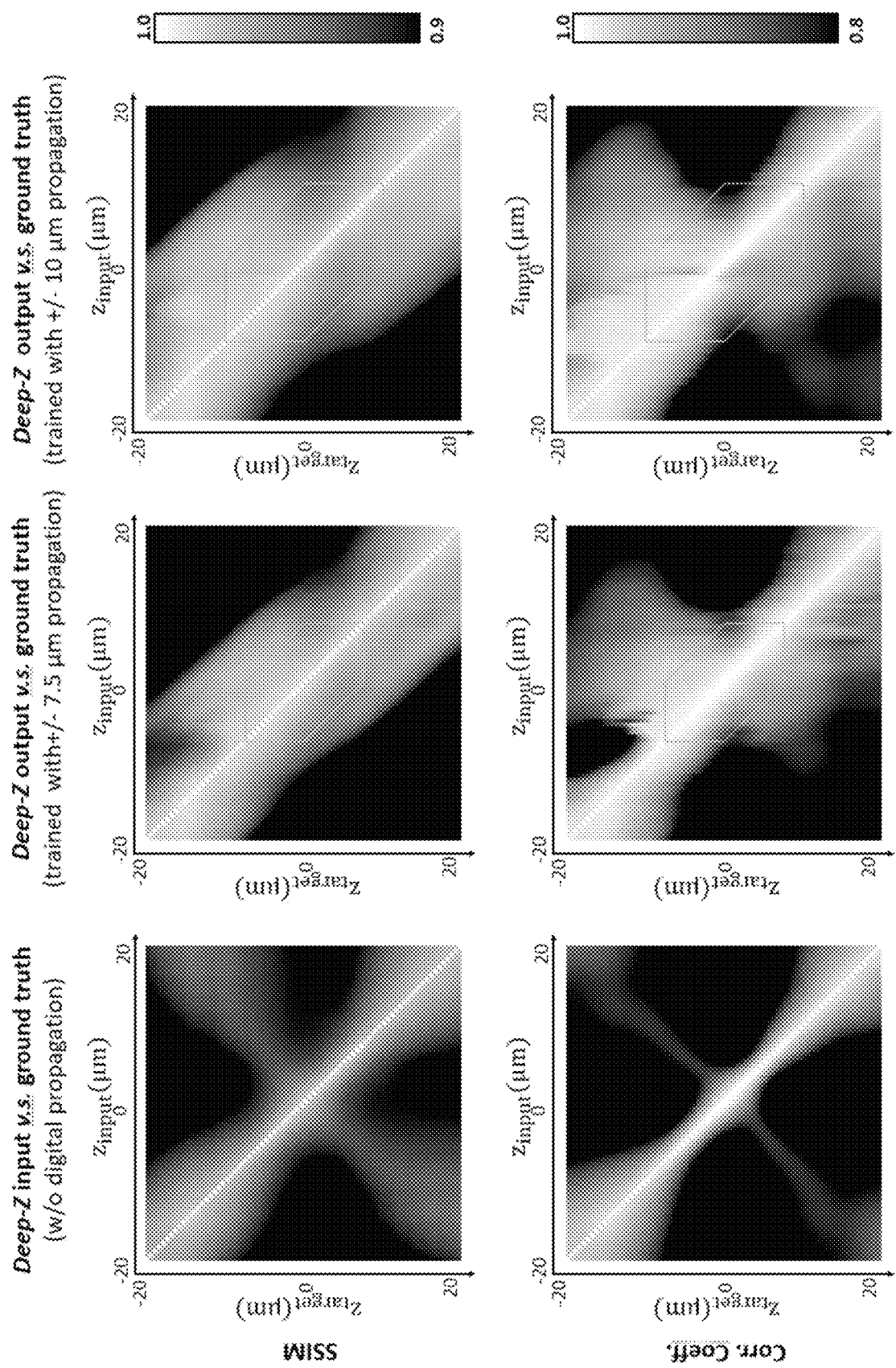
FIG. 8 illustrates structural similarity (SSIM) index and correlation coefficient (Corr. Coeff.) analysis for digital refocusing of fluorescence images from an input plane at $z_{input}$ to a target plane at $z_{target}$. A scanned fluorescence z-stack of a C. elegans sample was created, within an axial range of −20 μm to 20 μm, with 1 μm spacing. First column: each scanned image at $z_{input}$ in this stack was compared against the image at $z_{target}$, forming cross-correlated SSIM and Corr. Coeff. matrices. Both the SSIM and Corr. Coeff. fall rapidly off the diagonal entries. Second (middle) column: A Deep-Z network trained with fluorescence image data corresponding to +/−7.5 μm propagation range (marked by the diamond in each panel) was used to digitally refocus images from $z_{input}$ to $z_{target}$. The output images were compared against the ground truth images at $z_{target}$ using SSIM and Corr. Coeff. Third column: same as the second column, except the training fluorescence image data included up to +/−10 μm axial propagation (marked by the diamond that is now enlarged compared to the second column). These results confirm that Deep-Z learned the digital propagation of fluorescence, but it is limited to the axial range that it was trained for (determined by the training image dataset). Outside the training range (defined by the diamonds), both the SSIM and Corr. Coeff. values considerably decrease.

The system 2 and methods described herein enable a single intensity-only wide-field fluorescence image 20 to be digitally refocused to a user-defined surface 42 within the axial range of its training. FIG. 2A demonstrates this concept by digitally propagating a single fluorescence image 20 of a 300 nm fluorescent bead (excitation/emission: 538 nm/584 nm) to multiple user defined planes as defined by the DPMs 42. The native DOF of the input fluorescence image 20, defined by the NA of the objective lens (20×/0.75 NA), is 1 µm. Using the Deep-Z system 2, the image of this fluorescent bead was digitally refocused over an axial range of ~±10 µm, matching the mechanically-scanned corresponding images of the same region of interest (ROI), which form the ground truth (GT). Note that the PSF in FIG. 2A is asymmetric in the axial direction, which provides directional cues to the neural network 10 regarding the digital propagation of an input image by Deep-Z. Unlike a symmetric Gaussian beam, such PSF asymmetry along the axial direction is ubiquitous in fluorescence microscopy systems. In addition to digitally refocusing an input fluorescence image 20, the Deep-Z system 2 also provides improved signal-to-noise ratio (SNR) at its output 40 in comparison to a fluorescence image of the same object measured at the corresponding depth (see FIG. 7); at the heart of this SNR increase compared to a mechanically-scanned ground truth is the ability of the trained deep neural network 10 to reject various sources of image noise that were not generalized during its training phase. To further quantify Deep-Z system 2 output performance PSF analysis was used. FIGS. 2B, 2C illustrate the histograms of both the lateral and the axial full-width-half-maximum (FWHM) values of 461 individual/isolated nano-beads distributed over ~500×500 µm². The statistics of these histograms very well agree with each other, confirming the match between Deep-Z output images 40 calculated from a single fluorescence image (N=1 measured image) and the corresponding axially-scanned ground truth (GT) images (N=41 measured images). This quantitative match highlights the fact that Deep-Z system 2 indirectly learned, through image data, the 3D refocusing of fluorescence light. However, this learned capability is limited to be within the axial range determined by the training dataset (e.g., ±10 µm in this work), and fails outside of this training range (see FIG. 8 for quantification of this phenomenon). Of course, training over a wider axial range will improve the range of axial refocusing for the trained deep neural network 10.

Figure 3:
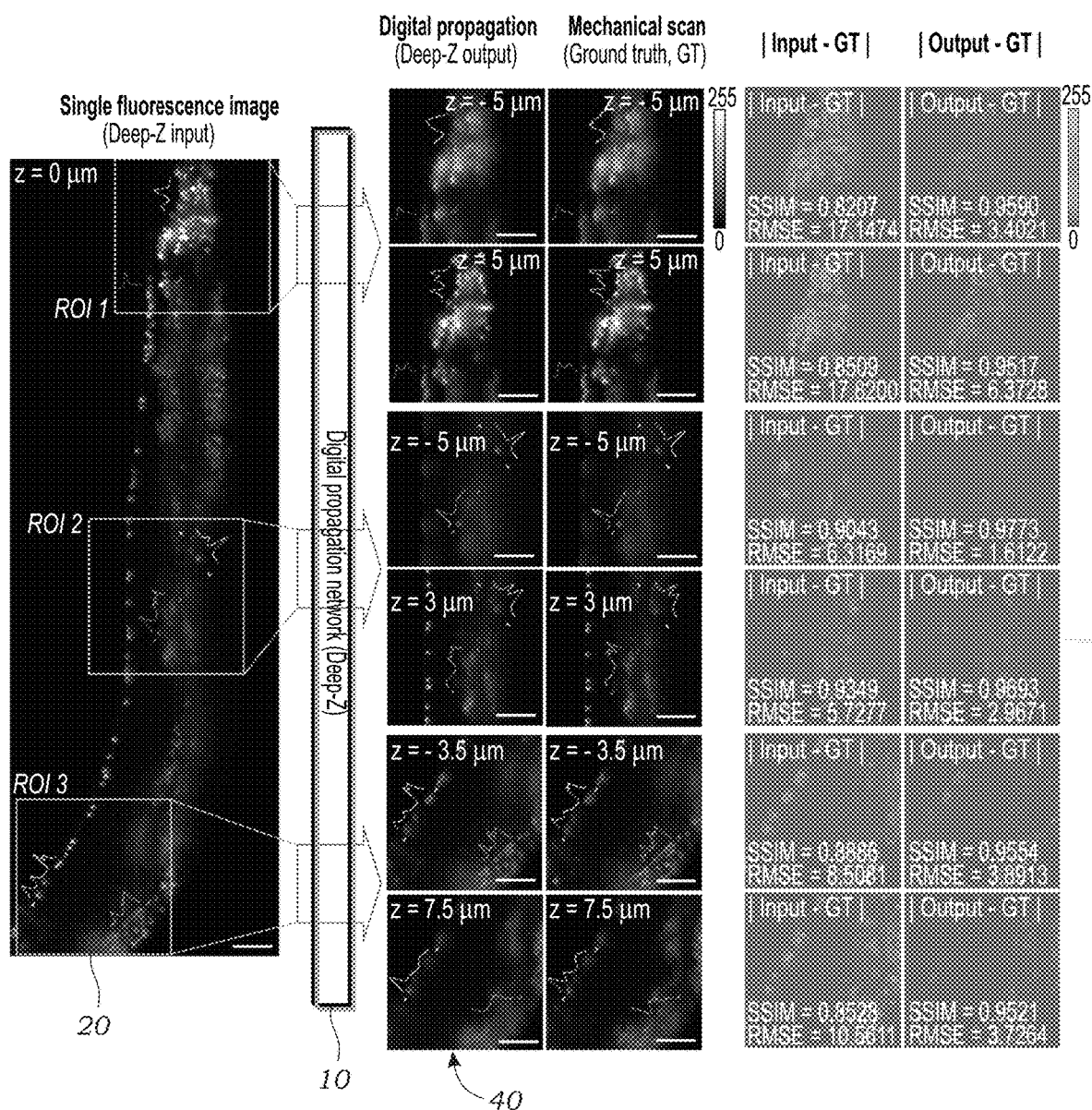
FIG. 3 illustrates the 3D imaging of C. elegans neuron nuclei using the Deep-Z network. Different ROIs are digitally refocused using Deep-Z to different planes within the sample volume; the resulting images provide a very good match to the corresponding ground truth images, acquired using a scanning fluorescence microscope. The absolute difference images of the input and output with respect to the corresponding ground truth image are also provided on the right, with structural similarity index (SSIM) and root mean square error (RMSE) values reported, further demonstrating the success of Deep-Z. Scale bar: 25 μm.
Figure 10:
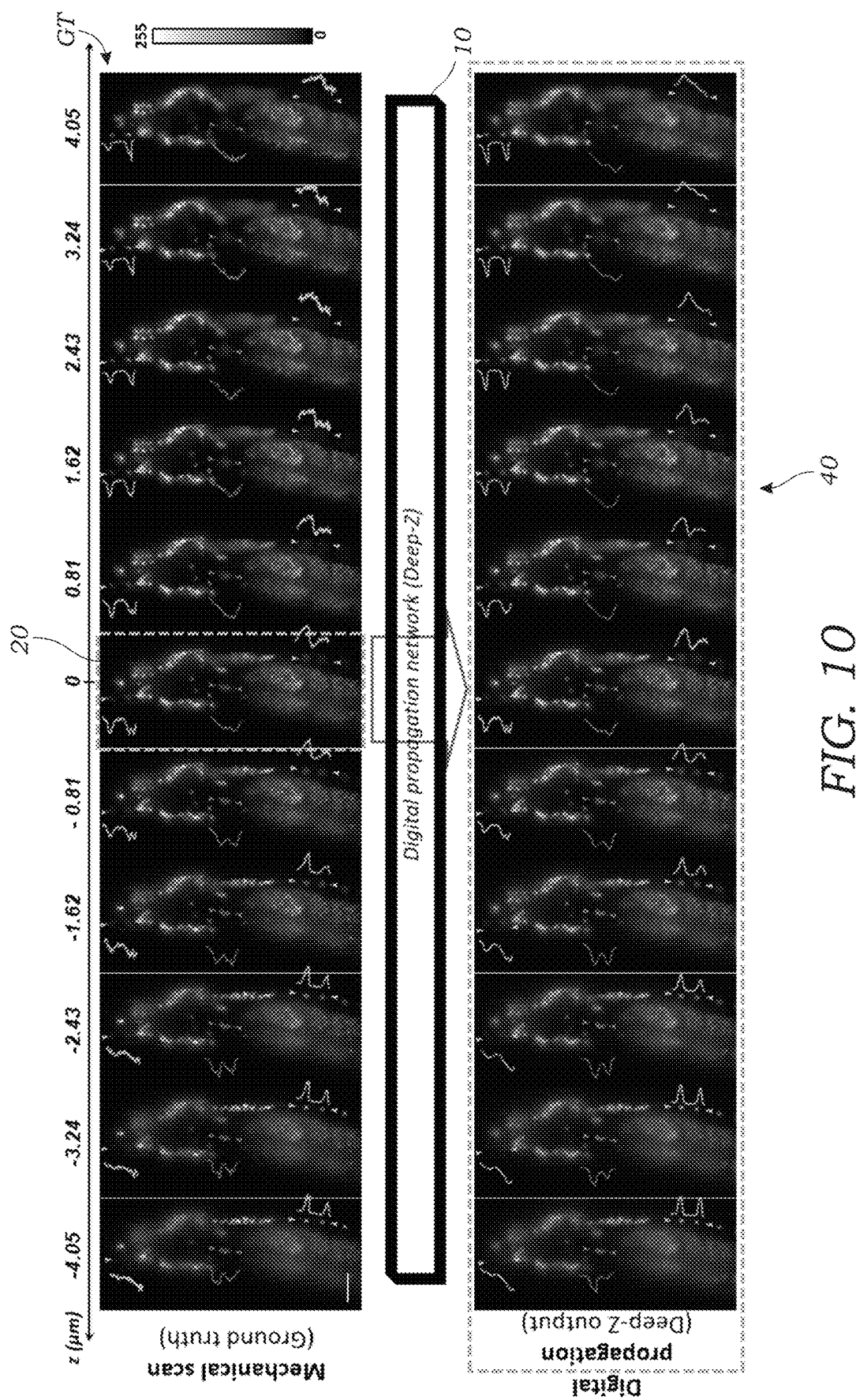
FIG. 10 illustrates the 3D imaging of C. elegans head neuron nuclei using Deep-Z network. The input and ground truth images were acquired by a scanning fluorescence microscope with a 40×/1.4 NA objective. A single fluorescence image acquired at z=0 µm focal plane (marked by dashed rectangle) was used as the input image to Deep-Z network and was digitally refocused to different planes within the sample volume, spanning around −4 to 4 µm; the resulting images provide a good match to the corresponding ground truth images. Scale bar: 25 µm.

Next, the Deep-Z system 2 was tested by imaging the neurons of a *C. elegans* nematode expressing pan-neuronal tagRFP. FIG. 3 demonstrates the blind testing results for Deep-Z based refocusing of different parts of a *C. elegans* worm from a single wide-field fluorescence input image 20. Using the Deep-Z system 2, non-distinguishable fluorescent neurons in the input image 20 were brought into focus at different depths, while some other in-focus neurons at the input image 20 got out-of-focus and smeared into the background, according to their true axial positions in 3D see the cross-sectional comparisons to the ground truth mechanical scans provided in FIG. 3 (also see FIGS. 9A-9J for image difference analysis). For optimal performance, this Deep-Z system 2 was specifically trained using *C. elegans* samples 12, to accurately learn the 3D PSF information together with the refractive properties of the nematode body and the surrounding medium. Using the Deep-Z system 2, a virtual 3D stack and 3D visualization of the sample 12 were generated (from a single 2D fluorescence image of a *C. elegans* worm) over an axial range of ~±10 µm. Similar results were also obtained for a *C. elegans* imaged under a 40×/1.3 NA objective lens, where Deep-Z successfully refocused the input image over an axial range of ~±4 µm (see FIG. 10).

Figure 11:
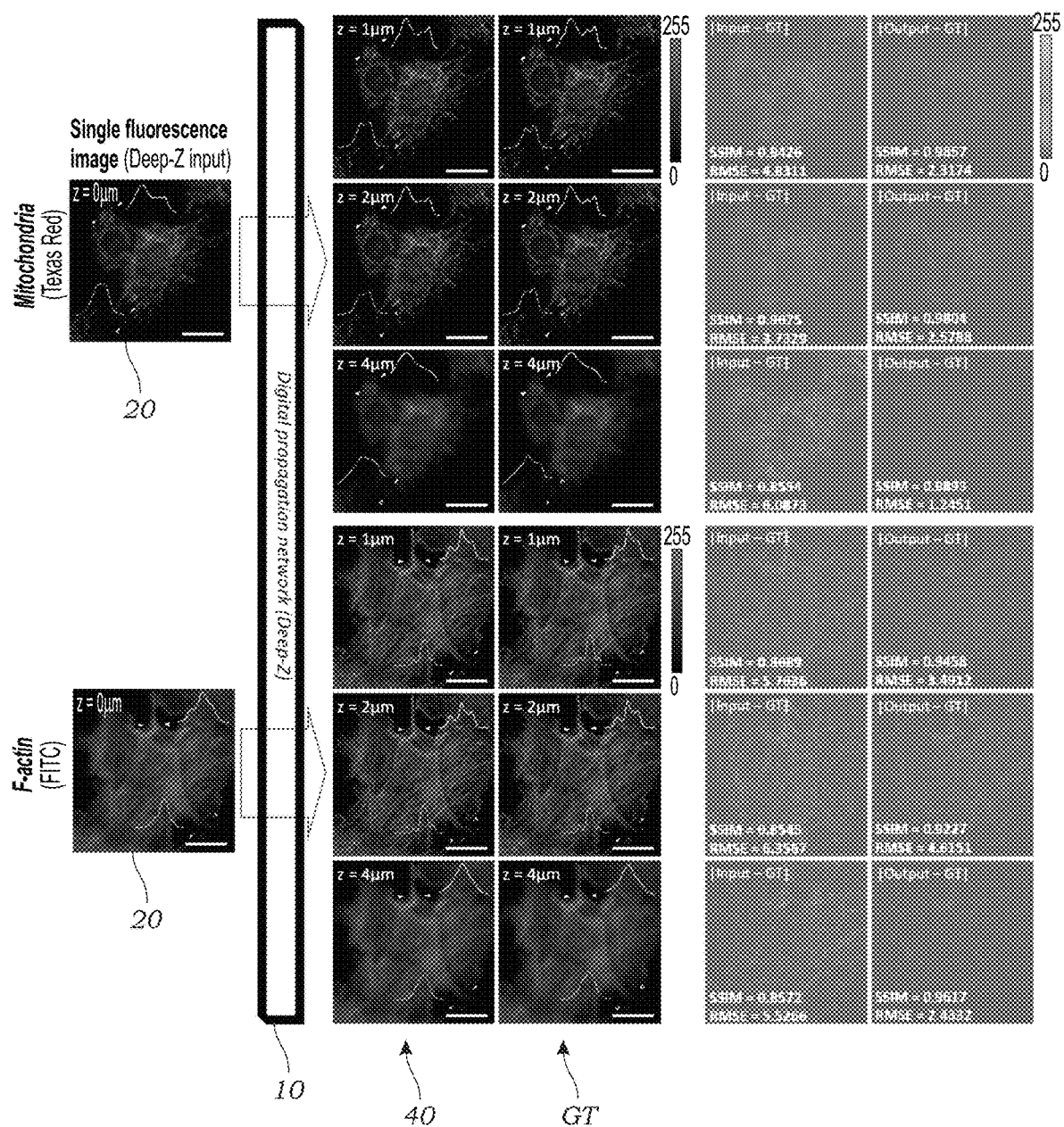
FIG. 11 illustrates the digital refocusing of fluorescence microscopy images of BPAEC using the Deep-Z network. The input image was captured using a 20×/0.75 NA objective lens, using the Texas Red and FITC filter sets, occupying the red and green channels of the image, for the mitochondria and F-actin structures, respectively. Using Deep-Z, the input image was digitally refocused to 1 µm above the focal plane, where the mitochondrial structures in the green channel are in focus, matching the features on the mechanically-scanned image (obtained directly at this depth). The same conclusion applies for the Deep-Z output at z=2 µm, where the F-actin structures in the red channel come into focus. After 3 µm above the image plane, the details of the image content get blurred. The absolute difference images of the input and output with respect to the corresponding ground truth images are also provided, with SSIM and RMSE values, quantifying the performance of Deep-Z. Scale bar: 20 µm.

Because the Deep-Z system 2 can digitally reconstruct the image of an arbitrary plane within a 3D sample 12 using a single 2D fluorescence image 20, without sacrificing the inherent resolution, frame-rate or photon-efficiency of the imaging system, it is especially useful for imaging dynamic (e.g., moving) biological samples 12. To demonstrate this capability, a video was captured of four moving *C. elegans* worms 12, where each image frame 40 of this fluorescence video was digitally refocused to various depths using Deep-Z trained deep neural network 10. This enabled the creation of simultaneously running videos of the same sample volume, each one being focused at a different depth (e.g., z depth). This unique capability not only eliminates the need for mechanical axial scanning and related optical hardware, but also significantly reduces phototoxicity or photobleaching within the sample to enable longitudinal experiments. Yet another advantageous feature is the ability to simultaneously display temporally synchronized time-lapse videos or movie clips at different depths which is not possible with conventional scanning-based 3D imaging systems. In addition to 3D imaging of the neurons of a nematode, the system 2 also works well to digitally refocus the images 20 of fluorescent samples 12 that are spatially denser such as the mitochondria and F-actin structures within bovine pulmonary artery endothelial cells (BPAEC) as seen in FIG. 11 for example.

Figure 17A:
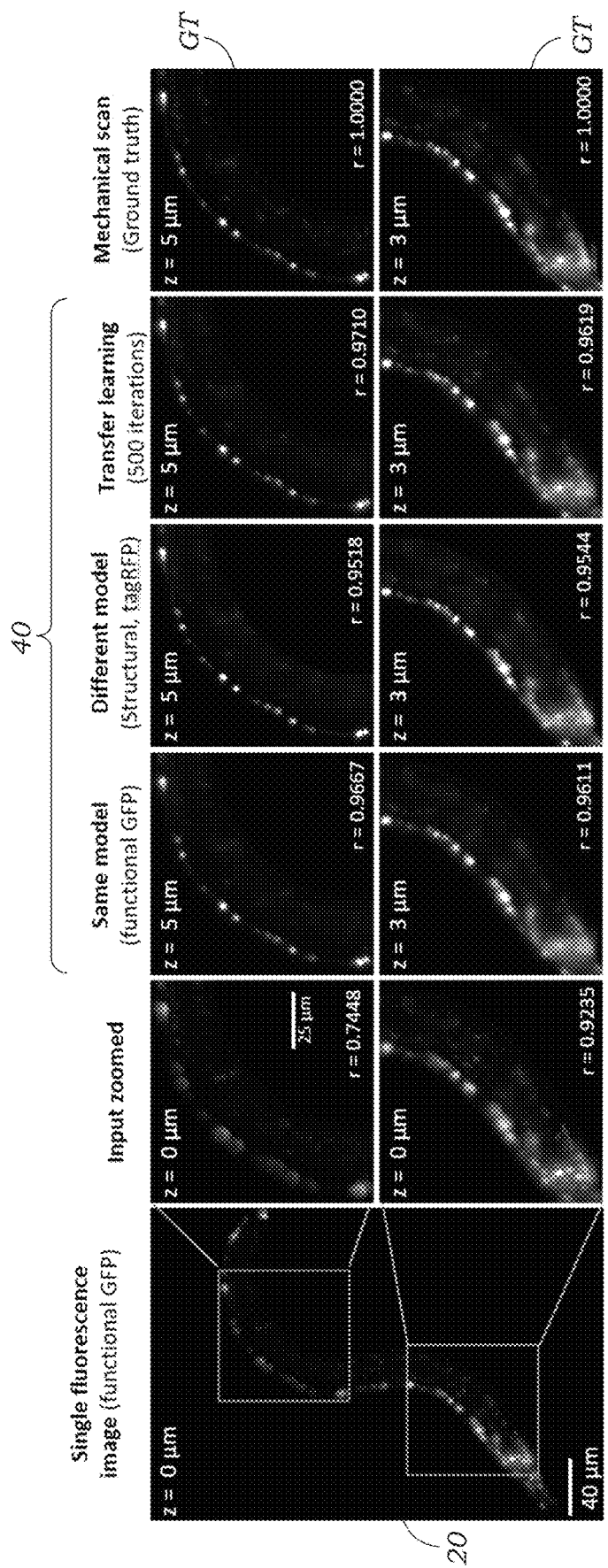
FIG. 17A illustrates Deep-Z based virtual refocusing of a different sample type and transfer learning results. The input image records the neuron activities of a C. elegans that is labeled with GFP; the image is captured using a 20×/0.8 NA objective under the FITC channel. The input image was virtually refocused using both the optimal worm strain model (denoted as: same model, functional GFP) as well as a different model (denoted as: different model, structural tagRFP). Also illustrated are the results of a transfer learning model which used the different model as its initialization and functional GFP image dataset to refine it after ~500 iterations (~30 min of training).
Figure 17B:
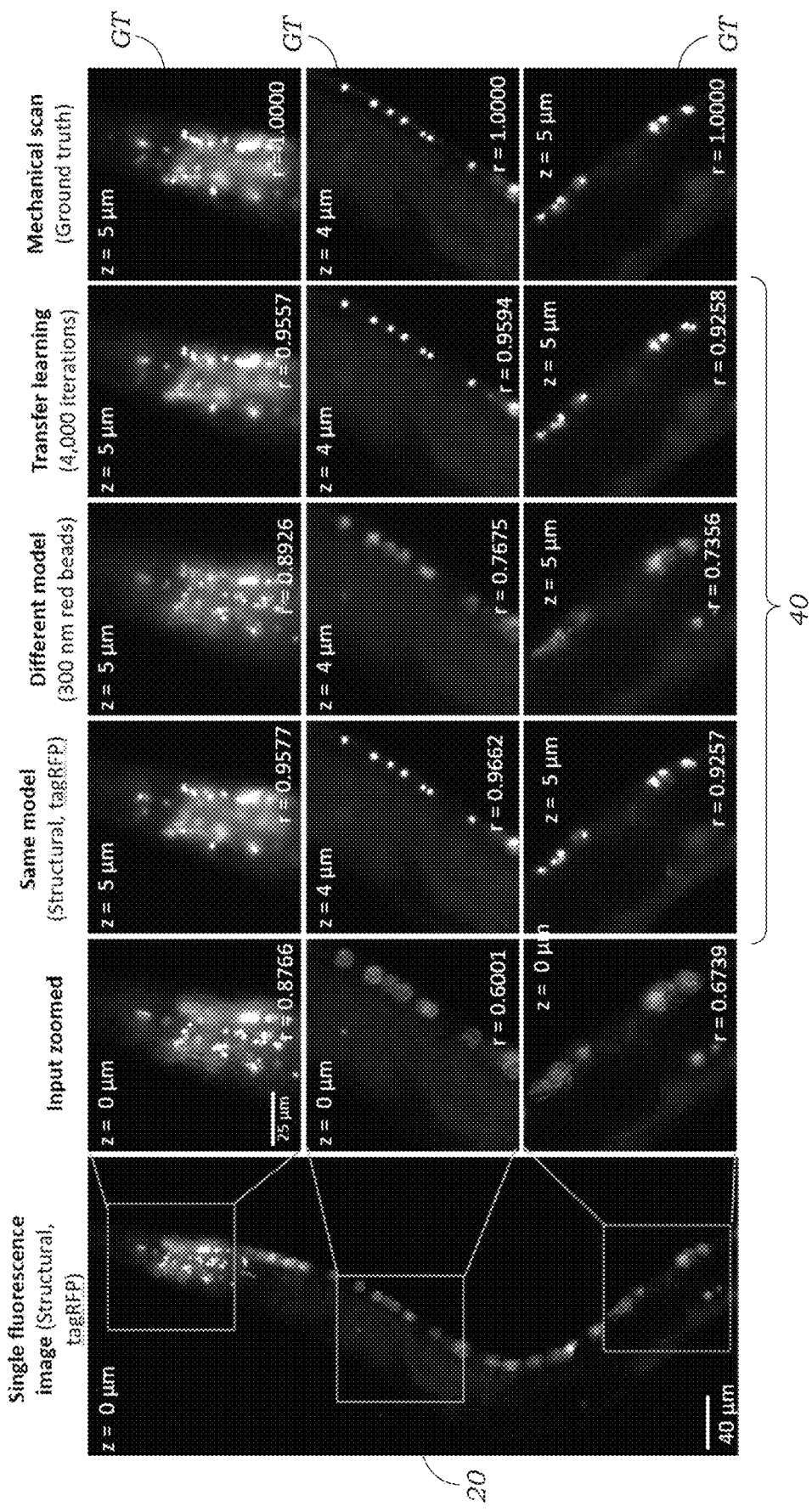
FIG. 17B illustrates Deep-Z based virtual refocusing of a different sample type and transfer learning results although a different C. elegans sample is shown (compared to FIG. 17A). The input image records the neuron nuclei labeled with tagRFP imaged using a 20×/0.75 NA objective under the Texas Red channel. The input image was virtually refocused using both the exact worm strain model (same model, structural, tagRFP) as well as a different model (different model, 300 nm red beads). Also illustrated are the results of a transfer learning model which used the different model as its initialization and structural ragRFP image dataset to refine it after ~4,000 iterations (~6 hours training). Image correlation coefficient (r) is shown at the lower right corner of each image, in reference to the ground truth mechanical scan performed at the corresponding microscope system (Leica and Olympus, respectively). The transfer learning was performed using 20% of the training data and 50% of the validation data, randomly selected from the original data set.
Figure 18:
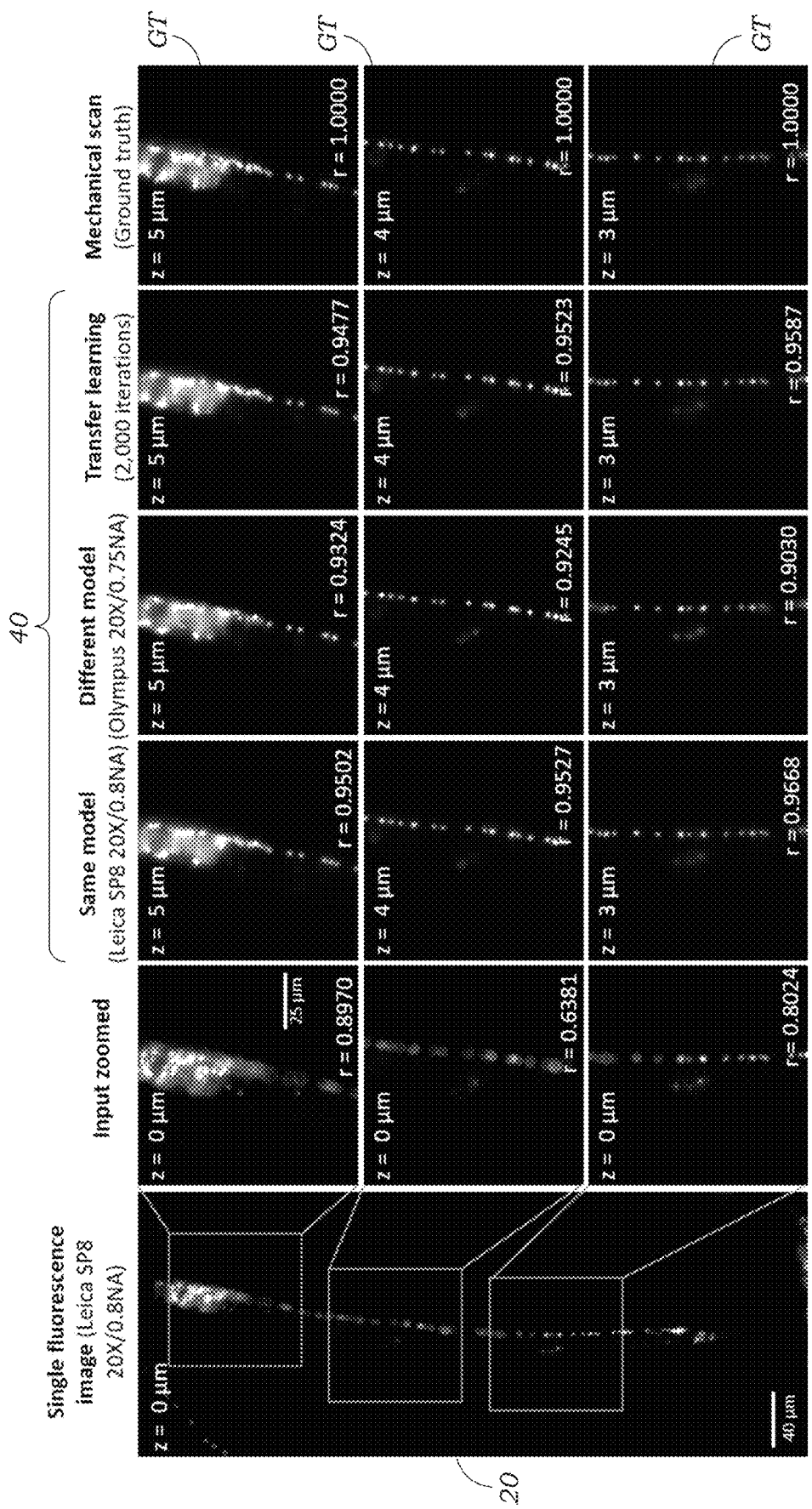
FIG. 18 illustrates virtual refocusing of a different microscope system and transfer learning results. The input image records the C. elegans neuronal nuclei labeled with tag GFP, imaged using a Leica SP8 microscope with a 20×/0.8 NA objective. The input image was virtually focused using both the exact model (Leica SP8 20×/0.8 NA) as well as a different model (denoted as: different model, Olympus 20×/0.75 NA). Also illustrated are the results of a transfer learning model using the different model as its initialization and Leica. SP8 image dataset to refine it after ~2,000 iterations (~40 min training). Image correlation coefficient (r) is shown at the lower right corner of each image, in reference to the ground truth mechanical scan performed at the corresponding microscope system. The transfer learning was performed using 20% of the training data and 50% of the validation data, randomly selected from the original data set.

As described so far, the blindly tested samples 12 were inferred with a Deep-Z trained deep neural network 10 that was trained using the same type of sample 12 and the same microscopy system (i.e., same modality of imaging device 110). The system 2 was also evaluated under different scenarios, where a change in the test data distribution is introduced in comparison to the training image set, such as e.g., (1) a different type of sample 12 is imaged, (2) a different microscopy system 110 is used for imaging, and (3) a different illumination power or SNP, is used. The results (FIGS. 17A, 17B, 18, 19) and related analysis reveal the robustness of Deep-Z system 2 to some of these changes; however, as a general recommendation to achieve the best performance with the Deep-Z system 2, the neural network 10 should be trained (from scratch or through transfer learning, which significantly expedites the training process, as illustrated in FIGS. 17A, 17B, 18 using training images obtained with the same microscope imaging device/system 110 and the same types of samples, as expected to be used at the testing phase.

Sample Drift-Induced Defocus Compensation Using Deep-Z

The Deep-Z system 2 also enables the correction for sample drift induced defocus after the image 20 is captured. Videos were generated showing a moving *C. elegans* worm recorded by a wide-field fluorescence microscope 110 with a 20×/0.8 NA objective lens (DOF ~1 µm). The worm was defocused ~2-10 μm from the recording plane. Using the Deep-Z system 2, one can digitally refocus each image frame 20 of the input video to different planes up to 10 μm, correcting this sample drift induced defocus. Such a sample drift is conventionally compensated by actively monitoring the image focus and correcting for it during the measurement, e.g., by using an additional microscope. The Deep-Z system 2, on the other hand, provides the possibility to compensate sample drift in already-captured 2D fluorescence images.

3D Functional Imaging of *C. elegans* Using Deep-Z

An important application of 3D fluorescence imaging is neuron activity tracking. For example, genetically modified animals that express different fluorescence proteins are routinely imaged using a fluorescence microscope 110 to reveal their neuron activity. To highlight the utility of the Deep-Z system 2 for tracking the activity of neurons in 3D, a fluorescence video of a *C. elegans* worm was recorded at a single focal plane (z=0 μm) at ~3.6 Hz for ~35 sec, using a 20×/0.8 NA objective lens with two fluorescence channels: FITC for neuron activity and Texas Red for neuron locations. The input video image frames 20 were registered with respect to each other to correct for the slight body motion of the worm between the consecutive frames (described herein in the Methods section). Then, each frame 20 at each channel of the acquired video were digitally refocused using Deep-Z trained deep neural network 10 to a series of axial planes from −10 μm to 10 μm with 0.5 μm step size, generating a virtual 3D fluorescence image stack (of output images 40)) for each acquired frame. A comparison video was made of the recorded input video along with a video of the maximum intensity projection (MIP) along z for these virtual stacks. The neurons that are defocused in the input video can be clearly refocused on demand at the Deep-Z output for both of the fluorescence channels. This enables accurate spatio-temporal tracking of individual neuron activity in 3D from a temporal sequence of 2D fluorescence images 20, captured at single focal plane.

Figure 4B:
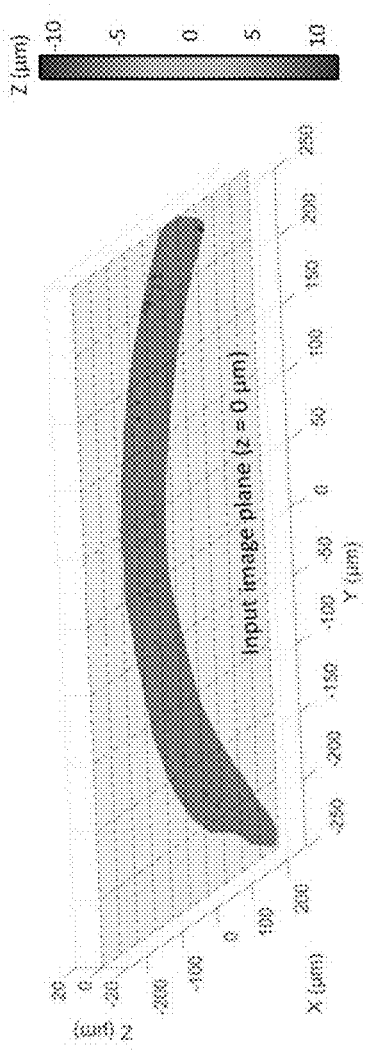
FIG. 4B illustrates all the 155 localized neurons are shown in 3D, where depths are color-coded.

To quantify the neuron activity using Deep-Z output images 40, voxels of each individual neuron were segmented using the Texas Red channel (neuron locations), and tracked the change of the fluorescence intensity, i.e., $\Delta F(t)=F(t)-F_0$, in the FITC channel (neuron activity) inside each neuron segment over time, where $F(t)$ is the neuron fluorescence emission intensity and $F_0$ is its time average. A total of 155 individual neurons in 3D were isolated using Deep-Z output images 40, as shown in FIG. 4B, where the color represents the depth (z location) of each neuron. For comparison, FIG. 20*b* reports the results of the same segmentation algorithm applied on just the input 2D image, where 99 neurons were identified, without any depth information.

Figure 4C:
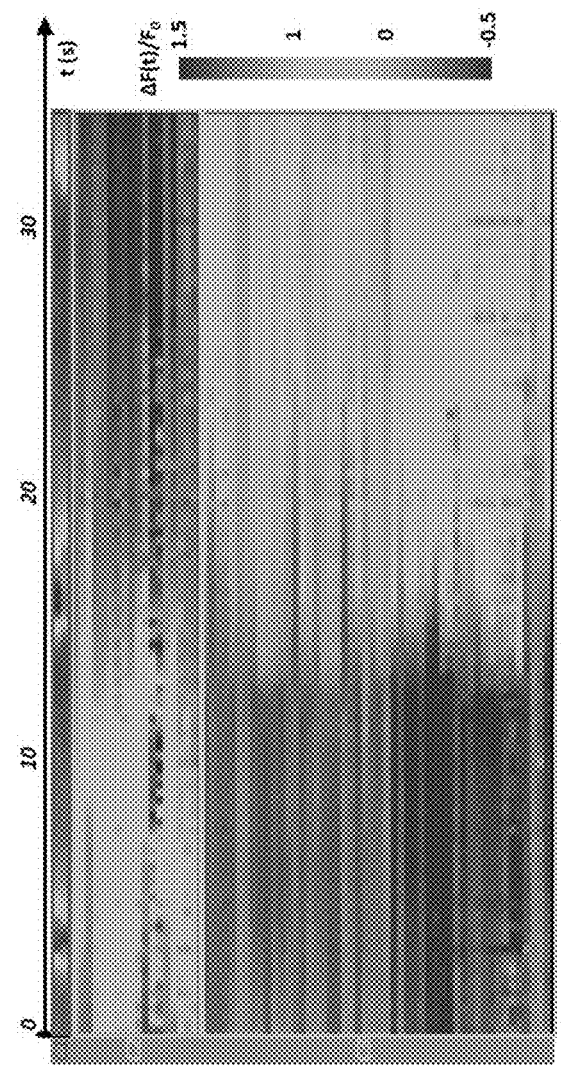
FIG. 4C illustrates 3D tracking of neuron calcium activity events corresponding to the 70 active neurons. The neurons were grouped into 3 clusters (C1-C3) based on their calcium activity pattern similarity. The locations of these neurons are marked by the circles in FIG. 4A (C1(blue), C2(cyan) and C3(yellow)).
Figure 4A:
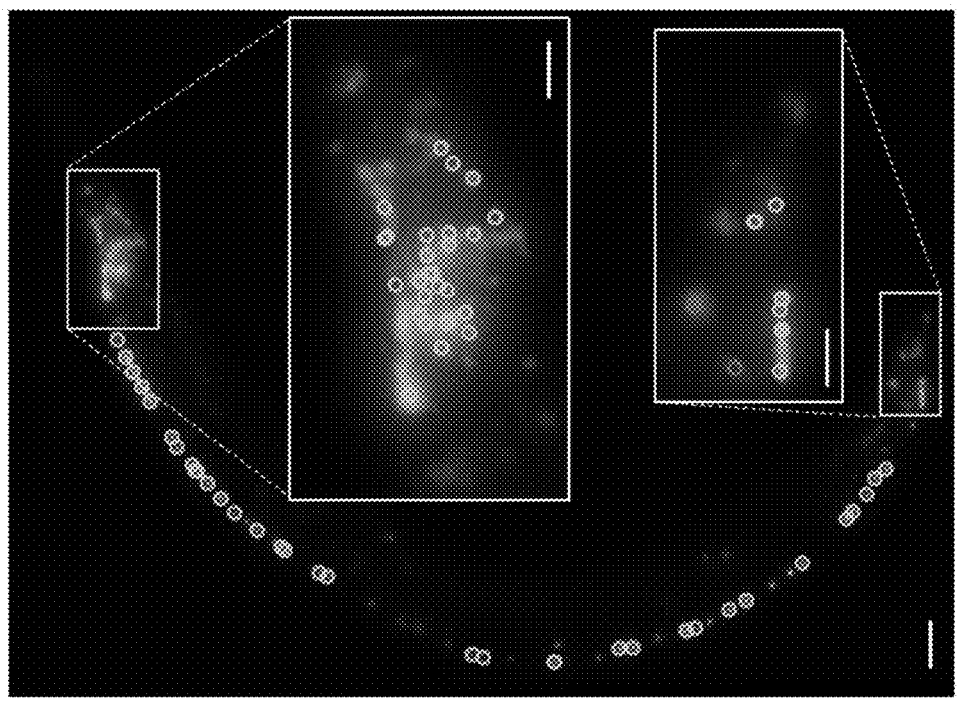
FIG. 4A illustrates the maximum intensity projection (MIP) along the axial direction of the median intensity image taken across the time sequence showing C. elegans neuron activity tracking in 3D using the Deep-Z network. The red channel (Texas red) labels neuron nuclei. The green channel (FITC) labels neuron calcium activity. A total of 155 neurons were identified, 70 of which were active in calcium activity. Scale bar: 25 μm. Scale bar for the zoom-in regions: 10 μm.

FIG. 4C plots the activities of the 70 most active neurons, which were grouped into clusters C1-C3 based on their calcium activity pattern similarities. The activities of all of the 155 neurons inferred using Deep-Z are provided in FIGS. 12A-12F. FIG. 3C reports that cluster C3 calcium activities increased at t=14 s, whereas the activities of cluster C2 decreased at a similar time point. These neurons very likely correspond to the motor neurons type A and B that promote backward and forward motion, respectively, which typically anti-correlate with each other. Cluster C1 features two cells that were comparatively larger in size, located in the middle of the worm. These cells had three synchronized short spikes at t=4, 17 and 32 sec. Their 3D positions and calcium activity pattern regularity suggest that they are either neuronal or muscle cells of the defecation system that initiates defecation in regular intervals in coordination with the locomotion system.

It should be emphasized that all this 3D tracked neuron activity was in fact embedded in the input 2D fluorescence image sequence (i.e., images 20) acquired at a single focal plane within the sample 12, but could not be readily inferred from it. Through the Deep-Z system 2 and its 3D refocusing capability to user-defined surfaces 42 within the sample volume, the neuron locations and activities were accurately tracked using a 2D microscopic time sequence, without the need for mechanical scanning, additional hardware, or a trade-off of resolution or imaging speed.

Because the Deep-Z system 2 generates temporally synchronized virtual image stacks through purely digital refocusing, it can be used to match (or improve) the imaging speed to the limit of the camera framerate, by using e.g., the stream mode, which typically enables a short video of up to 100 frames per second. To highlight this opportunity, the stream mode of the camera of a Leica SP8 microscope was used two videos were captured at 100 fps for monitoring the neuron nuclei (under the Texas Red channel) and the neuron calcium activity (under the FITC channel) of a moving *C. elegans* over a period of 10 sec, and used Deep-Z to generate virtually refocused videos from these frames over an axial depth range of +/−10 μm.

Deep-Z Based Aberration Correction Using Spatially Non-Uniform DPMs

In one embodiment, uniform DPMs 42 were used in both the training phase and the blind testing in order to refocus an input fluorescence image 20 to different planes within the sample volume. Here it should be emphasized that, even though the Deep-Z trained deep neural network 10 was trained with uniform DPMs 42, in the testing phase one can also use spatially non-uniform entries as part of a DPM 42 to refocus an input fluorescence image 20 onto user-defined 3D surfaces. This capability enables digital refocusing of the fluorescence image of a 3D surface onto another 3D surface, defined by the pixel mapping of the corresponding DPM 42.

Such a unique capability can be useful, among many applications, for simultaneous auto-focusing of different parts of a fluorescence image after the image capture, measurement or assessment of the aberrations introduced by the optical system (and/or the sample) as well as for correction of such aberrations by applying a desired non-uniform DPM 42. To exemplify this additional degree-of-freedom enabled by the Deep-Z system 2, FIGS. 5A-5L demonstrates the correction of the planar tilting and cylindrical curvature of two different samples, after the acquisition of a single 2D fluorescence image per object. FIG. 5A illustrates the first measurement, where the plane of a fluorescent nano-bead sample was tilted by 1.5° with respect to the focal plane of the objective lens. As a result, the left and right sides of the acquired raw fluorescence image (FIG. 5C) were blurred and the corresponding lateral FWHM values for these nano-beads became significantly wider, as reported in FIG. 5E. By using a non-uniform DPM 42 as seen in FIG. 5B, which represents this sample tilt, the Deep-Z trained deep neural network 10 can act on the blurred input image 20 (FIG. 5C) and accurately bring all the nano-beads into focus (FIG. 5D), even though it was only trained using uniform DPMs 42. The lateral FWHM values calculated at the network output image became monodispersed, with a median of ~0.96 μm (FIG. 5F), in comparison to a median of ~2.14 μm at the input image (FIG. 5E). Similarly, FIG. 5G illustrates the second measurement, where the nano-beads were distributed on a cylindrical surface with a diameter of ~7.2 mm. As a result, the measured raw fluorescence image exhibited defocused regions as illustrated in FIG. 5I, and the FWHM values of these nano-bead images were accordingly broadened (FIG. 5K), corresponding to a median value of ~2.41 μm. On the other hand, using a non-uniform DPM 42 that defines this cylindrical surface (FIG. 5H), the aberration in FIG. 5I was corrected using Deep-Z trained deep neural network 10 (FIG. 5J), and similar to the tilted sample case, the lateral FWHM values calculated at the network output image once again became monodispersed, as desired, with a median of ~0.91 μm (FIG. 5L).

Figure 13A:
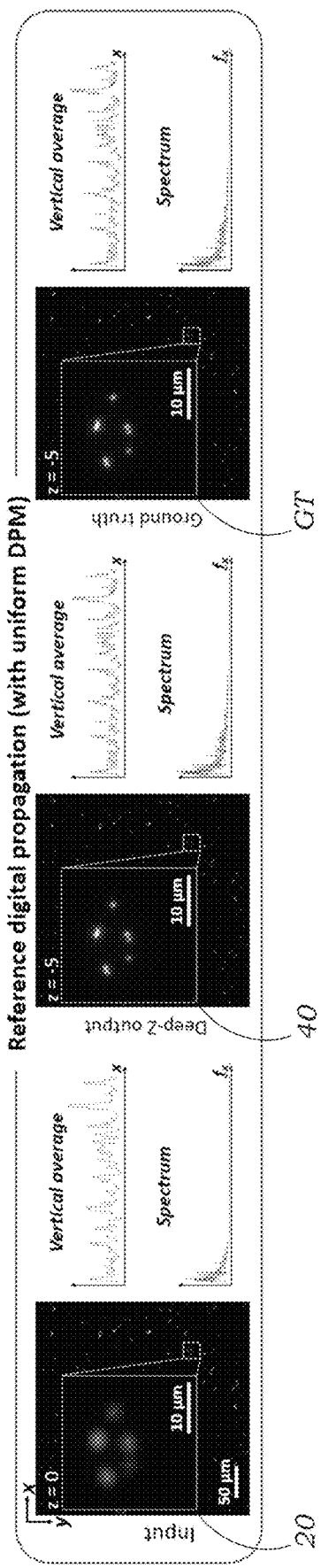
FIG. 13A illustrates a fluorescent sample consisting of 300 nm fluorescent beads digitally refocused to a plane 5 µm above the sample by appending a DPM with uniform entries. The ground truth is captured using mechanical scanning at the same plane. Vertical average (i.e., the pixel average along the y-axis of the image) and its spatial frequency spectrum (i.e., the Fourier transform of the vertical average with the zero-frequency removed) are shown next to the corresponding images.
Figure 13B:
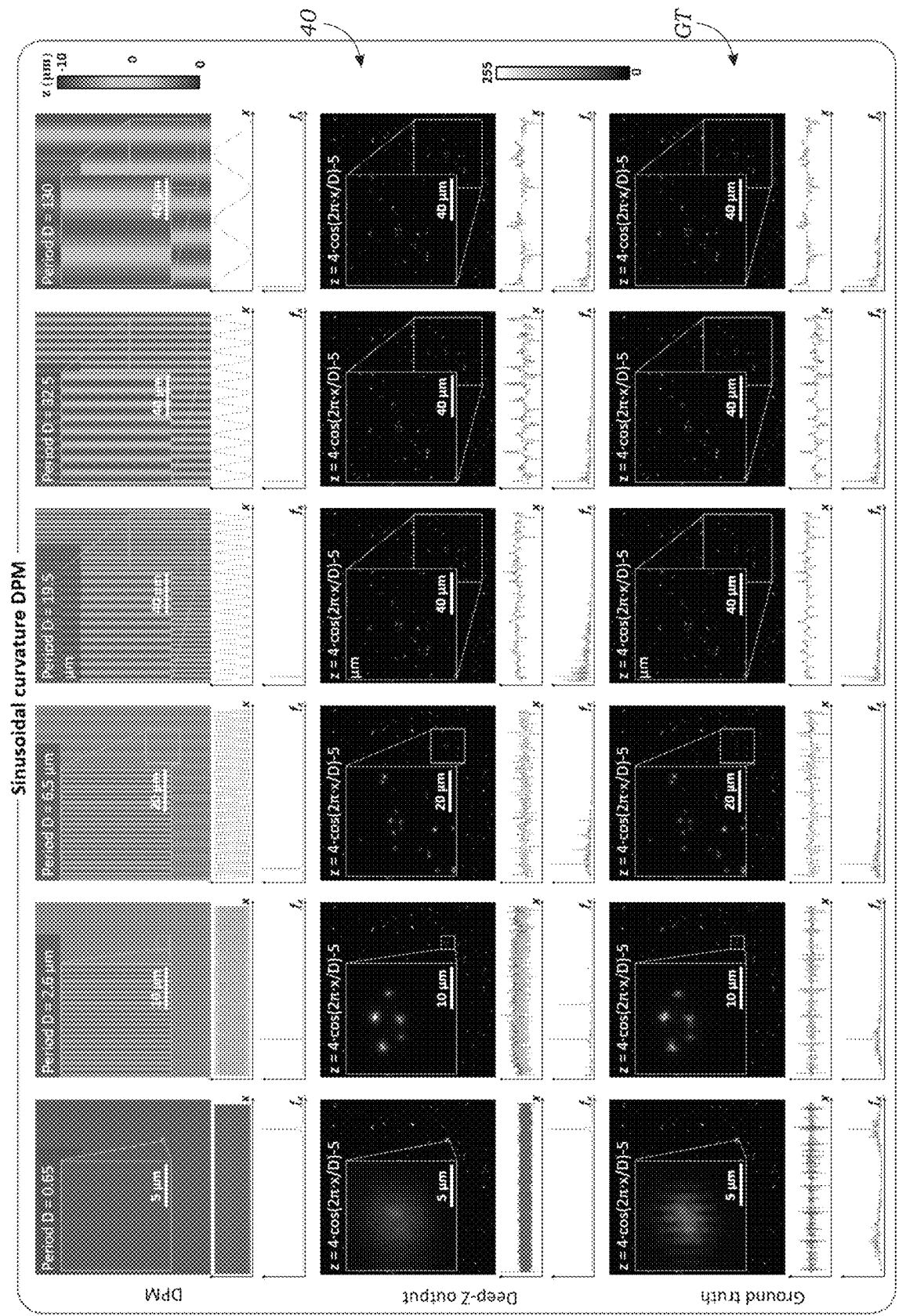
FIG. 13B illustrates digital refocusing of the same input fluorescence image of FIG. 13A by appending a DPM that defines a sinusoidal 3D surface with varying periods, from 0.65 µm to 130 µm along the x-axis, with an axial oscillation range of 8 µm, i.e., a sinusoidal depth span of −1 µm to −9 µm with respect to the input plane. The ground truth images were bicubic-interpolated in 3D from a z-scanned stack with 0.5 µm axial spacing. Vertical average of each DPM and the corresponding spatial frequency spectrum are shown below each DPM. Vertical average of the difference images (i.e., the resulting Deep-Z image minus the reference Deep-Z image in FIG. 13A as well as the ground truth image minus the reference ground truth image in FIG. 13A and the corresponding spectra are shown below each image.
Figure 13C:
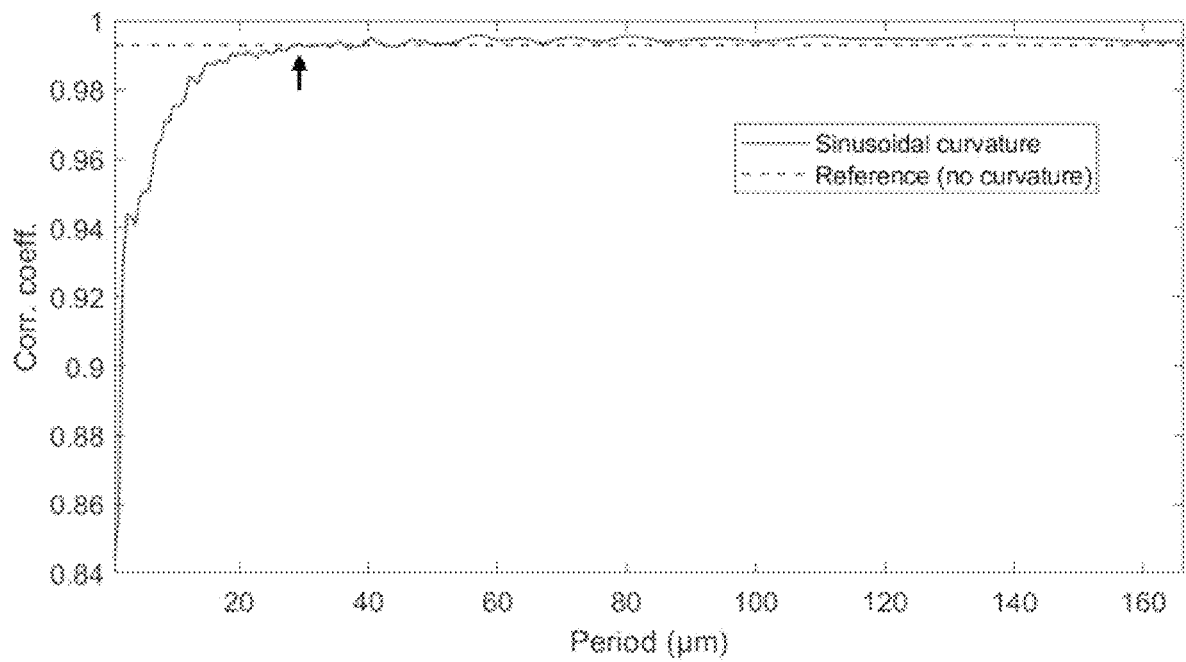
FIGS. 13C-13F illustrate correlation coefficient (Corr. Coeff.
Figure 13D:
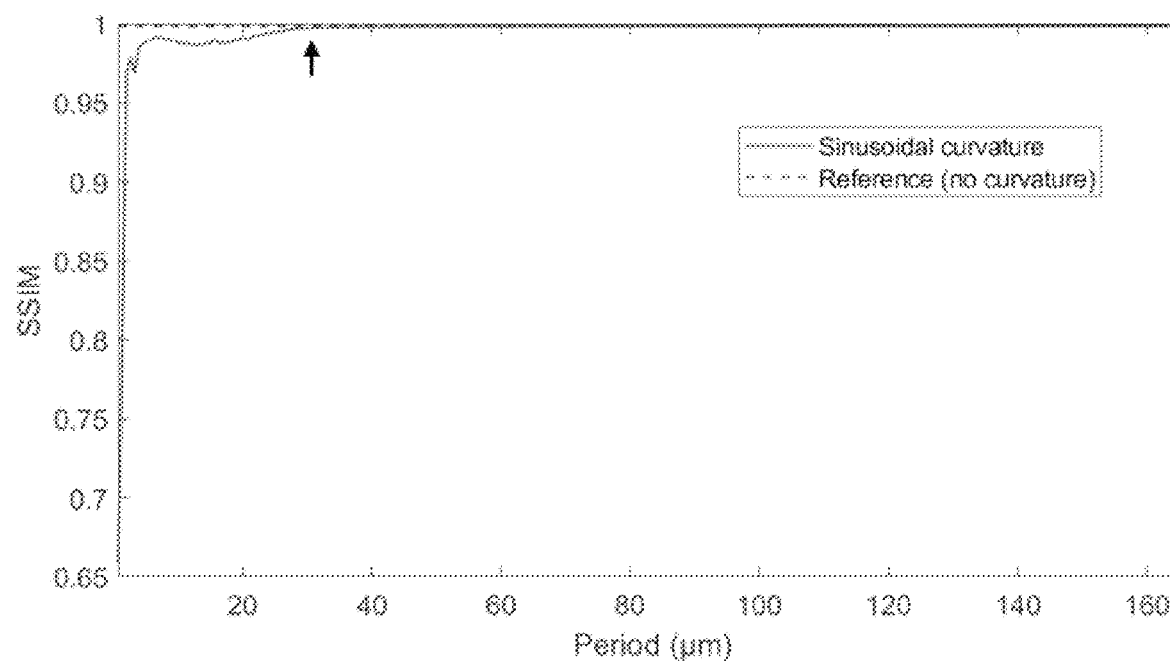
Figure 13E:
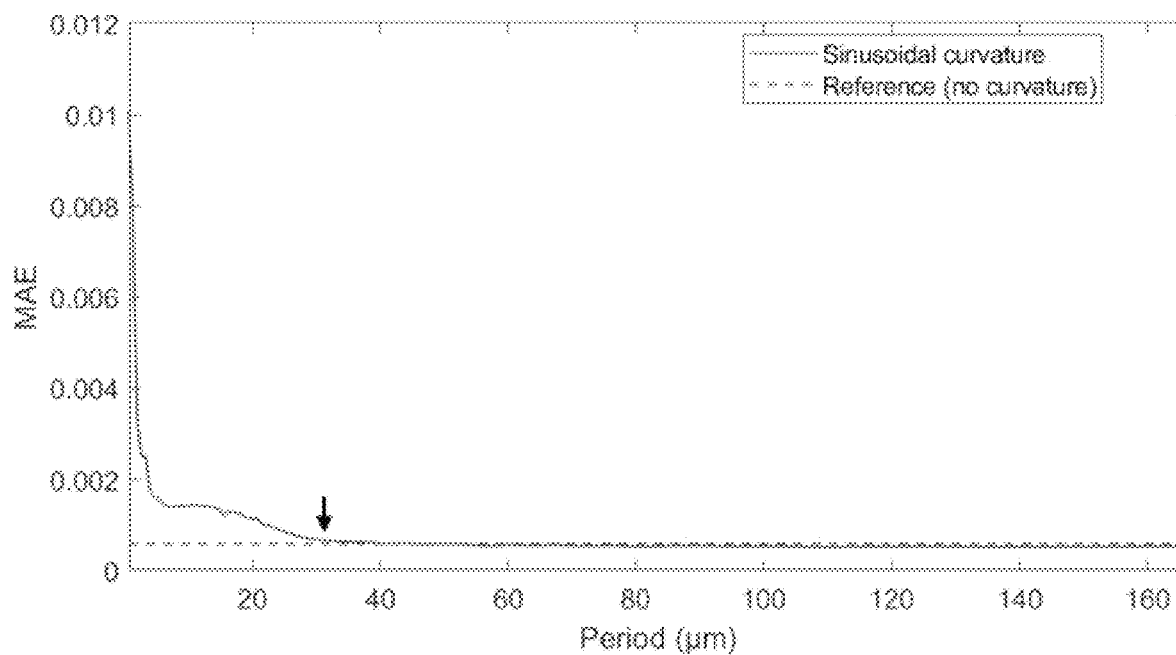
Figure 13F:
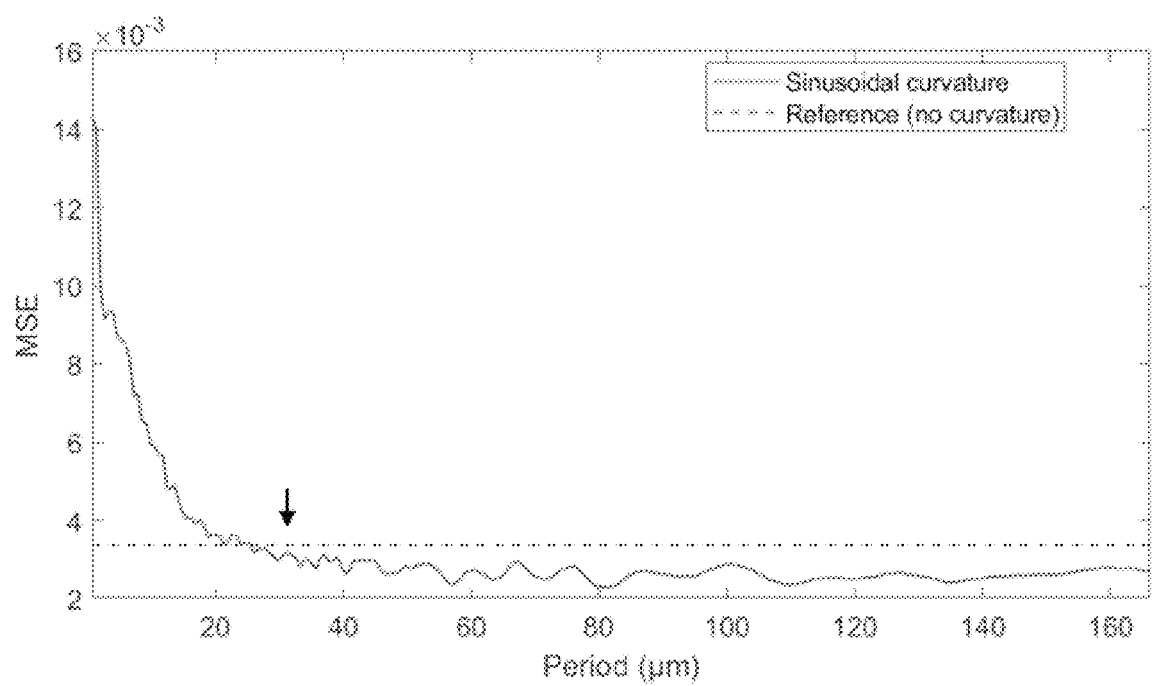

To evaluate the limitations of this technique, the 3D surface curvature was quantified that a DPM 42 can have without generating artifacts. For this, a series of DPMs 42 were used that consisted of 3D sinusoidal patterns with lateral periods of D=1, 2, . . . , 256 pixels along the x-direction (with a pixel size of 0.325 μm) and an axial oscillation range of 8 μm, i.e., a sinusoidal depth span of −1 μm to −9 μm with respect to the input plane. Each one of these 3D sinusoidal DPMs 42 was appended on an input fluorescence image 20 that was fed into the Deep-Z network 10. The network output at each sinusoidal 3D surface defined by the corresponding DPM 42 was then compared against the images that were interpolated in 3D using an axially-scanned z-stack with a scanning step size of 0.5 μm, which formed the ground truth images that were used for comparison. As summarized in FIGS. 13A-13F, the Deep-Z network 10 can reliably refocus the input fluorescence image 20 onto 3D surfaces defined by sinusoidal DPMs 42 when the period of the modulation is >100 pixels (i.e., >32 μm in object space). For faster oscillating DPMs 42, with periods smaller than 32 μm, the network output images 40 at the corresponding 3D surfaces exhibit background modulation at these high-frequencies and their harmonics as illustrated in the spectrum analysis reported in FIGS. 13-13F. These higher harmonic artifacts and the background modulation disappear for lower frequency DPMs 42, which define sinusoidal 3D surfaces at the output with a lateral period of >32 μm and an axial range of 8 μm.

Cross-Modality Digital Refocusing of Fluorescence Images: Deep-Z+

Figure 6A:
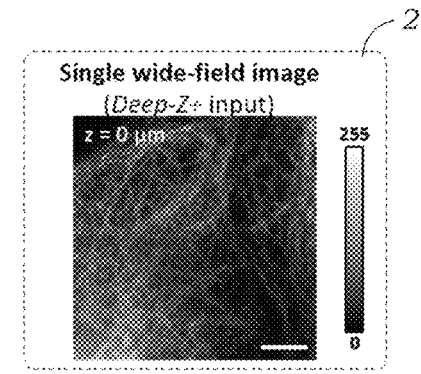
FIG. 6A illustrates a single wide-field fluorescence image (63×/1.4 NA objective lens) of BPAEC microtubule structures that is digitally refocused using Deep-Z+ to different planes in 3D, retrieving volumetric information from a single input image and performing axial sectioning at the same time.
Figures 6B, 6C:
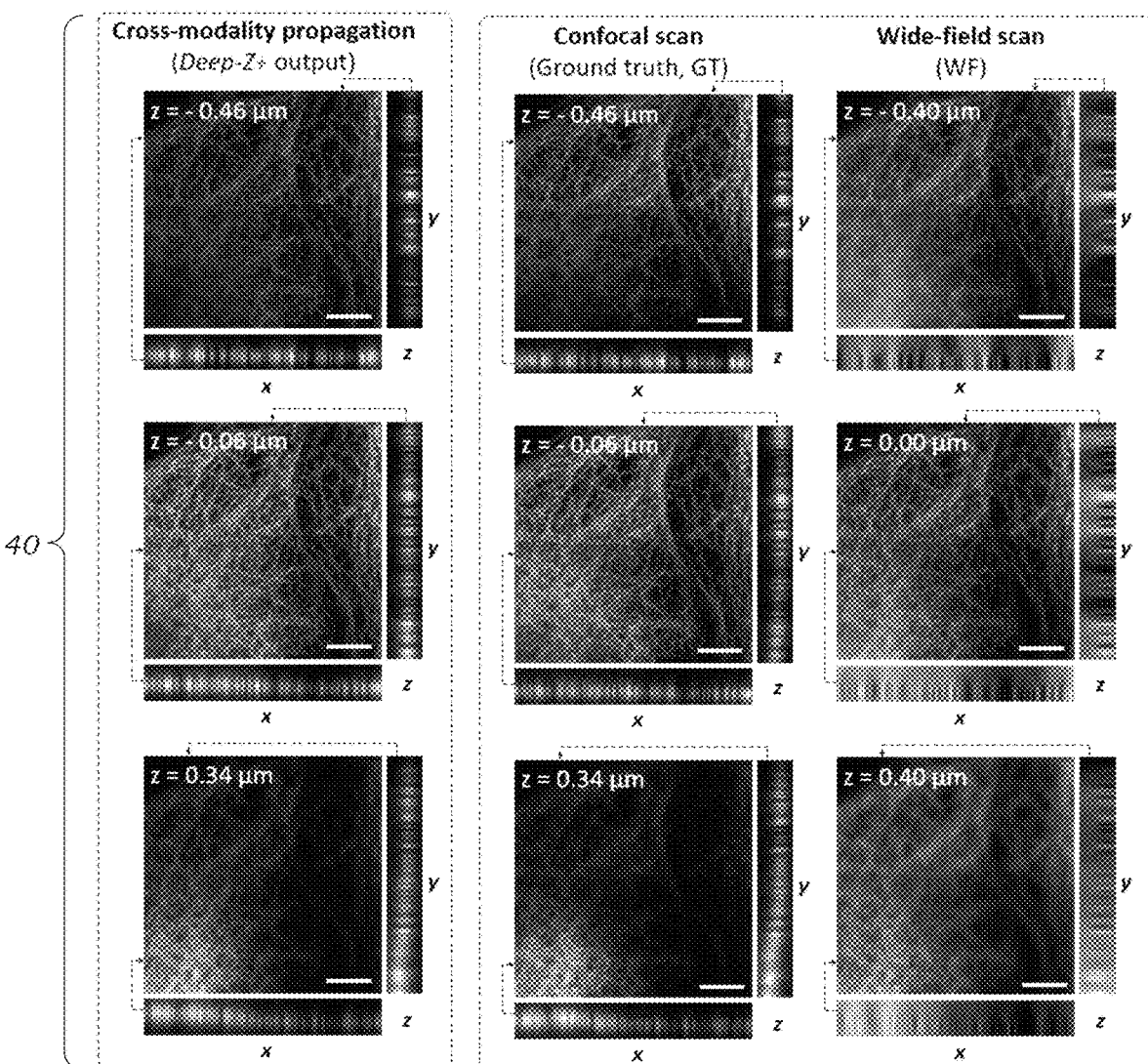
FIG. 6B illustrates the matching images (matched to FIG. 6A images) captured by a confocal microscope at the corresponding planes.
FIG. 6C illustrates the matching wide-field (WF) images (matched to FIG. 6A images) at the corresponding planes. These scanning WF images report the closest heights to the corresponding confocal images, and have 60 nm axial offset since the two image stacks are discretely scanned and digitally aligned to each other. x-z and y-z cross-sections of the refocused images are also shown to demonstrate the match between Deep-Z+ inference and the ground truth confocal microscope images of the same planes; the same cross-sections (x-z and y-z) are also shown for a wide-field scanning fluorescence microscope, reporting a significant axial blur in each case. Each cross-sectional zoomed-in image spans 1.6 μm in z-direction (with an axial step size of 0.2 μm), and the dotted arrows mark the locations, where the x-z and y-z cross-sections were taken.
Figure 6D:
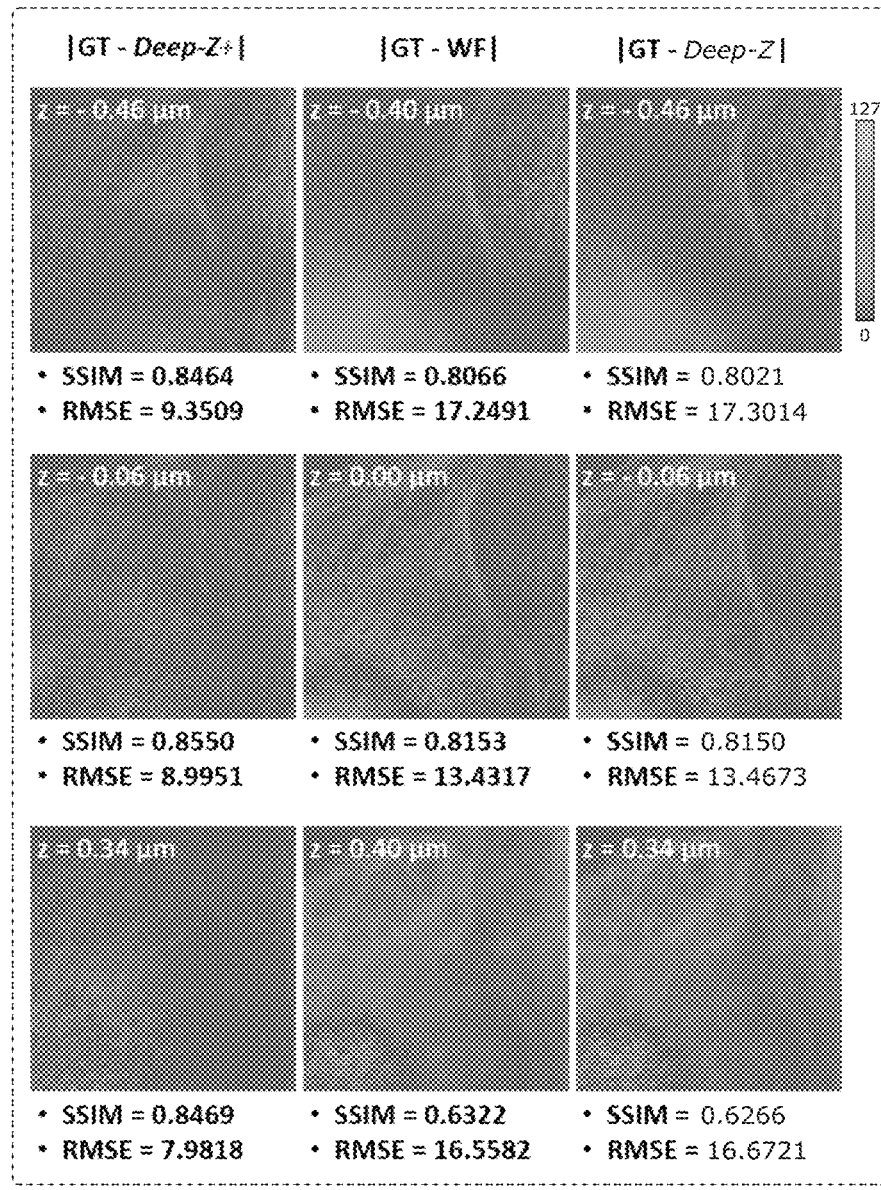
FIG. 6D illustrates the absolute difference images of the Deep-Z+ output with respect to the corresponding confocal images are also provided, with SSIM and RMSE values, further quantifying the performance of Deep-Z+. For comparison, the absolute difference images of the 'standard' Deep-Z output images as well as the scanning wide-field fluorescence microscope images are shown with respect to the corresponding confocal images, both of which report increased error and weaker SSIM compared to |GT−Deep-Z+|. The quantitative match between |GT−WF| and |GT−Deep-Z+| also suggests that the impact of 60 nm axial offset between the confocal and wide-field image stacks is negligible. Scale bar: 10 μm.

The Deep-Z system 2 enables digital refocusing of out-of-focus 3D features in a wide-field fluorescence microscope image 20 to user-defined surfaces. The same concept can also be used to perform cross-modality digital refocusing of an input fluorescence image 20, where the generator network G can be trained using pairs of input and label images captured by two different fluorescence imaging modalities (i.e., referred to as Deep-Z+). After its training, the Deep-Z+ trained deep neural network 10 learns to digitally refocus a single input fluorescence image 20 acquired by a fluorescence microscope 110 to a user-defined target surface 42 in 3D, but this time the output 40 will match an image of the same sample 12 captured by a different fluorescence imaging modality at the corresponding height/plane. To demonstrate this unique capability, a Deep-Z+ deep neural network 10 was trained using pairs of wide-field microscopy images (used as inputs) and confocal microscopy images at the corresponding planes (used as ground truth (GT) labels) to perform cross-modality digital refocusing. FIGS. 6A-6D demonstrates the blind testing results for imaging microtubule structures of BPAEC using this Deep-Z+ system 2. As seen in FIGS. 6B-6D, the trained Deep-Z+ network 10 digitally refocused the input wide field fluorescence image 20 onto different axial distances, while at the same time rejecting some of the defocused spatial features at the refocused planes, matching the confocal images of the corresponding planes, which serve as the ground truth (GT) (FIG. 6C). For instance, the microtubule structure at the lower left corner of a ROI in FIGS. 6A-6C, which was prominent at a refocusing distance of z=0.34 μm, was digitally rejected by the Deep-Z+ network 10 at a refocusing distance of z=−0.46 μm (top image of FIG. 6B) since it became out-of-focus at this axial distance, matching the corresponding image of the confocal microscope at the same depth. As demonstrated in FIGS. 6A-6D, the Deep-Z+ system 2 merges the sectioning capability of confocal microscopy with its image refocusing framework. FIGS. 6B and 6C also reports x-z and y-z cross-sections of the Deep-Z+ output images 40, where the axial distributions of the microtubule structures are significantly sharper in comparison to the axial scanning images of a wide-field fluorescence microscope, providing a very good match to the cross-sections obtained with a confocal microscope, matching the aim of its training.

The Deep-Z system 2 is powered by a trained deep neural network 2 that enables 3D refocusing within a sample 12 using a single 2D fluorescence image 20. This framework is non-iterative and does not require hyperparameter tuning following its training stage. In Deep-Z, the user can specify refocusing distances for each pixel in a DPM 42 (following the axial range used in the training), and the fluorescence image 20 can be digitally refocused to the corresponding surface through Deep-Z trained deep neural network 10, within the transformation limits reported herein (see e.g., FIG. 8 and FIGS. 13A-13F). The Deep-Z-based system 2 is also robust to changes in the density of the fluorescent objects within the sample volume (up to a limit, which is a function of the axial refocusing distance), the exposure time of the input images, as well as the illumination intensity modulation (see FIGS. 16A-16C, 19A-19B, 21A-21H, 22A-22D, 23A-23E and description for detailed results). Because the distances are encoded in DPM and modeled as a convolutional channel, one can train the network 10 with uniform DPMs 42, which still permits one to apply various non-uniform DPMs 42 during the inference stage as reported herein for e.g., correcting the sample drift, tilt, curvature or other optical aberrations, which brings additional degrees-of-freedom to the imaging system.

Figure 24A:
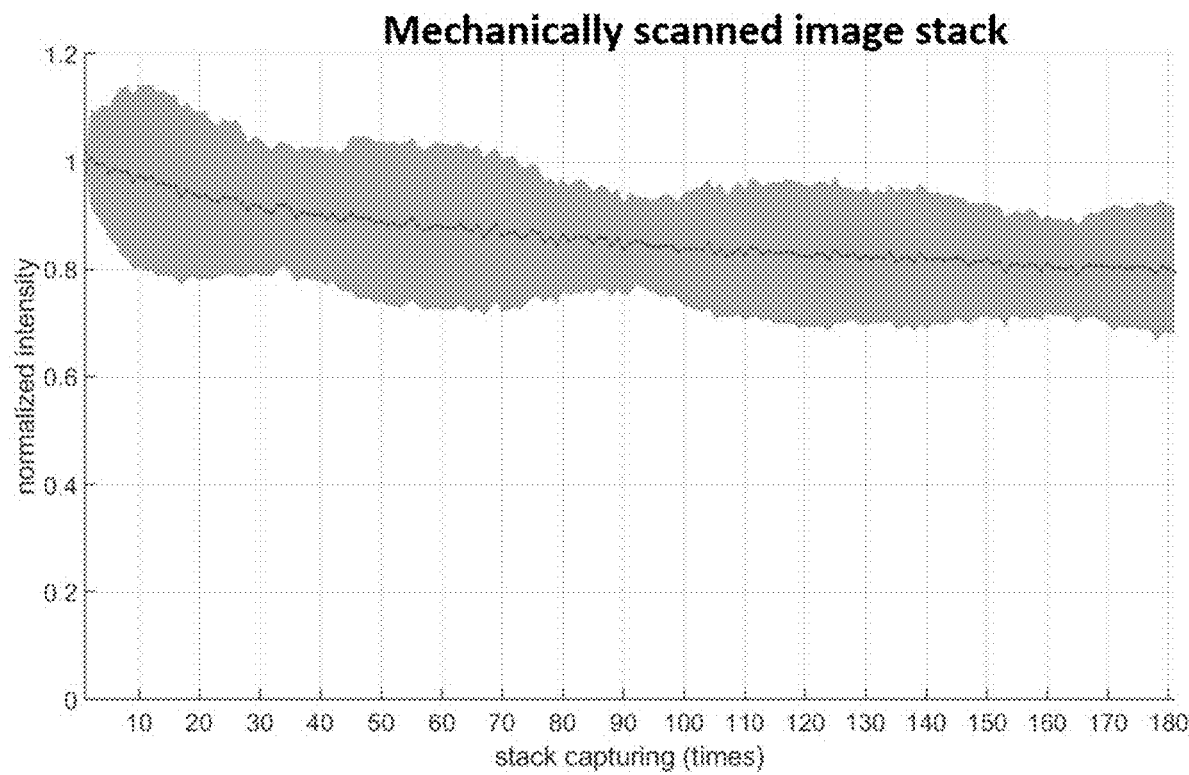
FIG. 24A illustrates the fluorescence signal of nanobeads imaged in 3D, for 180 times of repeated axial scans, containing 41 planes, spanning +/−10 µm with a step size 0.5 µm. The accumulated scanning time is ~30 min.
Figure 24B:
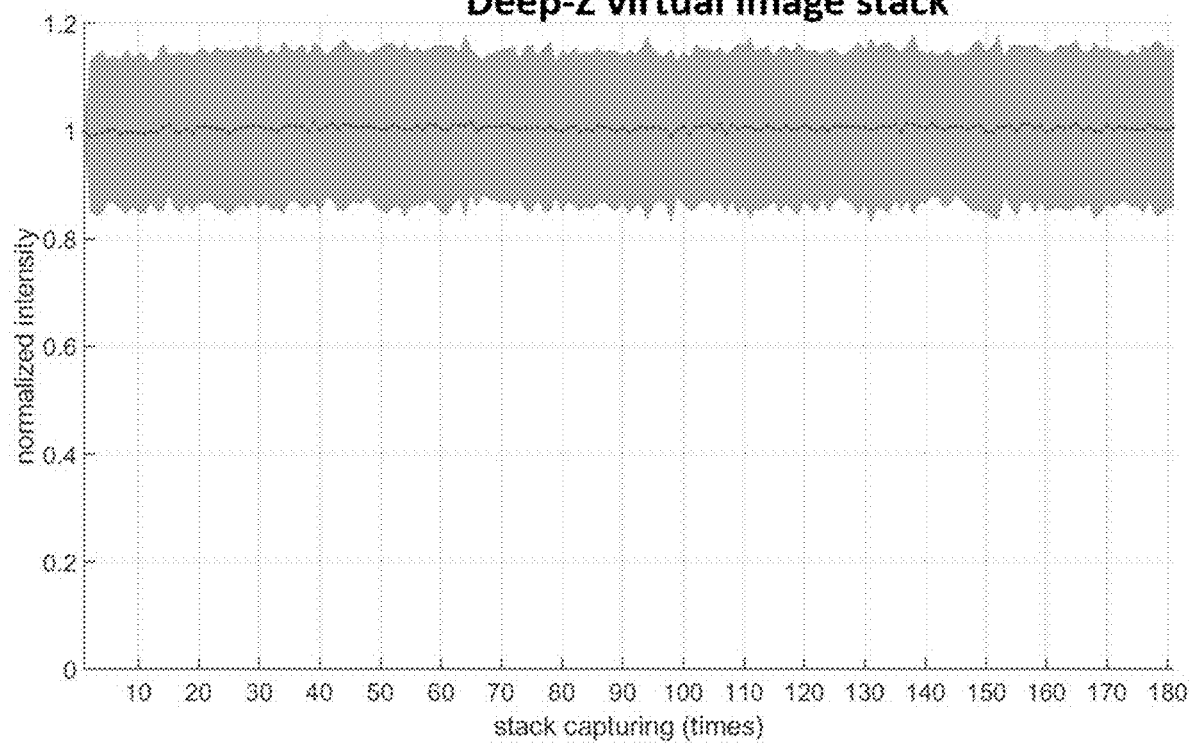
FIG. 24B illustrates the corresponding scan for a single plane, which is used by Deep-Z to generate a virtual image stack, spanning the same axial depth within the sample (+/−10 µm). The accumulated scanning time for Deep-Z is ~15 seconds. The center line represents the mean and the shaded region represents the standard deviation of the normalized intensity for 681 and 597 individual nanobeads (for date in FIGS. 24A and 24B, respectively) inside the sample volume.

Deep learning has also been recently demonstrated to be very effective in performing deconvolution to boost the lateral and the axial resolution in microscopy images. The Deep-Z network 10 is unique as it selectively deconvolves the spatial features that come into focus through the digital refocusing process (see e.g. FIG. 11), while convolving other features that go out-of-focus, bringing the contrast to in-focus features, based on a user-defined DPM 42. Through this Deep-Z framework, the snapshot 3D refocusing capability of coherent imaging and holography is brought to incoherent fluorescence microscopy, without any mechanical scanning, additional hardware components, or a trade-off of imaging resolution or speed. This not only significantly boosts the imaging speed, but also reduces the negative effects of photobleaching and phototoxicity on the sample 12. For a widefield fluorescence microscopy experiment, where an axial image stack is acquired, the illumination excites the fluorophores through the entire thickness of the specimen or sample 12, and the total light exposure of a given point within the sample volume is proportional to the number of imaging planes ($N_z$) that are acquired during a single-pass z-stack. In contrast, the Deep-Z system 2 only requires a single image acquisition step, if its axial training range covers the sample depth. Therefore, this reduction, enabled by the Deep-Z system 2, in the number of axial planes that need to be imaged within a sample volume directly helps to reduce the photodamage to the sample (see, e.g., FIGS. 24A-24B).

Finally, it should be noted that the retrievable axial range in this method depends on the SNR of the recorded image, i.e., if the depth information carried by the PSF fails below the noise floor, accurate inference will become a challenging task. To validate the performance of a pre-trained Deep-Z network model 10 under variable SNR, the inference of Deep-Z was tested under different exposure conditions (FIGS. 16A-16C), revealing the robustness of its inference over a broad range of image exposure times that were not included in the training data. An enhancement of ~20× in the DOF of a wide-field fluorescence image was demonstrated using the Deep-Z system 2. This axial refocusing range is in fact not an absolute limit but rather a practical choice for training data, and it may be further improved through hardware modifications to the optical set-up by e.g., engineering the PSF in the axial direction. In addition to requiring extra hardware and sensitive alignment/calibration, such approaches would also require brighter fluorophores, to compensate for photon losses due to the insertion of additional optical components in the detection path.

Methods

Sample Preparation

The 300 nm red fluorescence nano-beads were purchased from MagSphere Inc. (Item #PSF-300NM 0.3 UM RED), diluted by 5,000 times with methanol, and ultrasonicated for 15 minutes before and after dilution to break down the clusters. For the fluorescent bead samples on a flat surface and a tilted surface, a #1 coverslip (22×22 $mm^2$, ~150 µm thickness) was thoroughly cleaned and plasma treated. Then, a 2.5 µL droplet of the diluted bead sample was pipetted onto the coverslip and dried. For the fluorescent bead sample 12 on a curved (cylindrical) surface, a glass tube (7.2 mm diameter) was thoroughly cleaned and plasma treated. Then a 2.5 µL droplet of the diluted bead sample 12 was pipetted onto the outer surface of the glass tube and dried.

Structural imaging of C. elegans neurons was carried out in strain AML18. AML18 carries the genotype wtfIs3 [rab-3p::NLS::GFP+rab-3p::NLS::tagRFP] and expresses GFP and tagRFP in the nuclei of all the neurons. For functional imaging, the strain AML32 was used, carrying wtfIs5 [rab-3p::NLS::GCaMP6s+rab-3p::NLS::tagRFP]. The strains were acquired from the Caenorhabditis Genetics Center (CGC). Worms were cultured on Nematode Growth Media (NGM) seeded with OP50 bacteria using standard conditions. For imaging, worms were washed off the plates with M9, and anaesthetized with 3 mM levamisole. Anaesthetized worms were then mounted on slides seeded with 3% Agarose. To image moving worms, the levamisole was omitted.

Two slides of multi-labeled bovine pulmonary artery endothelial cells (BPAEC) were acquired from Thermo Fisher: FluoCells Prepared Slide #1 and FluoCells Prepared Slide #2. These cells were labeled to express different cell structures and organelles. The first slide uses Texas Red for mitochondria and FITC for F-actin structures. The second slide uses FITC for microtubules.

Fluorescence Image Acquisition

The fluorescence images of nano-beads, C. elegans structure and BPAEC samples were captured by an inverted scanning microscope (IX83, Olympus Life Science) using a 20×/0.75 NA objective lens (UPLSAPO20X, Olympus Life Science). A 130 W fluorescence light source (U-HGLGPS, Olympus Life Science) was used at 100% output power. Two bandpass optical filter sets were used: Texas Red and FITC. The bead samples were captured by placing the coverslip with beads directly on the microscope sample mount. The tilted surface sample was captured by placing the coverslip with beads on a 3D-printed holder, which creates a 1.5° tilt with respect to the focal plane. The cylindrical tube surface with fluorescent beads was placed directly on the microscope sample mount. These fluorescent bead samples were imaged using Texas Red filter set. The C. elegans sample slide was placed on the microscope sample mount and imaged using Texas Red filter set. The BPAEC slide was placed on the microscope sample mount and imaged using Texas Red and FITC filter sets. For all the samples, the scanning microscope had a motorized stage (PROSCAN XY STAGE KIT FOR IX73/83) that moved the samples to different FOVs and performed image-contrast-based auto-focus at each location. The motorized stage was controlled using MetaMorph® microscope automation software (Molecular Devices, LLC). At each location, the control software autofocused the sample based on the standard deviation of the image, and a z-stack was taken from −20 µm to 20 µm with a step size of 0.5 µm. The image stack was captured by a monochrome scientific CMOS camera (ORCA-flash4.0 v2, Hamamatsu Photonics K.K.), and saved in non-compressed tiff format, with 81 planes and 2048×2048 pixels in each plane.

The images of C. elegans neuron activities were captured by another scanning wide-field fluorescence microscope (TCS SP8, Leica Microsystems) using a 20×/0.8 NA objective lens (HCPLAPO20×/0.80DRY, Leica Microsystems) and a 40×/1.3 NA objective lens (HC PL APO 40×/1.30 OIL, Leica Microsystems). Two bandpass optical filter sets were used: Texas Red and FITC. The images were captured by a monochrome scientific CMOS camera (Leica-DFC9000GTC-VSC08298). For capturing image stacks of anesthetized worms, the motorized stage controlled by a control software (LAS X, Leica Microsystems) moved the sample slide to different FOVs. At each FOV, the control software took a z-stack from −20 µm to 20 µm with a step size of 0.5 µm for the 20×/0.8NA objective lens images, and with a step size of 0.27 µm for the 40×/1.3 NA objective lens images, with respect to a middle plane (z=0 µm). Two images were taken at each z-plane, for Texas Red channel and FITC channel respectively. For capturing 2D videos of dynamic worms, the control software took a time-lapsed video that also time-multiplexed the Texas Red and FITC channels at the maximum speed of the system. This resulted in an average framerate of ~3.6 fps for a maximum camera framerate of 10 fps, for imaging both channels.

The BPAEC wide-field and confocal fluorescence images were captured by another inverted scanning microscope (TCS SP5, Leica Microsystems). The images were acquired using a 63×/1.4 NA Objective lens (HC PL APO 63×/1.40 Oil CS2, Leica Microsystems) and FITC filter set was used. The wide-field images were recorded by a CCD with 1380×1040 pixels and 12-bit dynamic range, whereas the confocal images were recorded by a photo-multiplier tube (PMT) with 8-bit dynamic range (1024×1024 pixels). The scanning microscope had a motorized stage that moved the sample to different FOVs and depths. For each location, a stack of 12 images with 0.2 µm axial spacing was recorded.

Image Pre-Processing and Training Data Preparation

Each captured image stack was first axially aligned using an ImageJ plugin named "StackReg", which corrects the rigid shift and rotation caused by the microscope stage inaccuracy. Then an extended depth of field (EDF) image was generated using another ImageJ plugin named "Extended Depth of Field." This EDF image was used as a reference image to normalize the whole image stack, following three steps: (1) Triangular threshold was used on the image to separate the background and foreground pixels; (2) the mean intensity of the background pixels of the EDF image was determined to be the background noise and subtracted; (3) the EDF image intensity was scaled to 0-1, where the scale factor was determined such that 1% of the foreground pixels above the background were greater than one (i.e., saturated); and (4) each image in the stack was subtracted by this background level and normalized by this intensity scaling factor. For testing data without an image stack, steps (1)-(3) were applied on the input image instead of the EDF image.

To prepare the training and validation datasets, on each FOV, a geodesic dilation with fixed thresholds was applied on fluorescence EDF images to generate a mask that represents the regions containing the sample fluorescence signal above the background. Then, a customized greedy algorithm was used to determine a minimal set of regions with 256×256 pixels that covered this mask, with 5% area overlaps between these training regions. The lateral locations of these regions were used to crop images on each height of the image stack, where the middle plane for each region was set to be the one with the highest standard deviation. Then 20 planes above and 20 planes below this middle plane were set to be the range of the stack, and an input image plane was generated from each one of these 41 planes. Depending on the size of the data set, around 5-10 out of these 41 planes were randomly selected as the corresponding target plane, forming around 150 to 300 image pairs. For each one of these image pairs, the refocusing distance was determined based on the location of the plane (i.e., 0.5 μm times the difference from the input plane to the target plane). By repeating this number, a uniform DPM 42 was generated and appended to the input fluorescence image 20. The final dataset typically contained ~100,000 image pairs. This was randomly divided into a training dataset and a validation dataset, which took 85% and 15% of the data respectively. During the training process, each data point was further augmented five times by flipping or rotating the images by a random multiple of 90°. The validation dataset was not augmented. The testing dataset was cropped from separate measurements with sample FOVs that do not overlap with the FOVs of the training and validation data sets.

Deep-Z Network Architecture

The Deep-Z network is formed by a least square GAN (LS-GAN) framework, and it is composed of two parts: a generator (G) and a discriminator (D), as shown in FIG. 14. The generator (G) is a convolutional neural network (CNN and consists of a down-sampling path 44 and a symmetric up-sampling path 46. In the down sampling path 44, there are five down-sampling blocks. Each block contains two convolutional layers that map the input tensor $x_k$ to the output tensor $x_{k+1}$:

$$x_{k+1} = x_k + \text{ReLU}[\text{CONV}_{k_2}\{\text{ReLU}[\text{CONV}_{k_1}\{x_k\}]\}] \quad (1)$$

where ReLU[.] stands for the rectified linear unit operation, and CONV{.} stands for the convolution operator (including the bias terms). The subscript of CONV denotes the number of channels in the convolutional layer; along the down-sampling path one has: $k_1$=25, 72, 144, 288, 576 and $k_2$=48, 96, 192, 384, 768 for levels k=1, 2, 3, 4, 5, respectively. The "+" sign in Eq. (1) represents a residual connection. Zero padding was used on the input tensor $x_k$ to compensate for the channel number mismatch between the input and output tensors. The connection between two consecutive down-sampling blocks is a 2×2 max-pooling layer with a stride of 2×2 pixels to perform a 2× down-sampling. The fifth down-sampling block connects to the up-sampling path, which will be detailed next.

In the up-sampling path 46, there are four corresponding up-sampling blocks, each of which contains two convolutional layers that map the input tensor $y_{k+1}$ to the output tensor $y_k$ using:

$$y_k = \text{ReLU}[\text{CONV}_{k_4}\{\text{ReLU}[\text{CONV}_{k_3}\{\text{CAT}(x_{k+1}, y_{k+1})\}]\}] \quad (2)$$

where the CAT(•) operator represents the concatenation of the tensors along the channel direction, i.e. CAT($x_{k+1}$, $y_{k+1}$) appends tensor $x_{k+1}$ from the down-sampling path to the tensor $y_{k+1}$ in the up-sampling path at the corresponding level k+1. The number of channels in the convolutional layers, denoted by $k_3$ and $k_4$, are $k_3$=72, 144, 288, 576 and $k_4$=48, 96, 192, 384 along the up-sampling path for k=1, 2, 3, 4, respectively. The connection between consecutive up-sampling blocks is an up-convolution (convolution transpose) block that up-samples the image pixels by 2×. The last block is a convolutional layer that maps the 48 channels to one output channel (see FIG. 14).

The discriminator is a convolutional neural network that consists of six consecutive convolutional blocks, each of which maps the input tensor $z_i$ to the output tensor $z_{i+1}$, for a given level i:

$$z_{i+1} = \text{LReLU}[\text{CONV}_{i_2}\{\text{LReLU}[\text{CONV}_{i_1}\{z_i\}]\}] \quad (3)$$

where the LReLU stands for leaky ReLU operator with a slope of 0.01. The subscript of the convolutional operator represents its number of channels, which are $i_1$=48, 96, 192, 384, 768, 1536 and $i_2$=96, 192, 384, 768, 1536, 3072, for the convolution block i=1, 2, 3, 4, 5, 6, respectively.

After the last convolutional block, an average pooling layer flattens the output and reduces the number of parameters to 3072. Subsequently there are fully-connected (FC) layers of size 3072×3072 with LReLU activation functions, and another FC layer of size 3072×1 with a Sigmoid activation function. The final output represents the discriminator score, which falls within (0, 1), where 0 represents a false and 1 represents a true label.

All the convolutional blocks use a convolutional kernel size of 3×3 pixels, and replicate padding of one pixel unless mentioned otherwise. All the convolutions have a stride of 1×1 pixel, except the second convolutions in Eq. (3), which has a stride of 2×2 pixels to perform a 2× down-sampling in the discriminator path. The weights are initialized using the Xavier initializer, and the biases are initialized to 0.1.

Training and Testing of the Deep-Z Network

The Deep-Z network 10 learns to use the information given by the appended DPM 42 to digitally refocus the input image 20 to a user-defined plane. In the training phase, the input data of the generator G(.) have the dimensions of 256×256×2, where the first channel is the fluorescence image, and the second channel is the user-defined DPM. The target data of G(.) have the dimensions of 256×256, which represent the corresponding fluorescence image at a surface specified by the DPM. The input data of the discriminator D(.) have the dimensions of 256×256, which can be either the generator output or the corresponding target $z^{(i)}$. During the training phase, the network iteratively minimizes the generator loss $L_G$ and discriminator loss $L_D$, defined as:

$$L_G = \frac{1}{2N} \cdot \sum_{i=1}^{N} [D(G(x^{(i)})) - 1]^2 + \alpha \cdot \frac{1}{2N} \cdot \sum_{i=1}^{N} MAE(x^{(i)}, z^{(i)}) \quad (4)$$

$$L_D = \frac{1}{2N} \cdot \sum_{i=1}^{N} [D(G(x^{(i)}))]^2 + \frac{1}{2N} \cdot \sum_{i=1}^{N} [D(z^{(i)}) - 1]^2 \quad (5)$$

where N is the number of images used in each batch (e.g., N=20), $G(x^{(i)})$ is the generator output for the input $x^{(i)}$, $z^{(i)}$ is the corresponding target label, D(.) is the discriminator, and MAE(.) stands for mean absolute error. α is a regularization parameter for the GAN loss and the MAE loss in $L_G$. In the training phase, it was chosen as α=0.02. For training stability and optimal performance, adaptive momentum optimizer (Adam) was used to minimize both $L_G$ and $L_D$, with a learning rate of $10^{-4}$ and $3 \times 10^{-5}$ for $L_G$ and $L_D$ respectively. In each iteration, six updates of the generator loss and three updates of the discriminator loss were performed. The validation set was tested every 50 iterations, and the best network (to be blindly tested) was chosen to be the one with the smallest MAE loss on the validation set.

In the testing phase, once the training is complete, only the generator network (G) is active. Thus, the trained deep neural network 10 in the final, trained only includes the generator network (G). Limited by the graphical memory of the GPU, the largest image FOV that was tested was 1536×1536 pixels. Because image was normalized to be in the range 0-1, whereas the refocusing distance was on the scale of around −10 to 10 (in units of μm), the DPM entries were divided by 10 to be in the range of −1 to 1 before the training and testing of the Deep-Z network, to keep the dynamic range of the image and DPM matrices similar to each other.

The network was implemented using Tensorflow, performed on a PC with Intel Core i7-8700K six-core 3.7 GHz CPU and 32 GB RAM, using a Nvidia GeForce 1080Ti GPU. On average, the training takes ~70 hours for ~400,000 iterations (equivalent to ~50 epochs). After the training, the network inference time was ~0.2 s for an image with 512×512 pixels and ~1 s for an image with 1536×1536 pixels on the same PC.

Measurement of the Lateral and Axial FWHM Values of the Fluorescent Beads Samples.

For characterizing the lateral FWHM of the fluorescent bead samples, a threshold was performed on the image to extract the connected components. Then, individual regions of 30×30 pixels were cropped around the centroid of these connected components. A 2D Gaussian fit was performed on each of these individual regions, which was done using 1 sqcurvefit in Matlab (MathWorks, Inc) to match the function:

$$I(x, y) = A \cdot \exp\left[\frac{(x - x_c)^2}{2 \cdot \sigma_x^2} + \frac{(y - y_c)^2}{2 \cdot \sigma_y^2}\right] \quad (6)$$

The lateral FWHM was then calculated as the mean FWHM of x and y directions, i.e., $$FWHM_{lateral} = 2\sqrt{2 \ln 2} \cdot \frac{\sigma_x \cdot \Delta_x + \sigma_y \cdot \Delta_y}{2} \quad (7)$$

where $\Delta_x = \Delta_y = 0.325$ μm was the effective pixel size of the fluorescence image on the object plane. A histogram was subsequently generated for the lateral FWHM values for all the thresholded beads (e.g., n=461 for FIGS. 2A-2C and n>750 for FIGS. 5A-5L).

To characterize the axial FWHM values for the bead samples, slices along the x-z direction with 81 steps were cropped at $y=y_c$ for each bead, from either the digitally refocused or the mechanically-scanned axial image stack. Another 2D Gaussian fit was performed on each cropped slice, to match the function:

$$I(x, z) = A \cdot \exp\left[\frac{(x - x_c)^2}{2 \cdot \sigma_x^2} + \frac{(z - z_c)^2}{2 \cdot \sigma_z^2}\right] \quad (8)$$

The axial FWHM was then calculated as:

$$FWHM_{axial} = 2\sqrt{2\ln 2} \cdot \sigma_z \cdot \Delta_z \quad (9)$$

where $\Delta_z = 0.5$ μm was the axial step size. A histogram was subsequently generated for the axial FWHM values.

Image Quality Evaluation

The network output images $I^{out}$ were evaluated with reference to the corresponding ground truth images $I^{GT}$ using five different criteria: (1) mean square error (MSE), (2) root mean square error (RMSE), (3) mean absolute error (MAE), (4) correlation coefficient, and (5) structural similarity index (SSIM). The MSE is one of the most widely used error metrics, defined as:

$$MSE(I^{out}, I^{GT}) = \frac{1}{N_x \cdot N_y} \|I^{out} - I^{GT}\|_2^2 \quad (10)$$

where $N_x$ and $N_y$ represent the number of pixels in the x and y directions, respectively. The square root of MSE results in RMSE. Compared to MSE, MAE uses 1-norm difference (absolute difference) instead of 2-norm difference, which is less sensitive to significant outlier pixels:

$$MAE(I^{out}, I^{GT}) = \frac{1}{N_x \cdot N_y} \|I^{out} - I^{GT}\|_1 \quad (11)$$

The correlation coefficient is defined as:

$$corr(I^{out}, I^{GT}) = \frac{\sum_x \sum_y (I_{xy}^{out} - \mu_{out})(I_{xy}^{GT} - \mu_{GT})}{\sqrt{(\sum_x \sum_y (I_{xy}^{out} - \mu_{out})^2)(\sum_x \sum_y (I_{xy}^{GT} - \mu_{GT})^2)}} \quad (12)$$

where $\mu_{out}$ and $\mu_{GT}$ are the mean values of the images $I^{out}$ and $I^{GT}$ respectively.

While these criteria listed above can be used to quantify errors in the network output compared to the ground truth (GT), they are not strong indicators of the perceived similarity between two images. SSIM aims to address this shortcoming by evaluating the structural similarity in the images, defined as:

$$SSIM(I^{out}, I^{GT}) = \frac{(2\mu_{out}\mu_{GT} + C_1)(2\sigma_{out,GT} + C_2)}{(\mu_{out}^2 + \mu_{GT}^2 + C_1)(\sigma_{out}^2 + \sigma_{GT}^2 + C_2)} \quad (13)$$

where $\sigma_{out}$ and $\sigma_{GT}$ are the standard deviations of $I^{out}$ and $I^{GT}$ respectively, and $\sigma_{out,GT}$ is the cross-variance between the two images.

Tracking and Quantification of *C. elegans* Neuron Activity

The *C. elegans* neuron activity tracking video was captured by time-multiplexing the two fluorescence channels (FITC, followed by TexasRed, and then FITC and so on). The adjacent frames were combined so that the green color channel was FITC (neuron activity) and the red color channel was Texas Red (neuron nuclei). Subsequent frames were aligned using a feature-based registration toolbox with projective transformation in Matlab (MathWorks, Inc.) to correct for slight body motion of the worms. Each input video frame was appended with DPMs 42 representing propagation distances from −10 μm to 10 μm with 0.5 μm step size, and then tested through a Deep-Z network 10 (specifically trained for this imaging system), which generated a virtual axial image stack for each frame in the video.

To localize individual neurons, the red channel stacks (Texas Red, neuron nuclei) were projected by median-intensity through the time sequence. Local maxima in this projected median intensity stack marked the centroid of each neuron and the voxels of each neuron was segmented from these centroids by watershed segmentation, which generated a 3D spatial voxel mask for each neuron. A total of 155 neurons were isolated. Then, the average of the 100 brightest voxels in the green channel (FITC, neuron activity) inside each neuron spatial mask was calculated as the calcium activity intensity $F_i(t)$, for each time frame t and each neuron i=1,2, ..., 155. The differential activity was then calculated, $\Delta F(t)=F(t)-F_0$, for each neuron, where $F_0$ is the time average of $F(t)$.

By thresholding on the standard deviation of each $\Delta F(t)$, the 70 most active cells were selected further clustering was performed on them based on their calcium activity pattern similarity (FIG. 12B) using a spectral clustering algorithm. The calcium activity pattern similarity was defined as $$S_{ij} = \exp\left(-\frac{\left\|\frac{\Delta F_i(t)}{F_{i0}} - \frac{\Delta F_j(t)}{F_{j0}}\right\|^2}{\sigma^2}\right) \quad (14)$$

for neurons i and j, which results in a similarity matrix S (FIG. 12C). σ=1.5 is the standard deviation of this Gaussian similarity function, which controls the width of the neighbors in the similarity graph. The spectral clustering solves an eigen-value problem on the graph Laplacian L generated from the similarity matrix S, defined as the difference of weight matrix W and degree matrix D, i.e., $$L = D - W \quad (15)$$

where $$W_{ij} = \begin{cases} S_{ij} & \text{if } i \neq j \\ 0 & \text{if } i = j \end{cases} \quad (16)$$

$$D_{ij} = \begin{cases} \sum_j W_{ij} & \text{if } i = j \\ 0 & \text{if } i \neq j \end{cases} \quad (17)$$

Figure 12A:
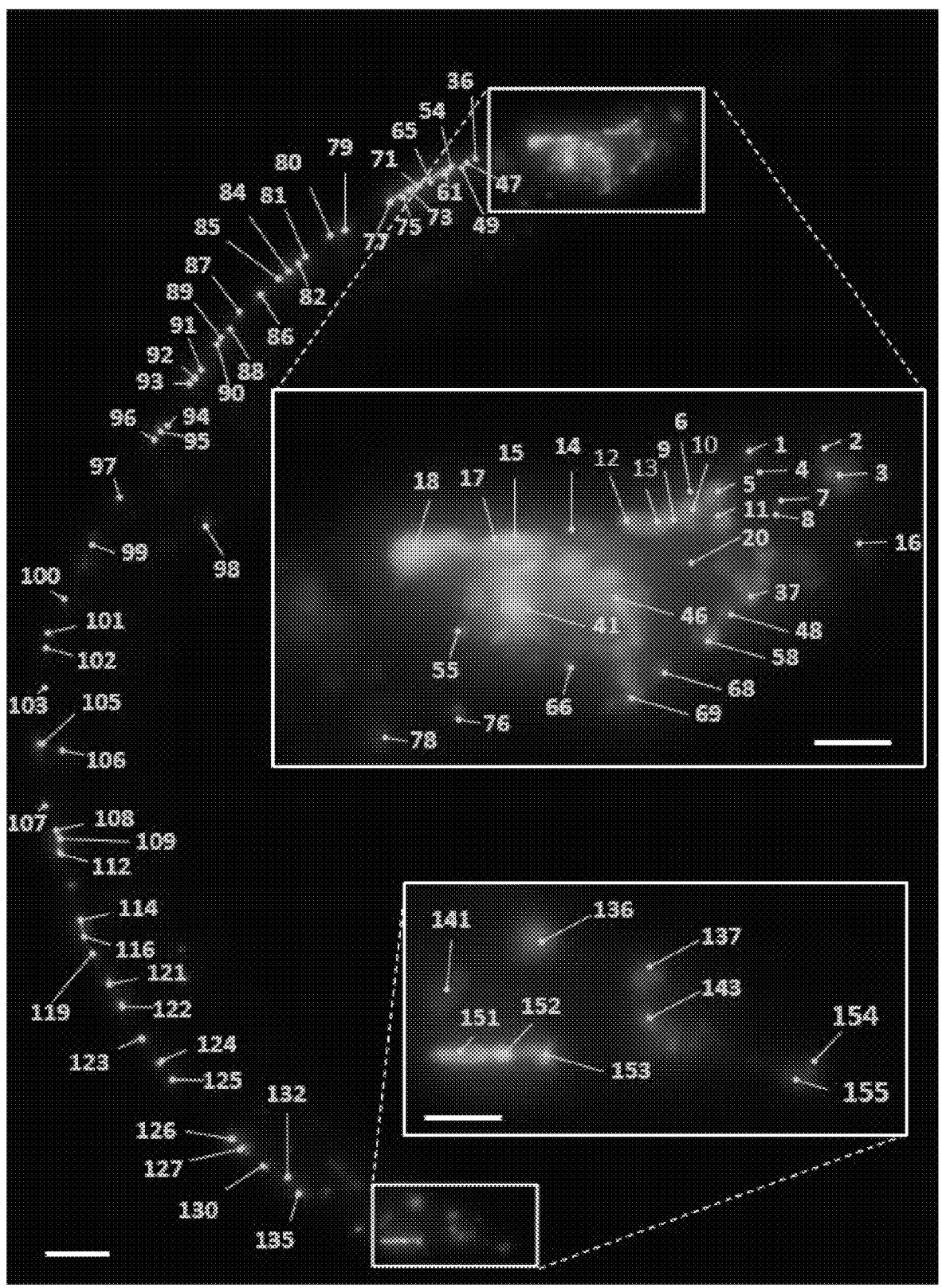
FIG. 12A illustrates the max intensity projection (MIP) (C. elegans neuron activity tracking and clustering) along the axial direction of the median intensity image over time. The red channel (Texas red) labels neuron nuclei and the green channel (FITC) labels neuron calcium activity. A total of 155 neurons were identified in the 3D stack, as labeled here. Scale bar: 25 µm. Scale bar for the zoom-in regions: 10 µm.
Figure 12B:
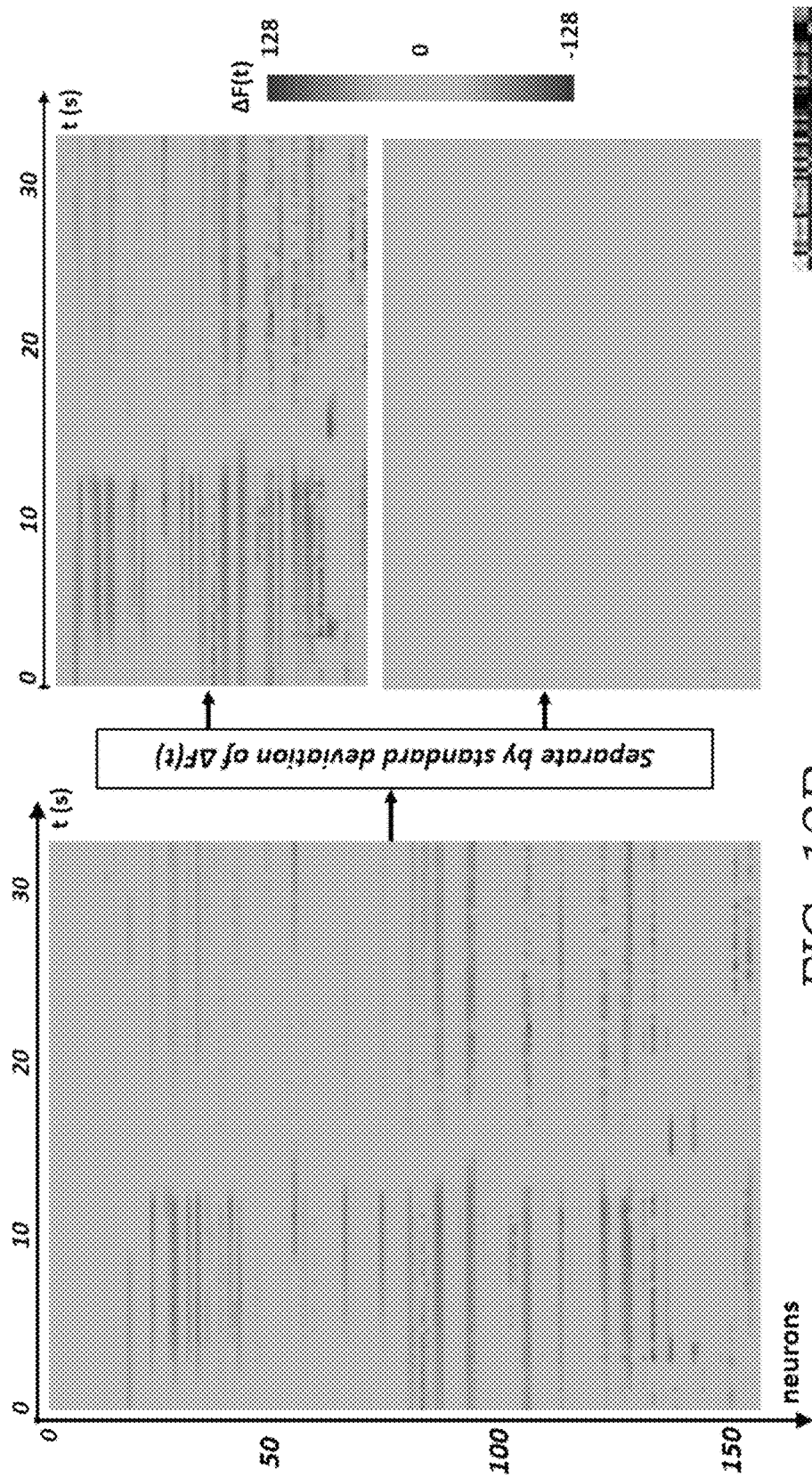
FIG. 12B illustrates the intensity of the neuron calcium activity, $\Delta F(t)$, of these 155 neurons is reported over a period of ~35 s at ~3.6 Hz. Based on a threshold on the standard deviation of each $\Delta F(t)$, neurons are separated into those that are active (right-top, 70 neurons) and less active (right-bottom, 85 neurons).
Figure 12C:
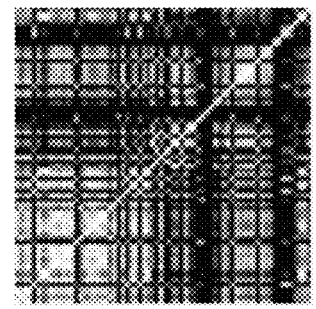
FIG. 12C illustrates a similarity matrix of the calcium activity patterns of the top 70 active neurons.
Figure 12D:
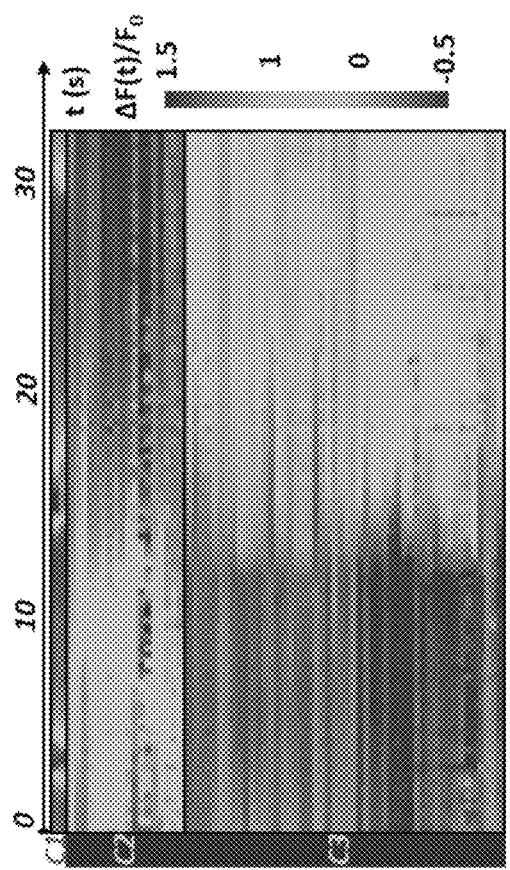
FIG. 12D illustrates the top 40 eigen values of the similarity matrix. An eigen-gap is shown at k=3, which was chosen as the number of clusters according to eigen-gap heuristic (i.e. choose up to the largest eigenvalue before the eigenvalue gap, where the eigenvalues increase significantly).
Figure 12E:
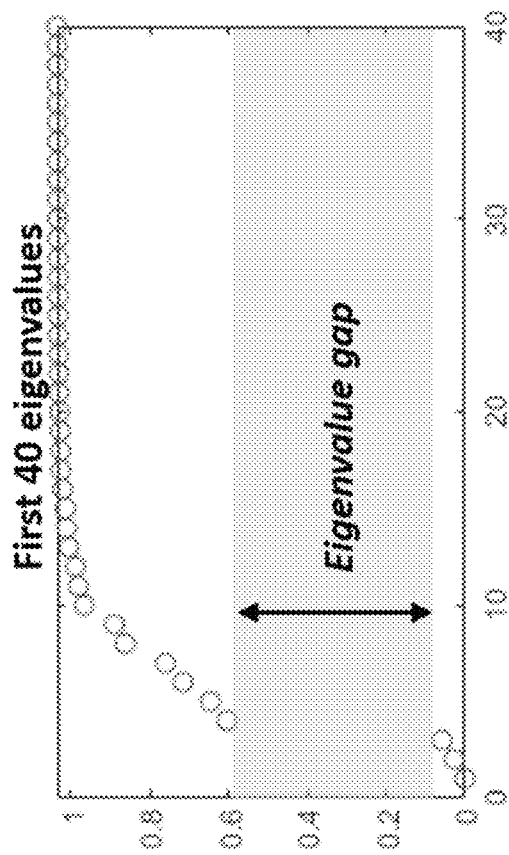
FIG. 12E illustrates normalized activity $\Delta F(t)/F_0$ for the k=3 clusters after the spectral clustering on the 70 active neurons.
Figure 12F:
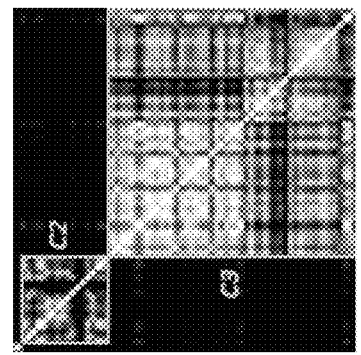
FIG. 12F illustrates the similarity matrix after spectral clustering. The spectral clustering rearranged the row and column ordering of the similarity matrix of FIG. 12C to be block diagonal in FIG. 12F, which represents free individual clusters of calcium activity patterns.

The number of clusters was chosen using eigen-gap heuristics, which was the index of the largest general eigen-value (by solving general eigen value problem $Lv=\lambda Dv$) before the eigen-gap, where the eigenvalues jump up significantly, which was determined to be k=3 (see FIG. 12D). Then the corresponding first k=3 eigen-vectors were combined as a matrix, whose rows were clustered using standard k-means clustering, which resulted in the three clusters of the calcium activity patterns shown in FIG. 12E and the rearranged similarity matrix shown in FIG. 12F.

Cross-Modality Alignment of Wide-Field and Confocal Fluorescence Images

Each stack of the wide-field/confocal pair was first self-aligned and normalized. Then the individual FOVs were stitched together using "Image Stitching" plugin of ImageJ. The stitched wide-field and confocal EDF images were then co-registered using a feature-based registration with projective transformation performed in Matlab (MathWorks, Inc). Then the stitched confocal EDF images as well as the stitched stacks were warped using this estimated transformation to match their wide-field counterparts (FIG. 15A). The non-overlapping regions of the wide-field and warped confocal images were subsequently deleted. Then the above-described greedy algorithm was used to crop non-empty regions of 256×256 pixels from the remaining stitched wide-field images and their corresponding warped confocal images. The same feature-based registration was applied on each pair of cropped regions for fine alignment. This step provides good correspondence between the wide field image and the corresponding confocal image in the lateral directions (FIG. 15B).

Although the axial scanning step size was fixed to be 0.2 μm, the reference zero-point in the axial direction for the wide-field and the confocal stacks needed to be matched. To determine this reference zero-point in the axial direction, the images at each depth were compared with the EDF image of the same region using structural similarity index (SSIM), providing a focus curve (FIG. 15C). A second order polynomial fit was performed on four points in this focus curve with highest SSIM values, and the reference zero-point was determined to be the peak of the fit (FIG. 15C). The heights of wide-field and confocal stacks were then centered by their corresponding reference zero-points in the axial direction. For each wide-field image used as input, four confocal images were randomly selected from the stack as the target, and their DPMs were calculated based on the axial difference of the centered height values of the confocal and the corresponding wide-field images.

Code Availability

Deep learning models reported in this work used standard libraries and scripts that are publicly available in Tensor-Flow. Through a custom-written Fiji based plugin, trained network models (together with some sample test images) were provided for the following objective lenses: Leica HC PL APO 20×/0.80 DRY (two different network models trained on TxRd and FITC channels), Leica HC PL APO 40×/1.30 OIL (trained on TxRd channel), Olympus UPLSAPO20X—0.75 NA (trained on TxRd channel). This custom-written plugin and the models are publicly available through the following links: http://bit.ly/deep-z-git and http://bit.ly/deep-z, all of which are incorporated by reference herein.

Image Acquisition and Data Processing for Lower Image Exposure Analysis.

Training image data were captured using 300 nm red fluorescent bead samples imaged with a 20×/0.75 NA objective lens, same as the micro-bead samples reported herein, except that the fluorescence excitation light source was set at 25% power (32.5 mW) and the exposure times were chosen as 10 ms and 100 ms, respectively. Two separate Deep-Z networks 10 were trained using the image dataset captured at 10 ms and 100 ms exposure times, where each training image set contained ~100,000 image pairs (input and ground truth), and each network was trained for ~50 epochs.

Testing image data were captured under the same settings except the exposure times varied from 3 ms to 300 ms. The training and testing images were normalized using the same pre-processing algorithm: after image alignment, the input image was similarly first thresholded using a triangular thresholding method to separate the sample foreground and background pixels. The mean of the background pixel values was taken as the background fluorescence level and subtracted from the entire image. The images were then normalized such that 1% of the foreground pixels were saturated (above one). This pre-processing step did not further clip or quantize the image. These pre-processed images (in single precision format) were fed into the network directly for training or blind testing.

Time-Modulated Signal Reconstruction Using Deep-Z

Training data were captured for 300 nm red fluorescent beads using a 20×/0.75 NA objective lens with the Texas Red filter set, same as the microbead samples reported earlier (e.g., FIG. 5), except that the fluorescence light source was set at 25% illumination power (32.5 mW) and the exposure time was chosen as 100 ms.

Testing data consisted of images of 300 nm red fluorescent beads placed on a single 2D plane (pipetted onto a #1 coverslip) captured using an external light emitting diode (M530L3-C1, Thorlabs) driven by an LED controller (LEDD1B, Thorlabs) modulated by a function generator (SDG2042X, Siglent) that modulated the output current of the LED controller between 0 to 1.2 A following a sinusoidal pattern with a period of 1 s. A Texas Red filter and 100 ms exposure time were used. The same FOV was captured at in-focus plane (z=0 µm) and five defocus planes (z=2, 4, 6, 8, 10 µm). At each plane, a two-second video (i.e. two periods of the modulation) was captured at 20 frames per second. Each frame of the defocused planes was then virtually refocused using the trained Deep-Z network 10 to digitally reach the focal plane (z=0 µm), fluorescence intensity changes of 297 individual beads within the sample FOV captured at z=0 µm were tracked over the two-second time window. The same 297 beads were also tracked as a function of time using those five virtually refocused time-lapse sequences (using Deep-Z output). The intensity curve for each bead was normalized between 0 and 1. The mean and standard deviation corresponding to these 297 normalized curves were plotted in FIGS. 19A-19B.

Neuron Segmentation Analysis

Neuron locations in FIGS. 20A, 20D, 20G were compared by first matching pairs of neurons from two different methods (e.g., Deep-Z vs. mechanically-scanned ground truth). Matching two groups of segmented neurons ($\Omega_1$, $\Omega_2$), represented by their spatial coordinates, was considered as a bipartite graph minimal cost matching problem, i.e.:

$$\underset{x_e}{\operatorname{argmin}} \sum_e c_e \cdot x_e$$

$$\text{s.t.} \sum_{e \in \delta(u_1)} x_e = 1, \text{ for } \forall u_1 \in \Omega_1$$

$$\sum_{e \in \delta(u_2)} x_e \leq 1, \text{ for } \forall u_2 \in \Omega_2$$

$$x_e \in \{0, 1\}$$

where $x_e$=1 represents that the edge between the two groups of neurons ($\Omega_1$, $\Omega_2$) were included in the match. The cost on edge e=($u_1$, $u_2$) is defined based on the Manhattan distance between $u_1 \in \Omega_1$, $u_2 \in \Omega_2$, i.e., $c_e$=|$x_1$−$x_2$|+|$y_1$−$y_2$|+|$z_1$−$z_2$|. Because the problem satisfies totally unimodular condition, the above integer constraint $x_e \in \{0,1\}$ can be relaxed to linear constraint x≥0 without changing the optimal solution, and the problem was solved by linear programming using Matlab function linporg. Then the distances between each paired neurons were calculated and their distributions were plotted.

Deep-Z Virtual Refocusing Capability at Lower Image Exposure

Figure 16A:
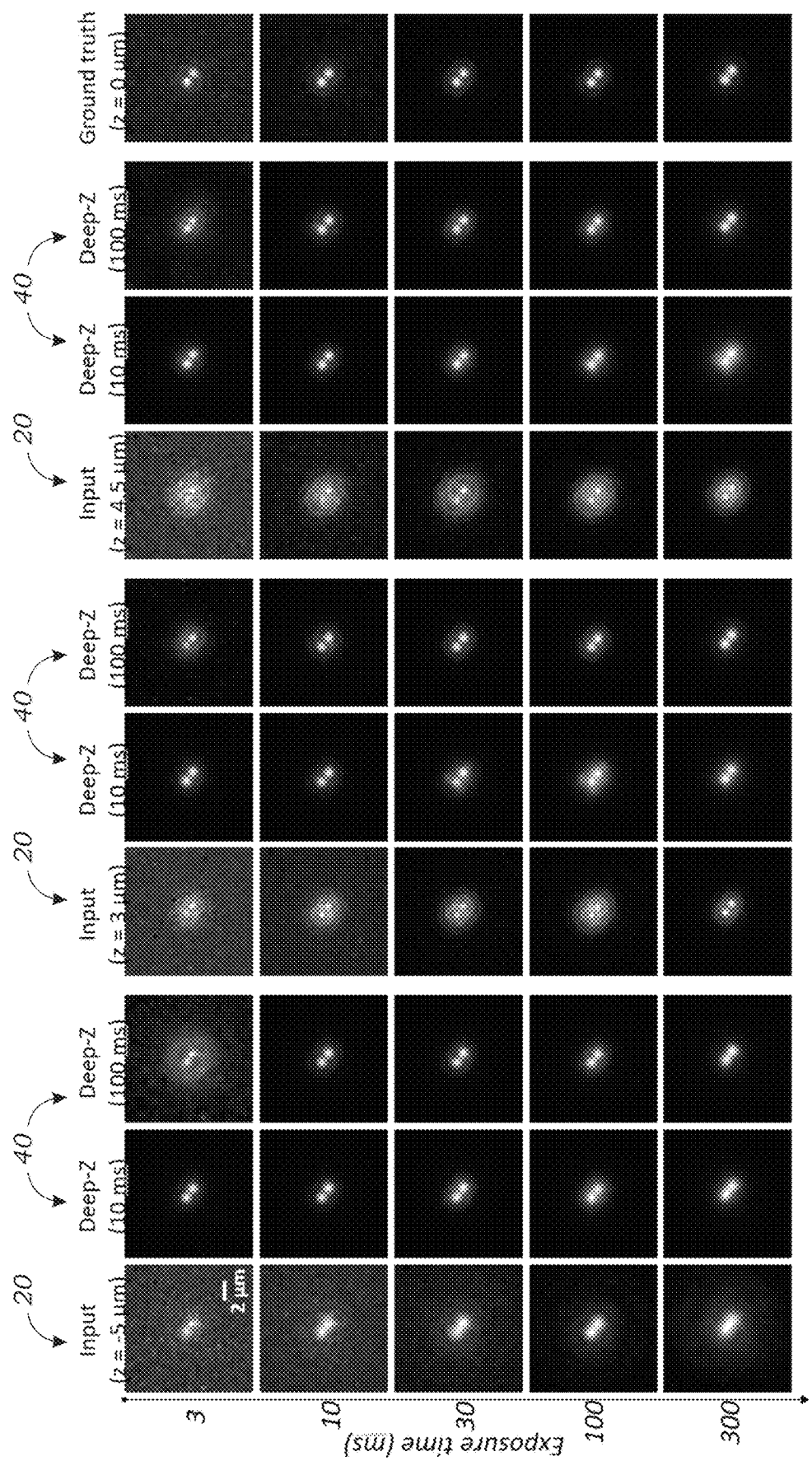
FIG. 16A illustrates the refocusing capability of Deep-Z under lower image exposure. Virtual refocusing of images containing two microbeads under different exposure times from defocused distances of −5, 3 and 4.5 μm, using two Deep-Z models trained with images captured at 10 ms and 100 ms exposure times, respectively.
Figure 16B:
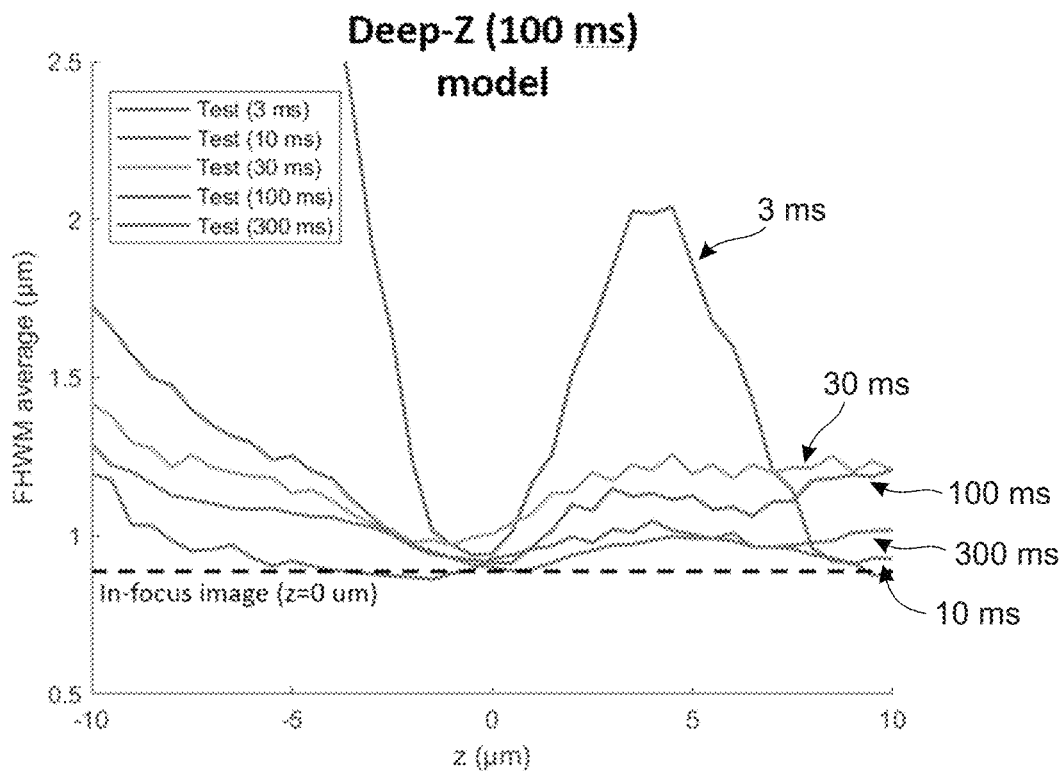
FIG. 16B illustrates a graph of median FWHM values of 91 microbeads imaged inside a sample FOV after the virtual refocusing of an input image across a defocus range of −10 μm to 10 μm by the Deep-Z (100 ms) network model. The test images have different exposure times spanning 3 ms to 300 ms.
Figure 16C:
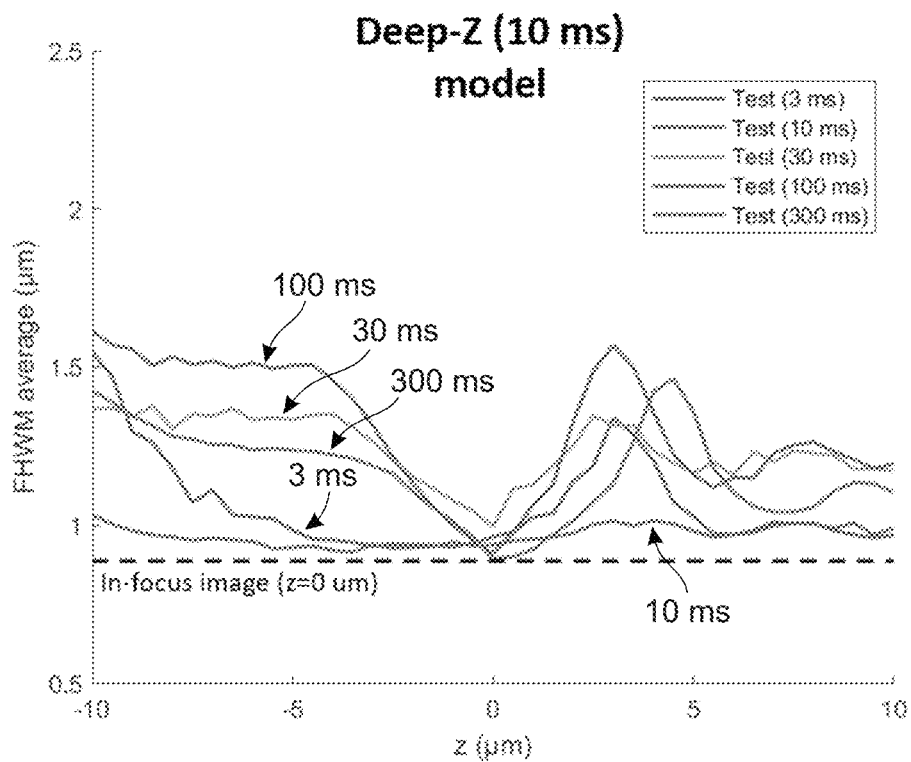
FIG. 16C illustrates a graph of median FWHM values of 91 microbeads imaged inside a sample FOV after the virtual refocusing of an input image across a defocus range of −10 μm to 10 μm by the Deep-Z (00 ms) network model. The test images have different exposure times spanning 3 ms to 300 ms.

To further validate the generalization performance of a pre-trained Deep-Z network model under variable exposure conditions (which directly affect the signal-to-noise ratio, SNR), two Deep-Z networks 10 were trained using microbead images captured at 10 ms and 100 ms exposure times and these trained networks were denoted as Deep-Z (10 ms) and Deep-Z (100 ms), respectively, and blindly tested their performance to virtually refocus defocused images captured under different exposure times, varying between 3 ms to 300 ms. Examples of these blind testing results are shown in FIG. 16A, where the input bead images were defocused by −5.0, 3.0, and 4.5 µm. With lower exposure times, the input image quality was compromised by noise and image quantization error due to the lower bit depth. As shown in FIG. 16A, the Deep-Z (100 ms) model can successfully refocus the input images even down to an exposure time of 10 ms. However, the Deep-Z (100 ms) model fails to virtually refocus the input images acquired at 3 ms exposure time, giving a blurry output image with background noise. On the other hand, the Deep-Z (10 ms) model can successfully refocus input images that were captured at 3 ms exposure times, as illustrated in FIGS. 16A-16C. Interestingly, the Deep-Z (10 ms) model performs slightly worse for input images that were acquired at higher exposure times. For example, the input images acquired at 300 ms exposure time exhibit a slight blur at the output image as demonstrated in the last row of FIG. 16A. These observations are further confirmed in FIGS. 16B, 16C by quantifying the median FWHM values of the imaged microbeads, calculated at the Deep-Z output images as a function of the refocusing distance. This analysis confirms that Deep-Z (100 ms) model cannot successfully refocus the images captured at 3 ms exposure time outside of a narrow defocus window of ~[−1 µm, 1 µm] (see FIG. 16B). On the other hand, Deep-Z (10 ms) model demonstrates improved refocusing performance for the input images captured at 3 ms exposure time (FIG. 16C). These results indicate that training a Deep-Z model with images acquired at exposure times that are relatively close to the expected exposure times of the test images would be important for successful inference. Another important observation is that, compared to the ground truth images, the Deep-Z output images 40 also reject the background noise since noise overall does not generalize well during the training phase of the neural network, as also discussed for FIG. 7.

Also, the noise performance of Deep-Z can potentially be further enhanced by engineering the microscope's point spread function (PSF) to span an extended depth-of-field, by e.g., inserting a phase mask in the Fourier plane of the microscope, ideally without introducing additional photon losses along the path of the fluorescence signal collection. For example, phase and/or amplitude masks may be located along the optical path (axial direction) of the microscope 110. A double-helix PSF is one exemplary engineered PSF. In addition, the fluorescence microscope 110 may include a wide-field fluorescence microscope 110. The microscope 110 may also include a light sheet system.

Robustness of Deep-Z to Changes in Samples and Imaging Systems

In the results so far, the blindly tested samples 12 were inferred with a Deep-Z network 10 that has been trained using the same type of sample 12 and the same microscope system 110. Here, the performance of Deep-Z for different scenarios is discussed where a change in the test data distribution is introduced in comparison to the training image set, such as e.g., (1) a different type of sample 12 that is imaged, (2) a different microscope system 110 used for imaging, and (3) a different illumination power or SNR.

Regarding the first item, if there is a high level of similarity between the trained sample type 12 and the tested sample type 12 distributions, the performance of the network output is expected to be comparable. As reported in FIGS. 17A, 17B, a Deep-Z network 10 that was trained to virtually refocus images of tagRFP-labeled C. elegans neuron nuclei was blindly tested to virtually refocus the images of GFP-labeled C. elegans neuron activity. The output image results of the different model column are quite similar to the output images of the optimal model, trained specifically on GFP-labeled neuron activity images (same model column), as well as the mechanically-scanned ground truth (GT) images, with a minor difference in the correlation coefficients of the two sets of output images with respect to the ground truth images of the same samples. Similar conclusions may be drawn for the effectiveness of a Deep-Z model blindly tested on images of a different strain of C. elegans.

On the other hand, when the training sample type and its optical features are considerably different from the testing samples, noticeable differences in Deep-Z performance can be observed. For instance, as shown in FIG. 17B, a Deep-Z network 10 that was trained with 300 nm beads can only partially refocus the images of C. elegans neuron nuclei, which are typically 1-5 μm in size, and therefore are not well-represented by the training image dataset containing only nanobeads. This limitation can be remedied through a transfer learning process, where the network 10 trained on one type of sample (e.g., the nanobeads in this example) can be used as an initialization of the network weights and the Deep-Z network 10 can be further trained using new images that contain neuron nuclei. Compared to starting from scratch (e.g., randomized initialization), which takes ~40, 000 iterations (~60 hours) to reach an optimal model, transfer learning can help achieve an optimal model with only ~4,000 iterations (~6 hours) that successfully refocuses neuron nuclei images, matching the performance of the optimal model (transfer learning column in FIGS. 17A, 17B). This transfer learning approach can also be applied to image different types of C. elegans using earlier models that are refined with new image data in e.g., ~500-1,000 iterations. Another advantage of transfer learning is using less training data; in this case, for example, only 20% of the original training data used for the optimal model was used for transfer learning.

Regarding the second item, i.e., a potential change in the microscope system 110 used for imaging can also adversely affect the inference performance of a previously trained network model. One of the more challenging scenarios for a pre-trained Deep-Z network will be when the test images are captured using a different objective lens with a change in the numerical aperture (NA); this directly modifies the 3D PSF profile, making it deviate from the Deep-Z learned features, especially along the depth direction. Similar to the changes in the sample type, if the differences in imaging system parameters are small, it is expected that a previously trained Deep-Z network 10 can be used to virtually refocus images captured by a different microscope to some extent. FIG. 18 shows an example of this scenario, where a Deep-Z network 10 was trained using the images of C. elegans neuron nuclei, captured using an Olympus IX81 microscope with a 20×/0.75 NA objective lens, and was blindly tested on images captured using a Leica SP8 microscope with 20×/0.8 NA objective lens. Stated differently, two different microscopes, manufactured by two different companies, have been used, together with a small NA change between the training and testing phases. As illustrated in FIG. 18, most of the virtual refocusing results remained successful, in comparison to the optimal model. However, due to these changes in the imaging parameters, a couple of mis-arrangements of the neurons in the virtually refocused images can be seen in the different model output column, which also resulted in a small difference of ~0.02-0.06 between the correlation coefficients of the optimal Deep-Z network output and the different model output (both calculated with respect to the corresponding ground truth images acquired using two different microscope systems). As discussed previously, one can also use transfer learning to further improve these results by taking the initial Deep-Z model trained on Olympus IX81 microscope (20×/0.75 NA objective) as initialization and further training it for another ~2,000 iterations on a new image dataset captured using the Leica SP8 microscope (20×/0.8 NA Objective). Similar to the example that was presented earlier, 20% of the original training data used for the optimal model was used for transfer learning in FIG. 18.

As for the third item, the illumination power, together with the exposure time and the efficiency of the fluorophore, contributes to two major factors: the dynamic range and the SNR of the input images. Since a pre-processing step was used to remove the background fluorescence, also involving a normalization step based on a triangular threshold, the input images will always be re-normalized to similar signal ranges and therefore illumination power associated dynamic range changes do not pose a major challenge for the Deep-Z network 10. Furthermore, as detailed earlier, robust virtual refocusing can still be achieved under significantly lower SNR, i.e., with input images acquired at much lower exposure times (see FIGS. 16A-16C). These results and the corresponding analysis reveal that the Deep-Z network 10 is fairly robust to changes observed in the dynamic range and the SNR of the input images. Having emphasized this, training a Deep-Z network 10 with images acquired at exposure times that are relatively similar to the expected exposure times of the test images would be recommended for various uses of the Deep-Z network 10. In fact, the same conclusion applies in general: to achieve the best performance with Deep-Z network 10 inference results, the neural network 10 should be trained (from scratch or through transfer learning which significantly expedites the training process) using training images obtained with the same microscope system 110 and the same types of samples 12 as expected to be used at the testing phase.

Time-Modulated Signal Reconstruction Using Deep-Z

Figure 19A:
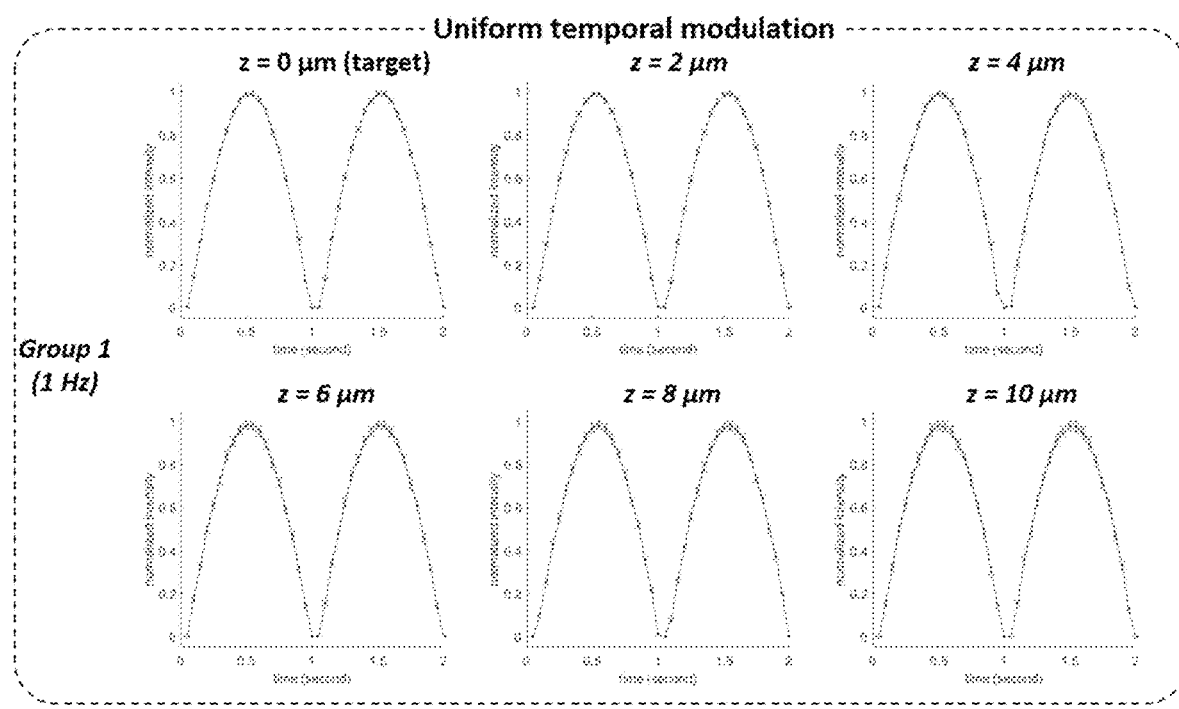
FIGS. 19A and 19B illustrate time-modulated signal reconstruction using Deep-Z. A time-modulated illumination source was used to excite the fluorescence signal of microbeads (300 nm diameter). Time-lapse sequence of the sample was captured under this modulated illumination at the in-focus plane (z=0 μm) as well as at various defocused planes (z=2-10 μm) and refocused using Deep-Z to digitally reach z=0 μm. Intensity variations of 297 individual beads inside the FOV (after refocusing) were tracked for each sequence. Based on the video captured in FIG. 19A, every other frame was taken to form an image sequence with twice the frame-rate and modulation frequency, and added it back onto the original sequence with a lateral shift (FIG. 19B). These defocused and super-imposed images were virtually refocused using Deep-Z to digitally reach z=0 μm, in-focus plane. Group 1 contained 297 individual beads inside the FOV with 1 Hz modulation. Group 2 contained the signals of the other (new) beads that are super-imposed on the same FOV with 2 Hz modulation frequency. Each intensity curve was normalized, and the mean and the standard deviation of the 297 curves were plotted for each time-lapse sequence. Virtually-refocused. Deep-Z output tracks the sinusoidal illumination, very closely following the in-focus reference time-modulation reported in target (z=0 μm).

To further test the generalization capability of the Deep-Z network 10, an experiment was conducted where the microbead fluorescence is modulated in time, induced by an external time-varying excitation. FIG. 19A reports the time-modulated signal of 297 individual microbeads at the focal plane (z=0 μm) tracked over a 2 s period at a frame rate of 20 frames per second, plotted with their normalized mean and standard deviation. This curve shows a similar modulation pattern as the input excitation light, with a slight deviation from a perfect sinusoidal curve due to the nonlinear response of fluorescence. The standard deviation was ~1.0% of the mean signal at each point. Testing the blind inference of the Deep-Z network 10, the subsequent entries of FIG. 19A reports the same quantities corresponding to the same field-of-view (FOV), but capture d at defocused planes (z=2, 4, 6, 8, 10 μm) and virtually refocused to the focal plane (z=0 μm) using a Deep-Z network 10 trained with images captured under fixed signal strength. The mean curves calculated using the virtually-refocused images (z=2, 4, 6, 8, 10 μm) match very well with the in-focus one (z–0 μm), whereas the standard deviation increased slightly with increased virtual refocusing distance, which were ~1.0%, 1.1%, 1.7%, 1.9%, and 2.1% of the mean signal for virtual refocusing distances of z=2, 4, 6, 8, and 10 μm, respectively.

Figure 19B:
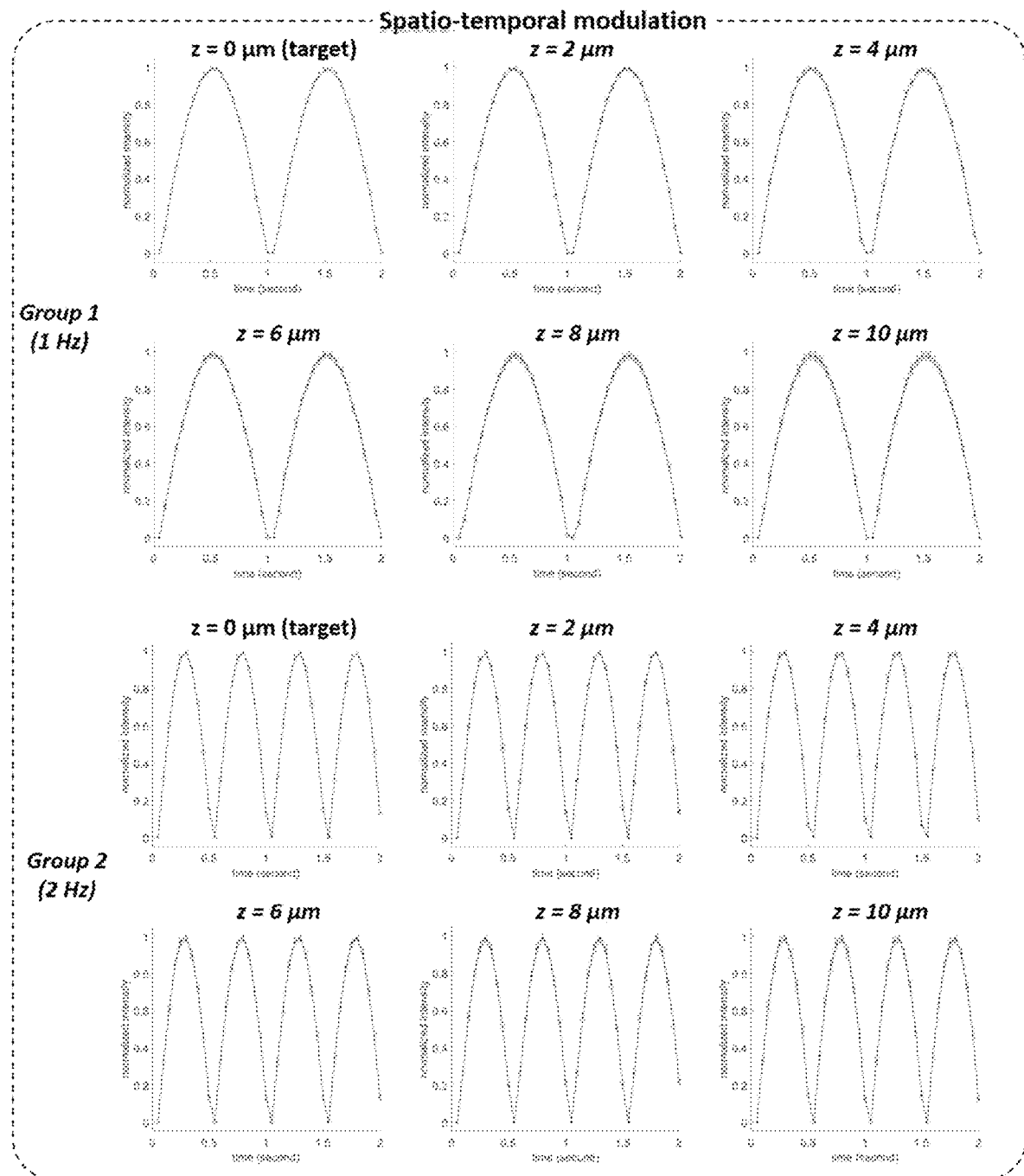
Figure 21A:
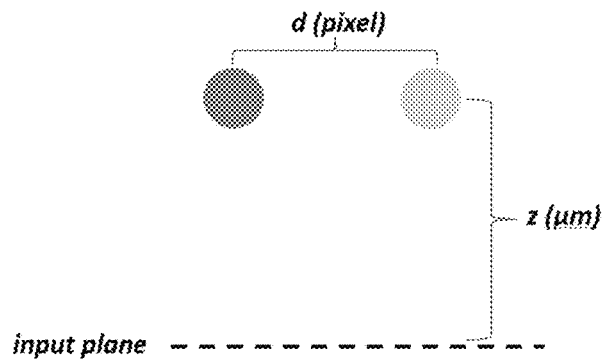
Figure 21B:
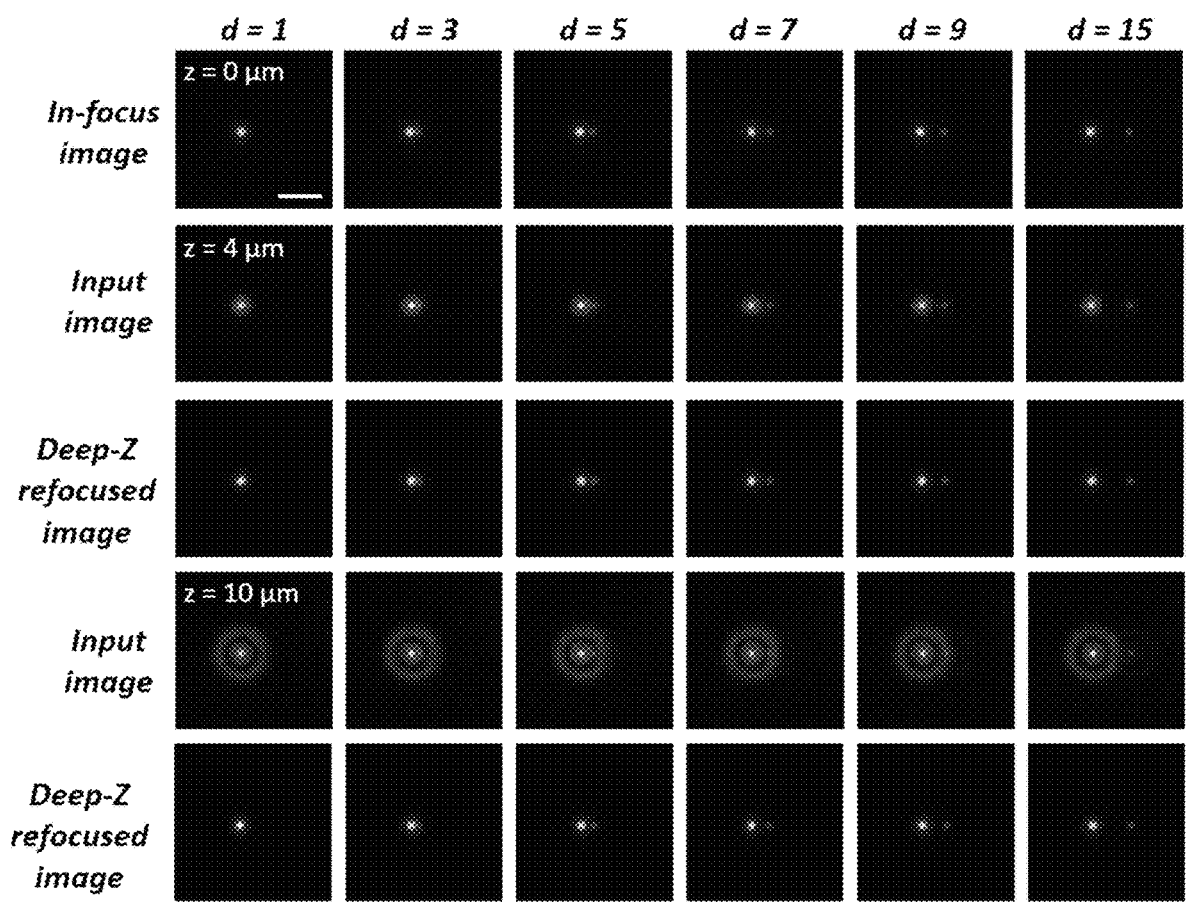

Based on this acquired sequence of images, every other frame was taken to form a new video; by doing so, the down sampled video compressed the original 2 s video to 1 s, forming a group of beads that were modulated at doubled frequency, i.e., 2 Hz. This down-sampled video was repeated, and added back onto the original video, frame-by-frame, with a lateral shill of 8 pixels (2.6 μm). FIG. 19B shows the Deep-Z network 10 output on these added images, corresponding to 297 pairs of beads that had the original modulation frequency 1 Hz (first row) and the doubled modulation frequency 2 Hz (second row), masked separately in the same output image sequence. This analysis demonstrates that Deep-Z output tracks the sinusoidal illumination well, closely following the in-focus reference time-modulation reported in the first column, same as in FIG. 19A. A video was also created to illustrate an example region of interest containing six pairs of these 1 Hz and 2 Hz emitters, cropped from the input and output FOVs for different defocus planes.

C. elegans Neuron Segmentation Comparison

To illustrate that the Deep-Z network 10 indeed helps to segment more neurons by virtual refocusing over an extended depth of field, the results of the same segmentation algorithm applied on an input 2D image as seen in FIG. 20A, where the segmentation algorithm found 99 neurons, without any depth information (see FIG. 20B. In comparison, Deep-Z output image stack (calculated from a single input image) enabled the detection of 155 neurons (see FIG. 20C and FIG. 4B), also predicting the depth location of each neuron (color coded). Note that this sample did not have a corresponding 3D image stack acquired by a scanning microscope because in this case a 2D video was used to track the neuron activity.

To better illustrate a comparison to the ground truth 3D image stack captured using axial mechanical scanning, the segmentation results for another C. elegans is also shown (FIGS. 20D-20I), calculated using the same algorithm from the 2D input image, the corresponding Deep-Z virtual image stack and the mechanically-scanned ground truth image stack (acquired at 41 depths with 0.5 μm axial spacing). Compared to the segmentation results obtained from the input image (FIG. 20E), the segmentation results obtained using the Deep-Z generated virtual image stack (FIG. 20F) detected an additional set of 33 neurons, also predicting the correct 3D positions of 128 neurons in total. Compared to the ground truth mechanically-scanned 3D image stack (FIG. 20I), the segmentation algorithm recognized 18 fewer neurons for the Deep-Z generated virtual stack, which were mostly located within the head of the worm, where the neurons are much denser and relatively more challenging to recover and segment. In sparser regions of the worm, such as the body and the tail, the neurons were mostly correctly segmented, matching the results obtained using the mechanically-scanned 3D image stack (composed of 41 axial-scans). The depth locations of the segmented neurons (color-coded) also matched well with the corresponding depths measured using the ground truth mechanically-scanned 3D image stack.

To improve the performance of Deep-Z network-based neuron segmentation in denser regions of the sample (such as the head of a worm), acquiring more than one input image could be utilized to enhance the degrees of freedom, where the virtually refocused image stack of each Deep-Z input image can be merged with the others, helping to recover some of the lost neurons within a dense region of interest. Compared to the mechanically-scanned 3D image stack, this would still be significantly faster, requiring fewer images to be acquired for imaging the specimen's volume. For instance, in FIG. 20H segmentation results are presented by merging two virtual image stacks created by Deep-Z, both spanning −10 μm to 10 μm but generated from two different input images acquired at z=0 μm and at z=4 μm, respectively.

The merging was performed by taking the maximum pixel value of the two image stacks. The segmentation algorithm in this case identified N=148 neurons (improved from N=128 in FIG. 20F and the results match better to the ground truth axial scanning results (N=146 in FIG. 20I. To shed more light on this comparison, another segmentation algorithm was used on exactly the same image dataset: using a DoG segmentation method, named as TrackMate resulted in 146 neurons for the Deep-Z network 10 output, 177 neurons in the target image stack (mechanically scanned) and 179 in the Deep-Z merged stack (only 2 axial planes used as input images), revealing a close match between Deep-Z results and the results obtained with a mechanically scanned image stack. This comparison between two different neuron segmentation algorithms also shows some inconsistency in the neuron segmentation itself (meaning that there might not be a single ground truth method). It should be noted here that these results should be considered as proof-of-concept studies on the potential applications of Deep-Z network 10 for neuron imaging. Deep-Z can potentially be used as a front-end module to jointly-optimize future deep learning-based neuron segmentation algorithms that can make the most use of Deep-Z network 10 and its output images 40 to reduce the number of required image planes to accurately and efficiently track neural activity of worms or other model organisms. Note also that the segmentation results in this case uses a 20×/0.8 NA objective lens. The presented approach might perform better on the head region of the worm if a higher NA objective was used. However, even using a mechanically-scanned image stack with a higher NA objective and state-of-the-art neuron segmentation algorithms, not all the neurons in the body of a worm can be accurately identified in each experiment.

Impact of the Sample Density on Deep-Z Inference

If the fluorescence emitters are too close to each other or if the intensity of one feature is much weaker than the other(s) within a certain FOV, the intensity distribution of the virtually refocused Deep-Z images 40 may deviate from the ground truth (GT). To shed more light on this, numerical simulations were used resulting from experimental data, where (1) a laterally shifted a planar fluorescence image that contained individual 300 nm fluorescent beads, (2) attenuated this shifted image intensity with respect to the original intensity by a ratio (0.2 to 1.0), and (3) added this attenuated and shifted feature back to the original image (see FIGS. 21A-21B for an illustration of this). Based on a spatiallyinvariant incoherent PSF, this numerical simulation, derived from experimental data, represents an imaging scenario, where there are two individual sets of fluorescent objects that have different signal strengths with respect to each other, also with a varying distance between them. The resulting images, with different defocus distances (see FIG. 21B) were virtually refocused to the correct focal plane by a Deep-Z network that was trained using planar bead samples. FIGS. 21B-21H demonstrates various examples of bead pairs that were laterally separated by e.g., 115 pixels and axially defocused by 0-10 µm, with an intensity ratio that spans 0.2-1.0.

To quantify the performance of Deep-Z inference for these different input images, FIGS. 21C-21H plot the average intensity ratio of 144 pairs of dimmer and brighter beads at the virtually refocused plane as a function of the lateral shift (d) and the intensity ratio between the dimmer and the brighter beads, also covering various defocus distances up to 10 µm; in each panel of this FIG., the minimal resolvable distance between the two beads is marked by a cross-symbol "x". FIGS. 21C-21H reveal that larger defocus distances and smaller ratios require slightly larger lateral shift amount for the bead pairs to be accurately resolved.

Next, the impact of occlusions in the axial direction was examined, which can be more challenging to resolve. For this, new numerical simulations were created, also resulting from experimental data, where this time a planar fluorescent bead image stack was axially shifted and added back to the corresponding original image stack with different intensity ratios (see FIG. 22B for an illustration of this). To accurately represent the inference task, the deep network 10 was trained via transfer learning with an augmented dataset containing axially-overlapping objects. FIG. 22A demonstrates the Deep-Z results for a pair of beads located at z=0 and z=8 µm respectively. The network 10 was able to successfully refocus these two beads separately, inferring two intensity maxima along the z-axis at z=0 µm and z=8 µm, very well matching the simulated mechanically-scanned image stack (ground truth). FIGS. 22C, 22D plot the average of the intensity ratio of the top (i.e., the dimmer) bead and the lower bead (i.e., the bead in the original stack) for 144 individual bead pairs inside a sample FOV, corresponding to z=8 µm with different axial separations (d, see FIG. 22B), for both the virtually refocused Deep-Z image stack and the simulated ground truth image stack, respectively. The results in FIGS. 22C, 22D are similar, having rather small discrepancies in the exact intensity ratio values. The results might be further improved by potentially using a 3D convolutional neural network architecture.

Figure 23A:
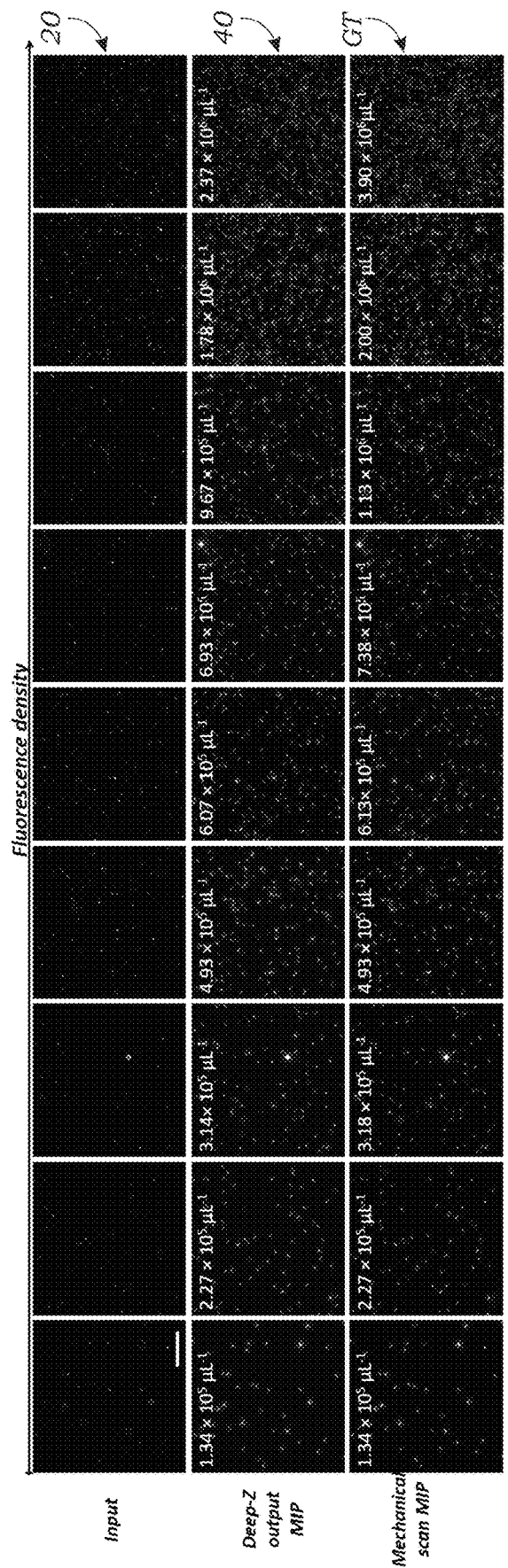
FIGS. 23A-23E illustrate the Deep-Z inference results as a function of 3D fluorescent sample density.
Figure 23B:
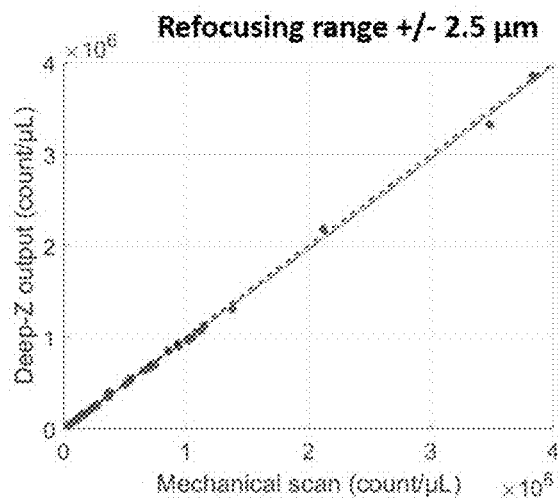
Figure 23C:
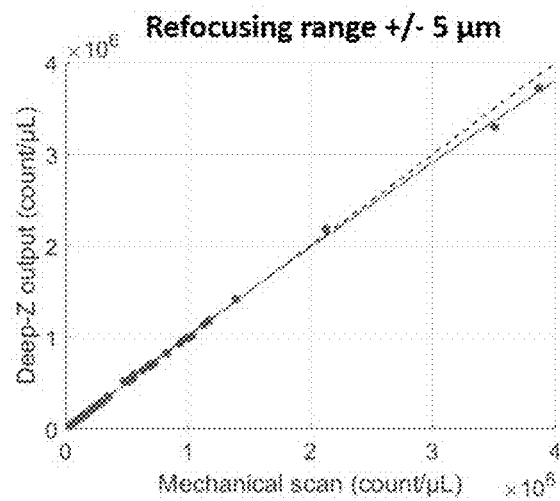
Figure 23D:
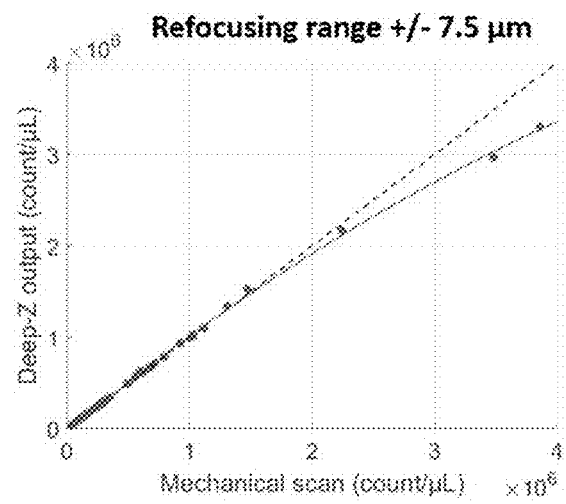
Figure 23E:
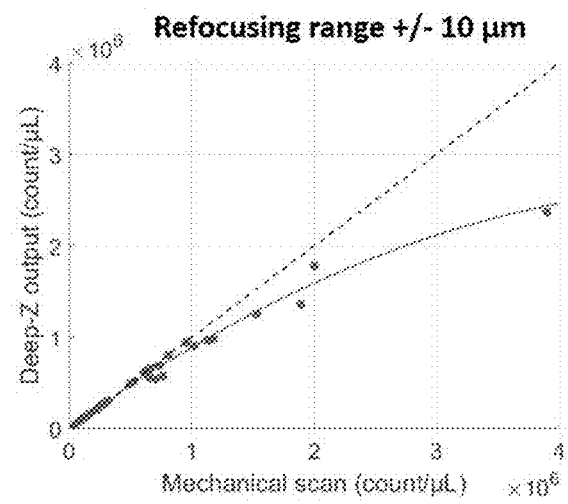

To further understand the impact of the axial refocusing distance and the density of the fluorescent sample on Deep-Z 3D network inference, additional imaging experiments were performed corresponding to 3D bead samples with different densities of particles, which was adjusted by mixing 2.5 µL red fluorescent bead (300 nm) solution at various concentrations with 10 µL ProLong Gold antifade mountant (P10144, ThermoFisher) on a glass slide. After covering the sample with a thin coverslip, the sample naturally resulted in a 3D sample volume, with 300 nm fluorescent beads spanning an axial range of ~20-30 µm. Different samples, corresponding to different bead densities, were axially scanned using a 20×/0.75 NA objective lens using the Texas Red channel. To get the optimal performance, a Deep-Z network was trained with transfer learning (initialized with the original bead network) using 6 image stacks (2048×2048 pixels) captured from one of the samples. Another 54 non-overlapping image stacks (1536×1536 pixels) were used for blind testing; within each image stack, 41 axial planes spanning +/−10 µm with 0.5 µm step size were used as ground truth (mechanically-scanned), and the middle plane (z=0 µm) was used as the input image 20 to Deep-Z, which generated the virtually refocused output image stack of images 40, spanning the same depth range as the ground truth (GT) images. Thresholding was applied to the ground truth and Deep-Z output image stacks, where each connected region after thresholding represents a 300 nm bead. FIG. 23A illustrates the input images 20 and the maximal intensity projection (MIP) of the ground truth image stack (GT) as well as the Deep-Z network output image 40 stack corresponding to some of the non-overlapping sample regions used for blind testing. At lower particle concentrations (below $0.5 \times 10^6$ $\mu L^{-1}$), the Deep-Z output image 40 stack results match very well with the mechanically-scanned ground truth (GT) results over the training range of +/−10 µm axial defocus. With larger particle concentrations, the Deep-Z network output gradually loses its capability to refocus and retrieve all the individual beads, resulting in under-counting of the fluorescent beads.

In fact, this refocusing capability of the Deep-Z network 10 not only depends on the concentration of the fluorescent objects, but also depends on the refocusing axial distance. To quantify this, FIGS. 23B-23E plot the fluorescent particle density measured using the mechanically-scanned ground truth image stack as well as the Deep-Z virtually refocused image 40 stack as a function of the axial defocus distance, i.e., ±2.5 µm, ±5 µm, ±7.5 µm and ±10 µm from the input plane (z=0 µm), respectively. For example, for a virtual refocusing range of ±2.5 µm, the Deep-Z output image 40 stack (using a single input image at z=0 µm) closely matches the ground truth (GT) results even for the highest tested sample density (~$4 \times 10^6$ $\mu L^{-1}$); on the other hand, at larger virtual refocusing distances Deep-Z suffers from some under-counting of the fluorescent beads (see e.g., FIGS. 23C-22E). This is also consistent with the analysis reported earlier (e.g., FIGS. 21A, 21B, 22A-22D), where the increased density of the beads in the sample results in axial occlusions and partially affects the virtual refocusing fidelity of Deep-Z.

In these examples presented herein, the training image data did not include strong variations in the signal intensities of the particles or axial occlusions that existed in the testing data as this is a disadvantage for Deep-Z network 10. However, a Deep-Z network 10 that is trained with the correct type of samples 12 (matching the test sample 12 type and its 3D structure) will have an easier task in its blind inference and virtual refocusing performance since the training images will naturally contain relevant 3D structures, better representing the feature distribution expected in the test samples.

Reduced Photodamage Using Deep-Z

Another advantage of the Deep-Z network 10 would be a reduction in photodamage to the sample 12. Photodamage introduces a challenging tradeoff in applications of fluorescence microscopy in live cell imaging, which sets a practical limitation on the number of images that can be acquired during e.g., a longitudinal experiment. The specific nature of photodamage, in the form of photobleaching and/or phototoxicity, depends on the illumination wavelength, beam profile, exposure time, among many other factors, such as the sample pH and oxygen levels, temperature, fluorophore density and photostability. Several strategies for illumination design have been demonstrated to reduce the effects of photodamage, by e.g., adapting the illumination intensity delivered to the specimen as in controlled light exposure microscopy (CLEM) and predictive focus illumination, or decoupling the excitation and emission paths, as in selective plane illumination microscopy and among others.

For a widefield fluorescence microscopy experiment, where an axial image stack is acquired, the illumination excites the fluorophores through the entire thickness of the specimen 12, regardless of the position that is imaged in the objective's focal plane. For example, if one assumes that the sample thickness is relatively small compared to the focal volume of the excitation beam, the entire sample volume is uniformly exited at each axial image acquisition step. This means the total light exposure of a given point within the sample volume is sub-linearly proportional to the number of imaging planes ($N_z$) that are acquired during a single-pass z-stack. In contrast, the Deep-Z system 2 only requires a single image acquisition step if the axial training range covers the sample depth; in case the sample is thicker or dense, more than one input image might be required for improved Deep-Z inference as demonstrated in FIG. 20H which, in this case, used two input images to better resolve neuron nuclei in the head region of a *C. elegans*. Therefore, this reduction, enabled by Deep-Z, in the number of axial planes that need to be imaged within a sample volume directly helps to reduce the photodamage to the sample.

To further illustrate this advantage, an additional experiment was performed where a sample containing fluorescent beads (300 nm diameter, and embedded in ProLong Gold antifade mountant) was repeatedly imaged in 3D with $N_z$=41 axial planes spanning 20 µm depth range (0.5 µm step size) over 180 repeated cycles, which took a total of ~30 min. The average fluorescence signal of the nanobeads decayed down to ~80% of its original value at the end of the imaging cycle (see FIG. 24A). In comparison, to generate a similar virtual image stack, the Deep-Z system 2 only requires to take a single input image 20, which results in a total imaging time of ~15 seconds for 180 repeated cycles, and the average fluorescence signal in the Deep-Z generated virtual image stack does not show a visible decay during the same number of imaging cycles (see FIG. 24B). For imaging of live samples, potentially without a dedicated antifade mountant, the fluorescence signal decay would be more drastic compared to FIG. 24A due to photodamage and photobleaching, and Deep-Z can be used to significantly reduce these negative effects, especially during longitudinal imaging experiments.

The application of Deep-Z network 10 to light sheet microscopy can also be used to reduce the number of imaging planes within the sample 12, by increasing the axial separation between two successive light sheets using Deep-Z 3D inference in between. In general a reduction in $N_z$ further helps to reduce photodamage effect if one also takes into account hardware-software synchronization times that are required during the axial scan, which introduces additional time overhead if, e.g., an arc burner is used as the illumination source; this illumination overhead can be mostly eliminated when using LEDs for illumination, which have much faster on-off transition times. The Deep-Z system 2 can substantially circumvent the standard photodamage tradeoffs in fluorescence microscopy and enable imaging at higher speeds and/or improved SNR since the illumination intensity can be increased for a given photodamage threshold that is set, offset by the reduced number of axial images that are acquired through the use of Deep-Z. The following reference (and Supplementary Information) is incorporated by reference herein: Wu, Y. et al., Three-dimensional virtual refocusing of fluorescence microscopy images using deep learning, Nat Methods 16, 1323-1331 (2019) doi:10.1038/s41592-019-0622-5.

While embodiments of the present invention have been shown and described, various modifications may be made without departing from the scope of the present invention. The invention, therefore, should not be limited, except to the following claims, and their equivalents.

What is claimed is:

1. A fluorescence microscopy method comprising:
providing a trained deep neural network that is executed by software using one or more processors;
inputting a time sequence of two-dimensional fluorescence microscopy input images of a sample to the trained deep neural network, wherein each image is appended with a digital propagation matrix (DPM) that represents, pixel-by-pixel, an axial distance of a user-defined or automatically generated surface(s) within the sample from a plane of the input image; and
outputting a time sequence of fluorescence output images of the sample from the trained deep neural network that is digitally propagated or refocused to the user-defined or automatically generated surface(s) corresponding to the DPM(s) of the input images.

2. The method of claim 1, wherein the time sequence of fluorescence output images are digitally combined to create a volumetric image of the sample or create an extended depth of field (EDOF) image of the sample.

3. The method of claim 1, wherein the time sequence of fluorescence output images are used to create improved-focus image of the sample.

4. The method of claim 1, wherein the time sequence of fluorescence output images from the trained deep neural network are digitally combined to create an image of the sample over an arbitrary user-defined or automatically generated 3D surface or extend the depth of field of the microscope used to obtain the two-dimensional fluorescence microscopy input images.

5. The method of claim 1, wherein the time sequence of fluorescence output image(s) from the trained deep neural network enable a reduction of photon dose or light exposure on the sample volume or a reduction of photobleaching of the sample volume.

6. The method of claim 1, wherein one or more of the time sequences of fluorescence output images from the trained deep neural network are combined to create a time-lapse video of the sample volume or create a time-lapse video of the sample over an arbitrary user-defined or automatically generated 3D surface.

7. The method of claim 1, wherein the time sequence of two-dimensional fluorescence microscopy input images of the sample is obtained with a camera using stream or video mode and wherein the time sequence of fluorescence output images of the sample has the same or improved frame rate compared to the two-dimensional fluorescence microscopy input images.

8. The method of claim 1, wherein the user-defined or automatically generated surface comprises an arbitrary surface or an axial depth range located within the sample.

9. The method of claim 1, wherein the sample comprises at least one of a living organism, a fixed organism, live cell(s), fixed cell(s), live tissue, fixed tissue, pathological slide, biopsy, liquid, bodily fluid, or other microscopic objects.

10. The method of claim 1, wherein the time sequence of two-dimensional fluorescence microscopy input images are acquired using a spatially engineered point spread function.

11. The method of claim 1, wherein the trained deep neural network is trained with a generative adversarial network (GAN) using matched pairs of (1) a plurality of fluorescence images axially-focused at different depths and appended with different DPMs, and (2) corresponding ground truth fluorescence images captured at a correct/target focus depth defined by the corresponding DPM.

12. The method of claim 1, wherein the user-defined or automatically generated surfaces each define a two-dimensional plane, a tilted plane or a curved surface, or an arbitrary three-dimensional surface.

13. The method of claim 1, wherein each DPM is one of spatially uniform or spatially non-uniform.

14. The method of claim 1, wherein the time sequence of two-dimensional fluorescence microscopy input images have the same or substantially similar numerical aperture and resolution as the ground truth images.

15. The method of claim 1, wherein the time sequence of two-dimensional fluorescence microscopy input images have a lower numerical aperture and poorer resolution compared to the ground truth images, wherein the trained deep neural network learns and performs both virtual refocusing and super-resolution of the time sequence of two-dimensional fluorescence input images.

16. The method of claim 1, wherein the time sequence of two-dimensional fluorescence microscopy input images input to the trained deep neural network are obtained by using and/or the trained deep neural network is trained by using one of the following types of microscopes: a super-resolution microscope, a confocal microscope, a confocal microscope with single photon or multi-photon excited fluorescence, a second harmonic or high harmonic generation fluorescence microscope, a light-sheet microscope, a structured illumination microscope, a computational microscope, a ptychographic microscope.

17. The method of claim 1, wherein the time sequence of two-dimensional fluorescence microscopy input images are obtained with a fluorescence microscopy modality of a first type and the time sequence of fluorescence output images resemble and are substantially equivalent to a fluorescence microscopy images of the same sample obtained using a fluorescence microscopy modality of a second type.

18. The method of claim 1, wherein the time sequence of two-dimensional fluorescence microscopy input images of the sample comprises wide-field images and the time sequence of fluorescence output images resemble and are substantially equivalent to confocal microscopy images of the same sample.

19. The method of claim 1, wherein the trained deep neural network is trained with a generative adversarial network (GAN) using matched pairs of: (1) a plurality of fluorescence images of a first microscope modality axially-focused at different depths and appended with different DPMs, and (2) corresponding ground truth fluorescence images captured by a second, different microscope modality at a correct/target focus depth defined by the corresponding DPM.

20. The method of claim 19, wherein the first microscope modality comprises a wide-field fluorescence microscope modality and the second, different microscope modality comprises one of the following types of microscopes: a super-resolution microscope, a confocal microscope, a confocal microscope with single photon or multi-photon excited fluorescence, a second harmonic or high harmonic generation fluorescence microscope, a light-sheet microscope, a structured illumination microscope, a computational microscope, a ptychographic microscope.

21. The method of claim 1, wherein the time sequence of two-dimensional fluorescence microscopy input images are obtained by a fluorescence microscope comprising an engineered point spread function.

22. The method of claim 1, wherein the time sequence of fluorescence output images comprises a plurality of synchronized time sequences of fluorescence output images at a plurality of different user-defined or automatically generated surfaces.

* * * * *